(12) United States Patent
Yamada et al.

(10) Patent No.: US 11,898,635 B2
(45) Date of Patent: *Feb. 13, 2024

(54) TENSIONER

(71) Applicants: NHK SPRING CO., LTD., Yokohama (JP); DAIDO KOGYO CO., LTD., Kaga (JP)

(72) Inventors: Yoshio Yamada, Yokohama (JP); Takao Kobayashi, Yokohama (JP); Kazuhito Hiraoka, Yokohama (JP); Shuji Takahashi, Yokohama (JP); Hideaki Seki, Kaga (JP)

(73) Assignee: DAIDO KOGYO CO., LTD., Kaga (JP)

( * ) Notice: Subject to any disclaimer, the term of this patent is extended or adjusted under 35 U.S.C. 154(b) by 459 days.

This patent is subject to a terminal disclaimer.

(21) Appl. No.: 17/263,862

(22) PCT Filed: Jul. 31, 2019

(86) PCT No.: PCT/JP2019/030096
§ 371 (c)(1),
(2) Date: Jan. 27, 2021

(87) PCT Pub. No.: WO2020/027232
PCT Pub. Date: Feb. 6, 2020

(65) Prior Publication Data
US 2021/0310545 A1 Oct. 7, 2021

(30) Foreign Application Priority Data
Aug. 1, 2018 (JP) .................................. 2018-145337

(51) Int. Cl.
F16H 7/08 (2006.01)

(52) U.S. Cl.
CPC ............. *F16H 7/08* (2013.01); *F16H 7/0848* (2013.01); *F16H 2007/081* (2013.01);
(Continued)

(58) Field of Classification Search
CPC ............... F16H 7/08; F16H 2007/0802; F16H 2007/0804; F16H 2007/0806;
(Continued)

(56) References Cited

U.S. PATENT DOCUMENTS 4,454,236 A * 6/1984 Foster ..................... F16H 7/129
474/135
4,464,147 A * 8/1984 Foster ..................... F16H 7/129
474/135
(Continued)

FOREIGN PATENT DOCUMENTS

DE 102010018204 A1 10/2011
FR 2960931 12/2011
(Continued)

OTHER PUBLICATIONS

JP2000018344A Translation; Rokurogi, M; "Arm Shoe Having Tensioner"; Published On: 0/18/2000; Published By: Espacenet (Year: 2000).*
(Continued)

*Primary Examiner* — Michael R Mansen
*Assistant Examiner* — Raveen J Dias
(74) *Attorney, Agent, or Firm* — Dority & Manning PA

(57) ABSTRACT

A tensioner includes a movable section, a fixed section, a flat spiral spring, and a back-up spring. The movable section receives load from an entrained transmission body through a tension member. The fixed section supports the movable section so as to be capable of displacing. The flat spiral spring biases the movable section so as to resist the tension member. The flat spiral spring unwinds in a state in which
(Continued)

there is a small inter-plate friction force in cases in which there is a large biasing force applied to the tension member to counter load acting from the tension member. The flat spiral spring winds-up in a state in which there is a large inter-plate friction force in cases in which there is a small biasing force applied to the tension member to counter load acting from the tension member. The back-up spring limits wind-up of the flat spiral spring.

16 Claims, 34 Drawing Sheets

(52) U.S. Cl.
CPC .............. *F16H 2007/0802* (2013.01); *F16H 2007/0804* (2013.01); *F16H 2007/0806* (2013.01); *F16H 2007/0853* (2013.01); *F16H 2007/0863* (2013.01); *F16H 2007/0872* (2013.01); *F16H 2007/0893* (2013.01)

(58) Field of Classification Search
CPC ....... F16H 2007/081; F16H 2007/0846; F16H 2007/0848; F16H 2007/0853; F16H 2007/0872; F16H 2007/0893; F16H 2007/0895; F16H 2007/0897; F16H 7/0838; F16H 2007/0887
See application file for complete search history.

(56) References Cited

U.S. PATENT DOCUMENTS

| | | | | |
|---|---|---|---|---|
| 4,504,254 A * | 3/1985 | Foster | ................... | F16H 7/1245 474/135 |
| 4,557,709 A * | 12/1985 | St. John | ................ | F16H 7/1218 474/135 |
| 4,758,208 A * | 7/1988 | Bartos | ................... | F16H 7/1281 474/134 |
| 4,886,483 A * | 12/1989 | Henderson | ............ | F16H 7/1218 474/135 |
| 4,981,461 A * | 1/1991 | Henderson | ............ | F16H 7/1218 474/135 |
| 5,015,217 A * | 5/1991 | Henderson | ............ | F16H 7/1218 474/135 |
| 5,030,171 A * | 7/1991 | Henderson | ............ | F16H 7/1218 474/135 |
| 5,205,792 A * | 4/1993 | Quintus | ................ | F16H 7/1281 474/135 |
| 5,244,438 A * | 9/1993 | Golovatai-Schmidt | ...................... | F01L 1/024 474/112 |
| 5,254,048 A * | 10/1993 | Gardner | ................ | F16H 7/1281 474/135 |
| 5,277,667 A * | 1/1994 | Gardner | ................ | F16H 7/1281 474/135 |
| 6,231,465 B1 * | 5/2001 | Quintus | ................ | F16H 7/1218 474/135 |
| 6,863,631 B2 * | 3/2005 | Meckstroth | ........... | F16H 7/1218 474/135 |
| 7,229,374 B2 * | 6/2007 | Meckstroth | ........... | F16H 7/1218 474/133 |
| 9,869,378 B2 * | 1/2018 | Kobayashi | ................ | F16H 7/08 |
| 10,794,455 B2 * | 10/2020 | Seki | ........................ | F16H 7/08 |
| 2010/0113201 A1 * | 5/2010 | Lannutti | ................ | F16H 7/1218 474/135 |
| 2011/0105261 A1 * | 5/2011 | Hodjat | .................. | F16H 7/1218 474/135 |
| 2011/0275465 A1 * | 11/2011 | Gillis | .................... | F16H 7/1281 474/133 |
| 2013/0095966 A1 * | 4/2013 | Staley | .................. | F16H 7/1218 474/135 |
| 2016/0153529 A1 * | 6/2016 | Kobayashi | ................ | F16H 7/08 474/111 |
| 2019/0101192 A1 * | 4/2019 | Dec | ....................... | F16H 7/1281 |
| 2019/0353227 A1 * | 11/2019 | Seki | .......................... | F16H 7/08 |
| 2021/0317898 A1 * | 10/2021 | Yamada | .................... | F16F 1/12 |

FOREIGN PATENT DOCUMENTS

| | | |
|---|---|---|
| JP | S5855382 B | 12/1983 |
| JP | S60095252 U | 6/1985 |
| JP | H08501619 | 2/1996 |
| JP | 2000018344 A | 1/2000 |
| JP | 3271010 B2 | 4/2002 |
| JP | 2002276710 A | 9/2002 |
| JP | 3660651 B2 | 6/2005 |
| JP | 2011140972 A | 7/2011 |
| JP | 2013-508650 A | 3/2013 |
| WO | WO-2011154865 A1 * | 12/2011 ............... F16F 1/10 |
| WO | WO 2016021566 | 2/2016 |
| WO | WO2018142529 A1 | 8/2018 |
| WO | WO-2019049936 A1 * | 3/2019 ............... F16H 7/08 |

OTHER PUBLICATIONS

WO2018142529A1 Translation; Seki et al; "Tensioner"; Published On: Aug. 9, 2018; Published By: WIPO/ Espacenet (Year: 2018).*
Extended European search report for corresponding European Patent Application No. 19845232.8, dated Jan. 24, 2022, 7 pages.
PCT International Search Report (English Translation) and Written Opinion for corresponding PCT Application No. PCT/JP2019/030096, dated Oct. 8, 2019, 6pages.
Office Action for Indian Patent Application No. 202117006769, dated Sep. 5, 2022, 6 pages.

* cited by examiner

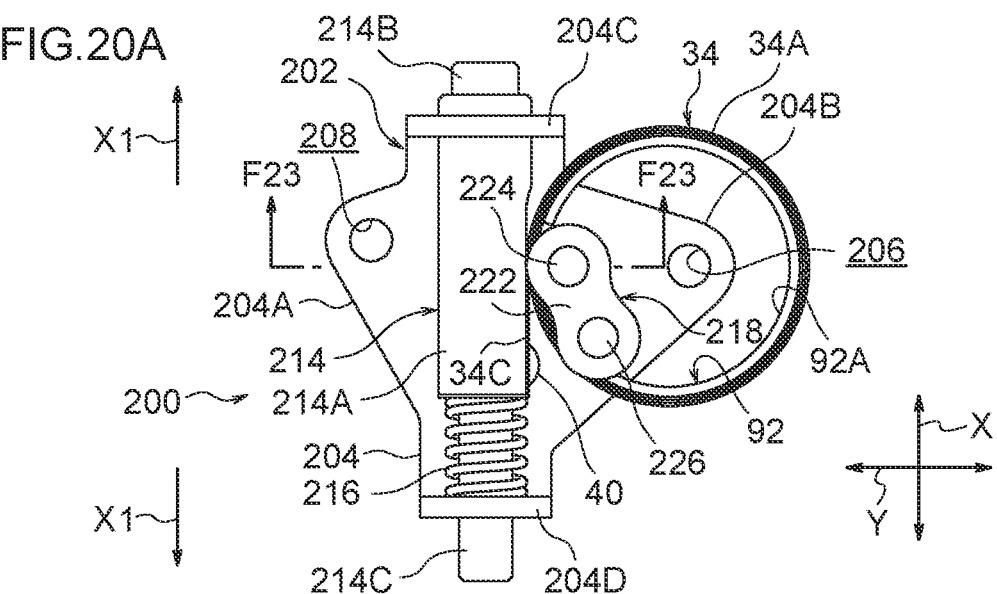
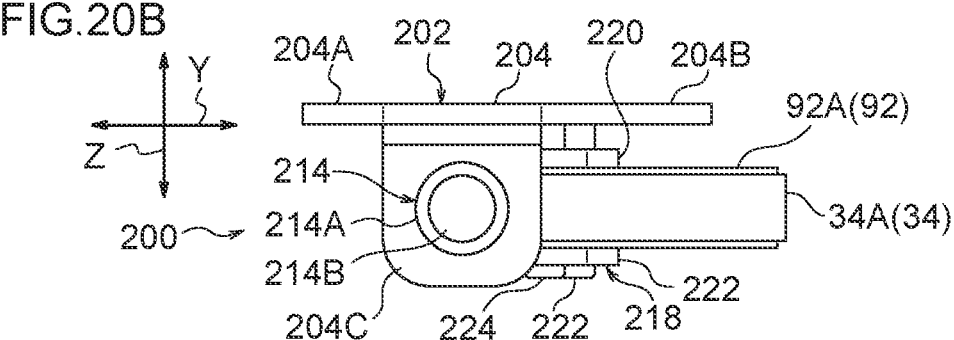
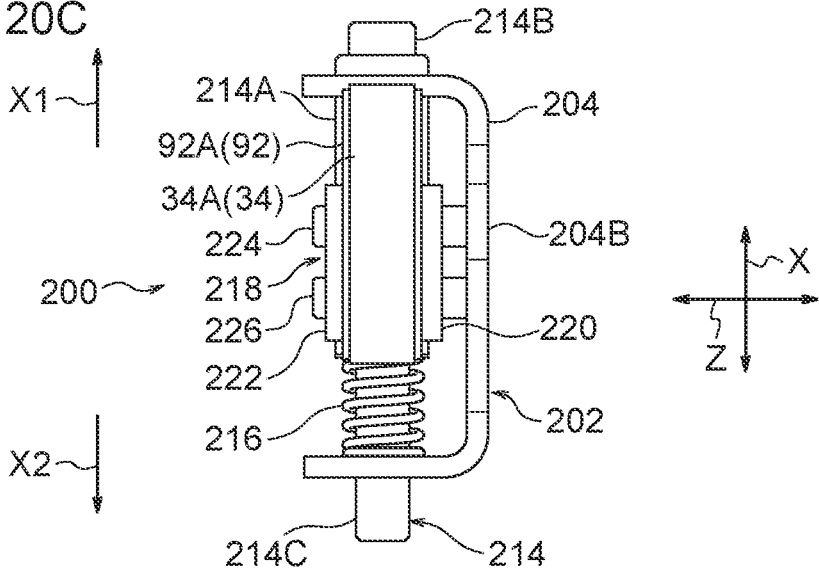

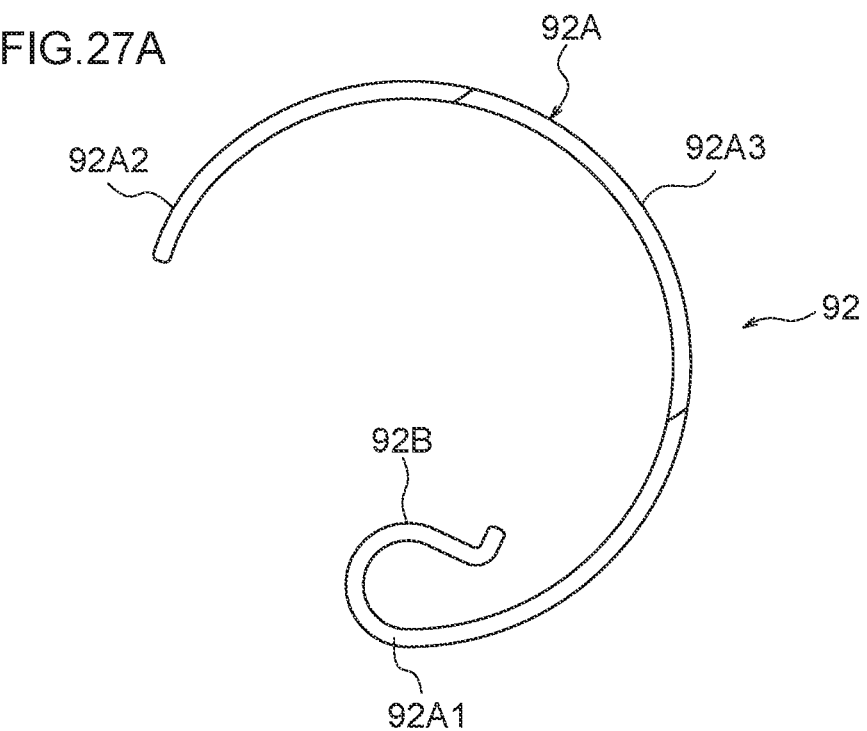
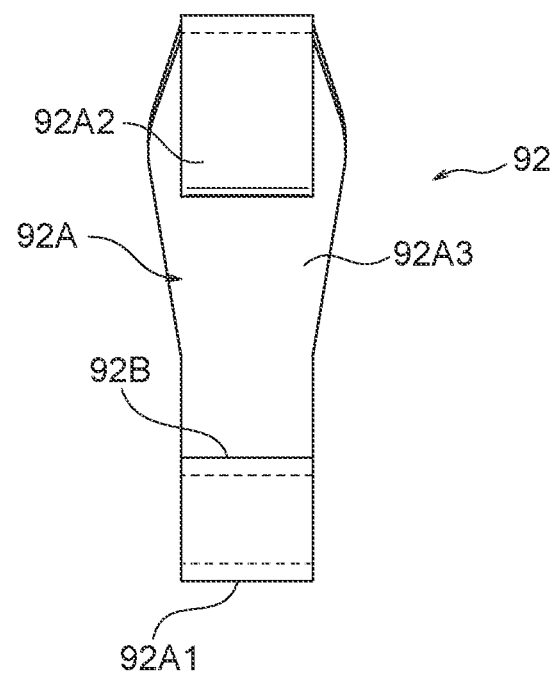

TENSIONER

PRIORITY CLAIM

This application is a national stage application, filed under 35 U.S.C. § 371, of International Patent Application No. PCT/JP2019/030096, filed on Jul. 31, 2019, which claims the benefit of priority to Japanese Patent Application No. 2018-145337, filed on Aug. 1, 2018, both of which are incorporated by reference herein in their entireties.

TECHNICAL FIELD

The present invention relates to a tensioner employed to maintain tension of an entrained transmission body such as a chain or belt.

BACKGROUND ART

A belt tensioning system described in Japanese Patent Application Laid-Open (JP-A) No. H8-501619 includes an arm, pivotally attached to a support means, a pulley rotatably supported by the arm, and a coil spring for biasing the arm in a direction in which the pulley will engage with a belt structural body. The coil spring is configured from a flattened metal wire wound into a helical shape, and a strip of a friction-reducing polymer is interposed between adjacent turns of the flattened metal wire.

SUMMARY OF INVENTION

Technical Problem

In the above belt tensioning system, when an overly large load is input from the belt structural body to the pulley, i.e. to the arm, the coil spring (flat spiral spring) is wound-up excessively, and so there is a possibility that biasing force applied from the pulley to the belt structural body might temporarily drop by a large amount. In such cases excessive slack will be generated in the belt structural body, leading to the behavior of the belt structural body (entrained transmission body) becoming unstable.

In consideration of the above circumstances, an object of the present invention is to obtain a tensioner capable of preventing the behavior of an entrained transmission body becoming unstable due to excessive winding-up of a flat spiral spring.

Solution to Problem

A tensioner of a first aspect of the present invention includes: a movable section configured to receive a load from an entrained transmission body through a tension member; a fixed section configured to support the movable section so as to be capable of being displaced; a flat spiral spring biasing the movable section so as to resist the tension member, the flat spiral spring unwinding in a state in which there is a small inter-plate friction force in a case in which there is a large biasing force applied to the tension member to counter the load acting from the tension member, and winding-up in a state in which there is a large inter-plate friction force in a case in which there is a small biasing force applied to the tension member to counter the load acting from the tension member; and a wind-up limiting section configured to limit wind-up of the flat spiral spring.

In the tensioner of the first aspect, the movable section receiving load from the entrained transmission body through the tension member is supported by the fixed section so as to be capable of being displaced, and the movable section is biased by the flat spiral spring so as to resist the tension member. Vibrations of the entrained transmission body are thereby buffered by unwinding and winding-up of the flat spiral spring, and energy can be absorbed and attenuated by hysteresis characteristics due to the difference between the inter-plate friction force of the flat spiral spring in an unwind direction and a wind-up direction. Moreover, the flat spiral spring is prevented from winding-up excessively since the wind-up limiting section limits (suppresses) winding-up of the flat spiral spring, thereby enabling the behavior of the entrained transmission body to be prevented from becoming unstable due to such excessive winding-up.

A tensioner of a second aspect of the present invention is the tensioner of the first aspect, wherein the wind-up limiting section is disposed inside the flat spiral spring and includes a resistance force imparting section configured to impart resistance force to counter radial contraction of the flat spiral spring.

In the tensioner of the second aspect, the resistance force imparting section disposed inside the flat spiral spring imparts resistance force to counter radial contraction of the flat spiral spring. The winding-up of the flat spiral spring is thereby limited. Moreover inter-plate friction force arising in the flat spiral spring when the flat spiral spring is being wound-up can be increased, enabling an improvement to the hysteresis characteristics described previously.

A tensioner of a third aspect of the present invention is the tensioner of the first aspect, wherein the wind-up limiting section includes a displacement limiting section configured to permit displacement of the movable section toward the tension member with respect to the fixed section, and to limit displacement of the movable section toward an opposite side from the tension member with respect to the fixed section.

In the tensioner of the third aspect, the displacement limiting section permits displacement of the movable section toward the tension member with respect to the fixed section, and limits displacement of the movable section toward the opposite side to the tension member with respect to the fixed section. Thus, in cases in which an overly large load is input to the movable section from the entrained transmission body such as a chain or belt through the tension member, the movable section is prevented from displacing excessively toward the opposite side to the tension member, thereby enabling excessive winding-up of the flat spiral spring accompanying this displacement to be prevented.

A tensioner of a fourth aspect of the present invention is the tensioner of the second aspect, wherein the resistance force imparting section is a back-up spring configured from plate-shaped spring material. The back-up spring includes a ring-shaped portion formed in an incomplete ring shape and having an outer circumferential face in contact with an inner circumferential face of the flat spiral spring, and an anchor portion extending from a one-end portion of the ring-shaped portion and anchored to the fixed section.

In the tensioner of the fourth aspect, the back-up spring configured from the plate-shaped spring material includes the ring-shaped portion formed in an incomplete ring shape with the outer circumferential face in contact with the inner circumferential face of the flat spiral spring, and the anchor portion extending from the one-end portion of the ring-shaped portion anchored to the fixed section. Thus, the ring-shaped portion of the back-up spring imparts resistance force to counter radial contraction of the flat spiral spring when the flat spiral spring is being wound-up. Since the resistance force imparting section is thus configured by the back-up spring configured from the plate-shaped spring material, the configuration of the resistance force imparting section can be simplified. Moreover, the hysteresis characteristics described previously can be further improved due to friction and so on occurring between the flat spiral spring and the ring-shaped portion when the flat spiral spring is being wound-up.

A tensioner of a fifth aspect of the present invention is the tensioner of the second aspect, wherein the resistance force imparting section includes plural press-contact members arrayed along a circumferential direction of the flat spiral spring, and a biasing portion configured to bias the plural press-contact members toward a radial direction outer side of the flat spiral spring so as to press-contact an inner circumferential face of the flat spiral spring.

In the tensioner of the fifth aspect, the plural press-contact members are disposed inside the flat spiral spring by arraying along the circumferential direction of the flat spiral spring. The plural press-contact member are biased by the biasing portion toward the radial direction outer side of the flat spiral spring and are press-contacted against the inner circumferential face of the flat spiral spring. Thus when the flat spiral spring is being wound-up, the plural press-contact member impart a resistance force to counter radial contraction of the flat spiral spring while receiving biasing force of the biasing portion. This accordingly limits the wound-up of the flat spiral spring. Moreover, due to adopting a configuration in which the plural press-contact members are arrayed along the circumferential direction of the flat spiral spring and press-contacted against the inner circumferential face of the flat spiral spring, a press-contact force is easily caused to act uniformly on all locations along the circumferential direction of the flat spiral spring. Moreover, when the flat spiral spring is being wound-up, the friction arising between the inner circumferential face of the flat spiral spring and the plural press-contact members enables a further improvement to be achieved in the hysteresis characteristics.

A tensioner of a sixth aspect of the present invention is the tensioner of the second aspect, wherein the resistance force imparting section includes: a back-up spring formed from plate-shaped spring material in an incomplete ring shape and having an outer circumferential face contacting an inner circumferential face of the flat spiral spring; a pair of axial-movement members disposed at two coil axis direction sides with respect to the flat spiral spring and coaxially to the flat spiral spring, the pair of axial-movement members each being supported so as to be displaceable in the coil axis direction with respect to the fixed section, and having an outer circumferential face that has a decreasing diameter on progression toward a coil axis direction center of the flat spiral spring and that contacts an inner circumferential portion of the back-up spring; and a resilient member configured to bias the pair of axial-movement members in directions so as to approach each other.

In the tensioner of the sixth aspect, the back-up spring is formed in an incomplete ring shape from plate-shaped spring material, and the outer circumferential face thereof contacts the inner circumferential face of the flat spiral spring. Thus when the flat spiral spring is being wound-up, the back-up spring imparts resistance force to counter radial contraction of the flat spiral spring. In this manner, the back-up spring configured from plate-shaped spring material acts as a resistance force imparting section, enabling the resistance force imparting section to be configured simply. Moreover, the hysteresis characteristics can be further improved due to the friction and the like arising between the flat spiral spring and the back-up spring when the flat spiral spring is being wound-up.

Moreover, in the tensioner, the pair of axial-movement members are disposed coaxially to the flat spiral spring at both sides in the coil axis direction with respect to the flat spiral spring, and are supported so as to be displaceable in the coil axis direction with respect to the fixed section. These axial-movement members have an outer circumferential face that decreases in diameter on progress toward the coil axis direction center of the flat spiral spring, contact the inner circumferential portion of the back-up spring, and are biased by the resilient member in directions so as to approach each other. The back-up spring is accordingly supported from the inner circumferential side by these axial-movement members, and so the back-up spring easily deforms uniformly at each location in the circumferential direction. Localized wear of the flat spiral spring and the back-up spring can accordingly be suppressed, stabilizing the unwinding and winding-up of the flat spiral spring.

A tensioner of a seventh aspect of the present invention is the tensioner of the fifth aspect, wherein the biasing portion includes: a pair of axial-movement members disposed at two coil axis direction sides with respect to the flat spiral spring and coaxially to the flat spiral spring, the pair of axial-movement members each being supported so as to be displaceable in the coil axis direction with respect to the fixed section, and having an outer circumferential face that has a decreasing diameter on progression toward a coil axis direction center of the flat spiral spring and that contacts the plural press-contact members from a radial direction inner side of the back-up spring; and a resilient member configured to bias the pair of axial-movement members in directions so as to approach each other.

In the tensioner of the seventh aspect, the pair of axial-movement members are disposed coaxially to the flat spiral spring at both sides in the coil axis direction with respect to the flat spiral spring, and are supported so as to be displaceable in the coil axis direction with respect to the fixed section. These axial-movement members have an outer circumferential face that decreases in diameter on progress toward the coil axis direction center of the flat spiral spring, and that contacts the plural press-contact members from the radial direction inner side of the flat spiral spring, and are biased by the resilient member in directions so as to approach each other. The plural press-contact members can accordingly be caused to press-contact uniformly against the inner circumferential face of the flat spiral spring by the axial-movement members. As a result, localized wear of the flat spiral spring and the plural press-contact members can accordingly be suppressed, stabilizing the unwinding and winding-up of the flat spiral spring.

A tensioner of an eighth aspect of the present invention is the tensioner of the fourth aspect, further including: a radial-contraction restriction member supported so as to be capable of rotating with respect to the fixed section about an axis running along a coil axis direction of the flat spiral spring, and engaged with another-end portion of the ring-shaped portion; and a rotation limiting section configured to permit the radial-contraction restriction member to rotate in one direction about the axis with respect to the fixed section interlocked to radial enlargement of the ring-shaped portion, and to limit the radial-contraction restriction member from rotating in another direction about the axis with respect to the fixed section interlocked to radial contraction of the ring-shaped portion.

In the tensioner of the eighth aspect, the movable section is displaced toward the tension member side with respect to the fixed section, enlarging the diameters of the flat spiral spring and the ring-shaped portion of the back-up spring, and rotating the radial-contraction restriction member in the one direction about the axis along the coil axis direction of the flat spiral spring with respect to the fixed section interlocked to the radial enlargement of the ring-shaped portion. When this occurs rotation of the radial-contraction restriction member in one direction about the axis is permitted by the rotation limiting section.

On the other hand, when the entrained transmission body such as a chain or belt presses the movable section through the tension member such that the movable section attempts to displace toward the opposite side to the tension member, the flat spiral spring and the ring-shaped portion of the back-up spring attempt to undergo radial contraction. When this occurs, although the radial-contraction restriction member attempts to rotate in the other direction about the axis with respect to the fixed section interlocked to the radial contraction of the ring-shaped portion, this rotation of the radial-contraction restriction member in the other direction about the axis is restricted by the rotation limiting section. In such cases, when the movable section attempts to displace toward the opposite side to the tension member in a state in which radial contraction of the ring-shaped portion is restricted, the flat spiral spring is wound-up in a state in which radial contraction of the inner circumferential face of the flat spiral spring is restricted by the ring-shaped portion. This accordingly increases inter-plate friction force arising in the flat spiral spring. Excessive displacement of the movable section toward the opposite side to the tension member is suppressed as a result, thereby further stabilizing the behavior of the entrained transmission body.

A tensioner of a ninth aspect of the present invention is the tensioner of the fourth aspect, further including: a first pin member fixed to the fixed section and having the anchor portion anchored to the first pin member; a second pin member disposed adjacently with respect to the first pin member in an extension direction of the ring-shaped portion from the anchor portion, the second pin member being fixed to the fixed section and engaged with an inner circumferential face of the ring-shaped portion; and a plate member fixed to the first pin member and the second pin member and limiting displacement of the flat spiral spring and the back-up spring in a coil axis direction of the flat spiral spring.

In the tensioner of the ninth aspect, the anchor portion of the back-up spring is anchored to the first pin member fixed to the fixed section. The second pin member disposed adjacently with respect to the first pin member in an extension direction of the ring-shaped portion from the anchor portion is fixed to the fixed section and is engaged with the inner circumferential face of the ring-shaped portion. The back-up spring is accordingly restricted from rotating in the one direction about the first pin member. Thereby the back-up spring supported by the fixed section in a cantilevered manner facilitates uniform deformation when the flat spiral spring is being wound-up, enabling localized wear to be suppressed from occurring in the flat spiral spring and the back-up spring. The unwinding and winding-up of the flat spiral spring is thereby stabilized. The flat spiral spring and the back-up spring are limited from displacing in the coil axis direction of the flat spiral spring by the plate members fixed to the first pin member and the second pin member. Positional misalignment of the flat spiral spring in the coil axis direction can thereby be prevented or suppressed when unwinding and winding-up the flat spiral spring.

A tensioner of a tenth aspect of the present invention is the tensioner of the fourth aspect, wherein the fixed section includes an inner circumferential support portion configured to engage with an inner circumferential face of the ring-shaped portion and to support the ring-shaped portion.

In the tensioner of the tenth aspect, the inner circumferential support portion of the fixed section engages with the inner circumferential face of the ring-shaped portion of the back-up spring and supports the ring-shaped portion. The back-up spring supported by the fixed section in a cantilevered manner accordingly facilitates uniform deformation when the flat spiral spring is being wound-up, enabling localized wear to be suppressed from occurring in the flat spiral spring and the back-up spring. The unwinding and winding-up of the flat spiral spring is thereby stabilized.

A tensioner of an eleventh aspect of the present invention is the tensioner of the fourth aspect wherein the ring-shaped portion has a cross-sectional area that changes in a circumferential direction.

In the tensioner of the eleventh aspect, the ring-shaped portion of the back-up spring has a cross-sectional area that changes along the circumferential direction. Thus, for example, high local stress can be prevented or suppressed from arising in the ring-shaped portion when unwinding and winding-up the flat spiral spring.

A tensioner of a twelfth aspect of the present invention is the tensioner of the fourth aspect wherein the flat spiral spring has a curved cross-section as viewed along a circumferential direction, that is convex on toward an opposite side from the ring-shaped portion.

In the tensioner of the twelfth aspect, the outer circumferential face of the ring-shaped portion of the back-up spring contacts the inner circumferential face of the flat spiral spring having a curved cross-section as viewed along a circumferential direction convex on toward an opposite side from the ring-shaped portion. A gap between plates of the flat spiral spring can accordingly be generated during unwinding and winding-up of the flat spiral spring. Moreover, a gap can also be formed between the flat spiral spring and the ring-shaped portion. Thus, for example, oil entry into these gaps is facilitated, facilitating suppression of wear to the flat spiral spring and the back-up spring, and enabling unwinding and winding-up of the flat spiral spring to be stabilized.

A tensioner of a thirteenth aspect of the present invention is the tensioner of the fourth aspect wherein the outer circumferential face of the ring-shaped portion is, as viewed along a circumferential direction of the ring-shaped portion, formed in a convex shape that is convex toward the flat spiral spring.

In the tensioner of the thirteenth aspect the outer circumferential face of the ring-shaped portion of the back-up spring is, as viewed along a circumferential direction of the ring-shaped portion, formed in a convex shape convex toward the flat spiral spring. There is accordingly a gap formed between the flat spiral spring and the ring-shaped portion which, for example, facilitates entry of oil into such a gap. As a result, the suppression of wear to the flat spiral spring and the back-up spring is facilitated, and the unwinding and winding-up of the flat spiral spring can also be stabilized.

A tensioner of a fourteenth aspect of the present invention is the tensioner of the fourth aspect, wherein plural indentations and projections are formed on an outer circumferential face and an inner circumferential face of a plate spring material configuring the flat spiral spring.

In the tensioner of the fourteenth aspect, the outer circumferential face and the inner circumferential face of the plate spring material configuring the flat spiral spring is formed in the above manner, and so gaps are formed between plates of the flat spiral spring and between the flat spiral spring and the ring-shaped portion. This, for example, facilitates entry of oil into such gaps, facilitating the suppression of wear to the flat spiral spring and the back-up spring, and also enabling unwinding and winding-up of the flat spiral spring to be stabilized.

A tensioner of a fifteenth aspect of the present invention is the tensioner of the fourth aspect, wherein: the movable section is supported by the fixed section so as to be capable of sliding in a reciprocating direction orthogonal to a coil axis direction of the flat spiral spring; the flat spiral spring is disposed adjacently with respect to the movable section in a spring-adjacency direction orthogonal to both the coil axis direction and the reciprocating direction, an outer-end portion of the flat spiral spring being anchored to the movable section, and an inner-end portion of the flat spiral spring being anchored to the fixed section; taking a rotation direction in which the flat spiral spring is wound-up as a wind-up direction and a rotation direction in which the flat spiral spring unwinds as an unwind direction, the ring-shaped portion extends from the anchor portion in the wind-up direction; and as viewed along the coil axis direction, the one-end portion of the ring-shaped portion is disposed in a range from a position at 0 degrees about a center of the ring-shaped portion to a position at 90 degrees in the unwind direction with respect to a virtual straight line extending in the adjacency direction from the center of the ring-shaped portion toward the movable section.

In the tensioner of the fifteenth aspect, the back-up spring, as described above, has the outer circumferential face of the ring-shaped portion formed in the incomplete ring shape in contact with the inner circumferential face of the flat spiral spring, and the anchor portion extended from the one-end portion of the ring-shaped portion is anchored to the fixed section. Moreover, taking the rotation direction in which the flat spiral spring is wound-up as the wind-up direction and the rotation direction in which the flat spiral spring unwinds as the unwind direction, the ring-shaped portion extends from the anchor portion in the wind-up direction. As viewed along the coil axis direction of the flat spiral spring, the one-end portion of the ring-shaped portion (the end portion extended from the anchor portion) is disposed in the range from a position at 0 degrees about a center of the ring-shaped portion to a position at 90 degrees in the unwind direction with respect to a virtual straight line extending in the spring-adjacency direction (the direction of adjacency between the flat spiral spring and the movable section) from the center of the ring-shaped portion toward the movable section. Namely, the location of the one-end portion side of the ring-shaped portion is disposed close to the movable section.

In cases in which the location of the one-end portion side of the ring-shaped portion is disposed away from the movable section, load applied to the outer-end portion of the flat spiral spring by displacement of the movable section toward the opposite side to the tension member would act as bending load on the flat spiral spring and on the back-up spring, and the conversion efficiency to load to wind-up the flat spiral spring would deteriorate. The inter-plate friction force arising in the flat spiral spring would be lower as a result, lowering the hysteresis characteristics. By contrast thereto, in cases in which the location at the one-end portion side of the ring-shaped portion is disposed close to the movable section as in the present invention, the load applied to the outer-end portion of the flat spiral spring by displacement of the movable section toward the opposite side to the tension member does not readily act as bending load on the flat spiral spring and the back-up spring, and there is good conversion of load to wound-up the flat spiral spring. Inter-plate friction force arising in the flat spiral spring increases as a result, improving the hysteresis characteristics.

A tensioner of a sixteenth aspect of the present invention is the tensioner of the fourth aspect, wherein the ring-shaped portion is formed by the plate-shaped spring material being wound for at least 1.0 full turn.

In the tensioner of the sixteenth aspect, the ring-shaped portion of the back-up spring is formed by the plate-shaped spring material being wound for at least 1.0 full turn. The other-end side (free-end side) of the ring-shaped portion is thereby prevented from deforming further toward the center of the ring-shaped portion than the one-end side (anchored end side) of the ring-shaped portion when the flat spiral spring is being wound-up, facilitating uniform radial contraction of the ring-shaped portion at every location along the circumferential direction. Resistance force imparted from the ring-shaped portion to counter radial contraction of the flat spiral spring is, as a result, facilitated to act uniformly at every location along the circumferential direction of the flat spiral spring.

A tensioner of a seventeenth aspect of the present invention is the tensioner of any one of the first aspect to the sixteenth aspect, wherein the wind-up limiting section includes an additional spring configured to bias the movable section toward the tension member with respect to the fixed section.

In the tensioner of the seventeenth aspect, the additional spring biases the movable section toward the tension member with respect to the fixed section. The winding-up of the flat spiral spring is limited thereby. Moreover, due to the movable section being biased toward the tension member side not only by the flat spiral spring but also by the additional spring, sufficient thrust force can be imparted to the movable section, enabling sufficient tension to be induced in the entrained transmission body such as a chain or belt. Moreover, the tension induced in the tension member and the load absorbing characteristics can be set separately using the flat spiral spring and the additional spring.

Advantageous Effects

As described above, the tensioner according to the present invention enables the behavior of an entrained transmission body to be prevented from becoming unstable due to excessive winding-up of a flat spiral spring.

BRIEF DESCRIPTION OF DRAWINGS

FIG. 20A is a front view illustrating a tensioner according to the eighth exemplary embodiment of the present invention.

FIG. 20B is a plan view illustrating a tensioner according to the eighth exemplary embodiment of the present invention.

FIG. 20C is a side view illustrating a tensioner according to the eighth exemplary embodiment of the present invention.

FIG. 27A is a front view illustrating a modified example of a back-up spring provided in a tensioner according to the ninth exemplary embodiment of the present invention.

FIG. 27B is a side view illustrating a modified example of a back-up spring provided in a tensioner according to the ninth exemplary embodiment of the present invention.

DESCRIPTION OF EMBODIMENTS

First Exemplary Embodiment

Figure 1:
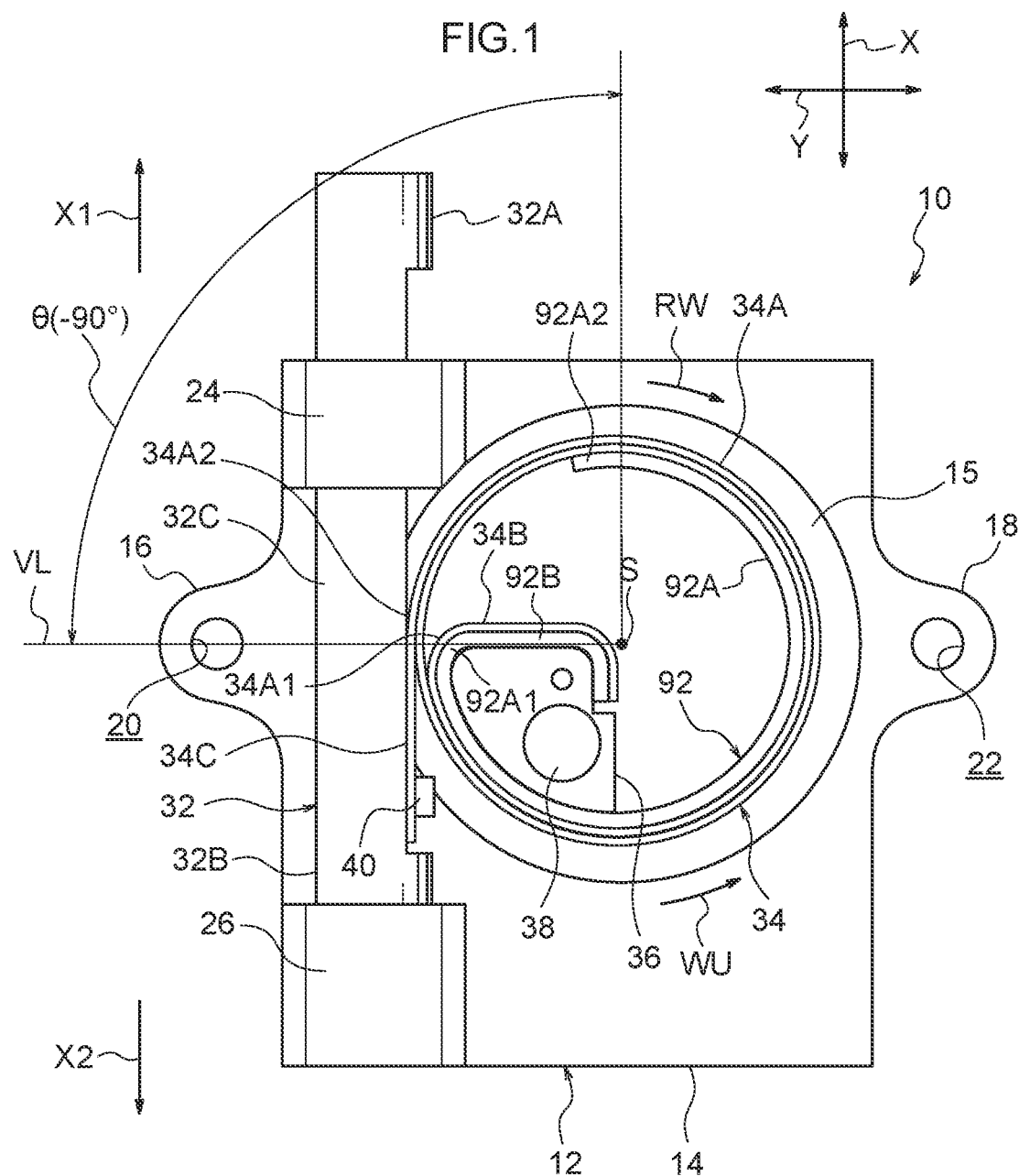
FIG. 1 is a front view illustrating a tensioner according to a first exemplary embodiment of the present invention.
Figure 2:
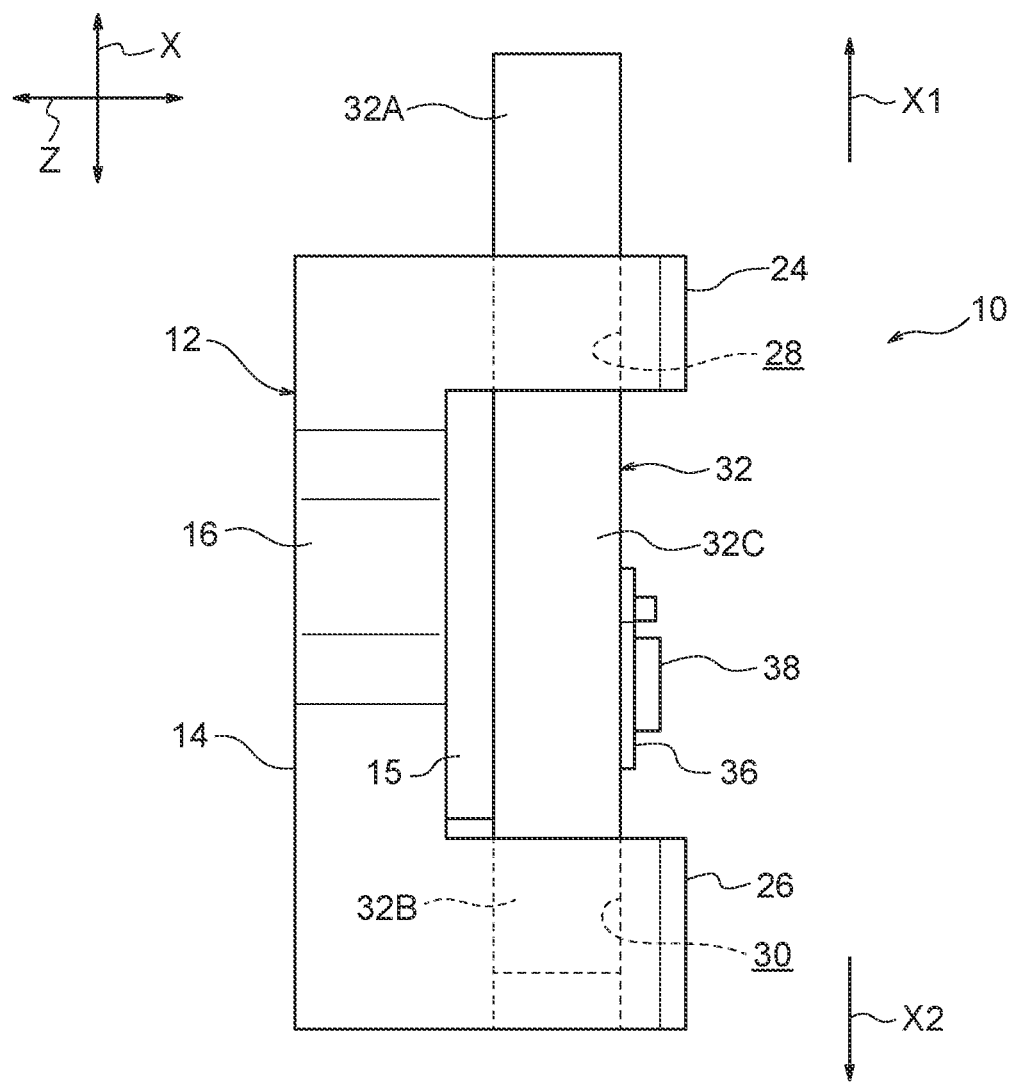
FIG. 2 is a side view illustrating a tensioner according to the first exemplary embodiment of the present invention.
Figure 3:
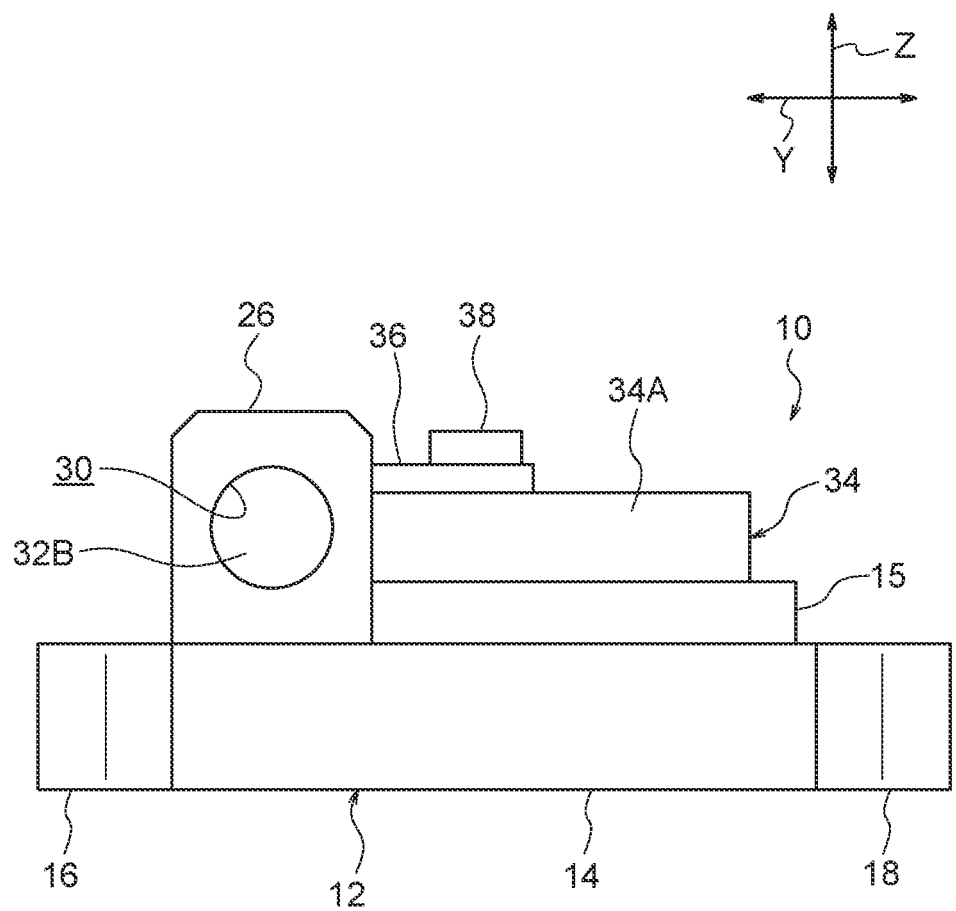
FIG. 3 is a plan view illustrating a tensioner according to the first exemplary embodiment of the present invention.
Figure 4:
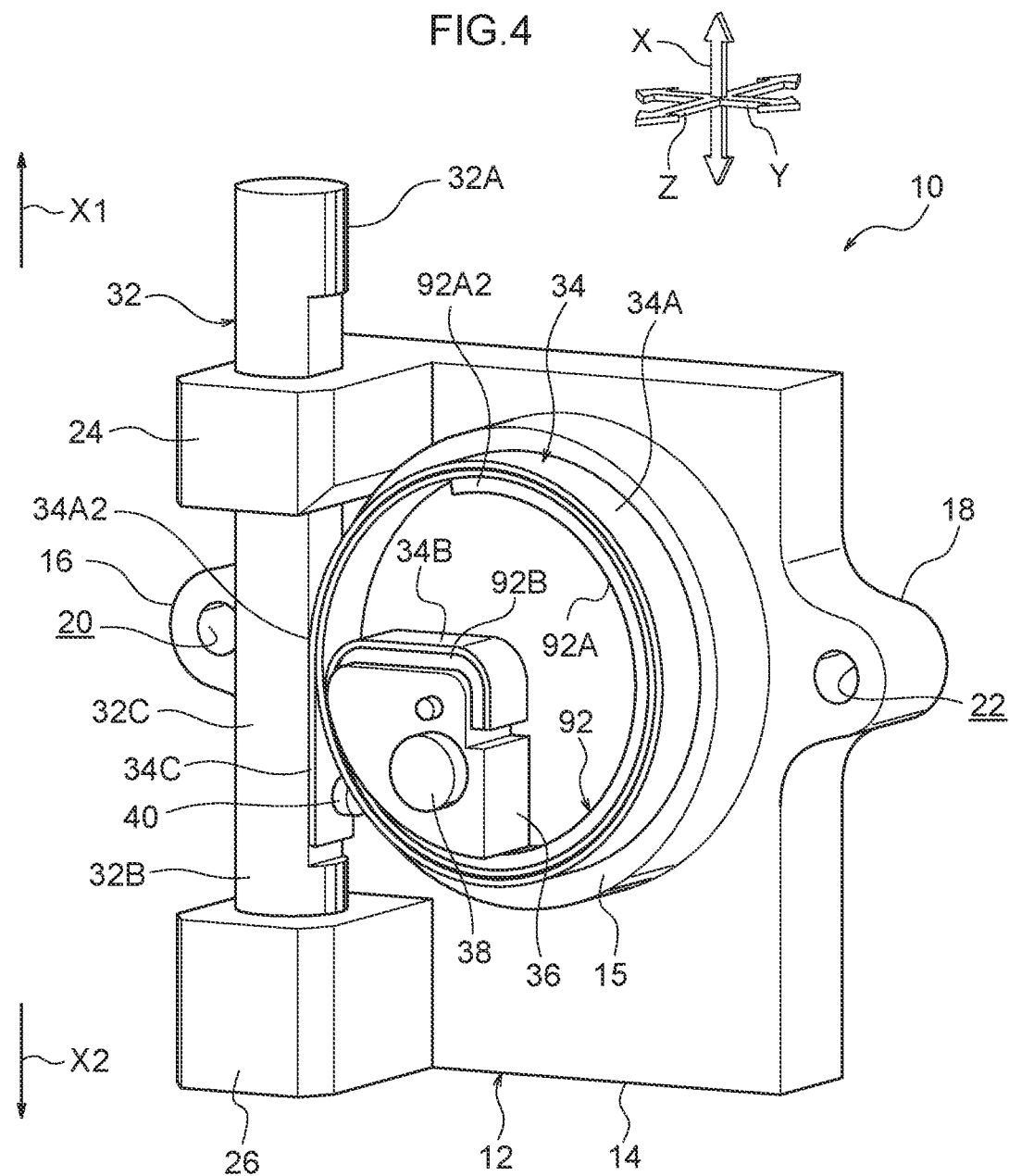
FIG. 4 is a perspective view illustrating a tensioner according to the first exemplary embodiment of the present invention.

Explanation follows regarding a tensioner 10 according to a first exemplary embodiment of the present invention, with reference to FIG. 1 to FIG. 4. For ease of explanation, in the drawings the arrows X, Y, and Z respectively indicate directions of a "reciprocating direction", a "spring-adjacency direction", and a "coil axis direction" as appropriate. The reciprocating direction X, the spring-adjacency direction Y, and the coil axis direction Z are mutually orthogonal to one another.

Configuration

As illustrated in FIG. 1 to FIG. 4, the tensioner 10 according to the first exemplary embodiment includes a movable section (thrust member, plunger) 32, a fixed section (support member) 12, a contact-type flat spiral spring 34, and a back-up spring 92. The movable section receives load from an entrained transmission body (not illustrated in the drawings) such as a timing chain or timing belt through a tension member (not illustrated in the drawings) such as a chain guide or belt guide. The fixed section 12 supports the movable section 32 so as to be displaceable (straight-line moveable in the reciprocating direction X in this example). The flat spiral spring 34 is disposed adjacent to the movable section 32 in the spring-adjacency direction Y. The coil axis direction Z of the flat spiral spring 34 is orthogonal to both the reciprocating direction X and the spring-adjacency direction Y, as stated above. The flat spiral spring 34 biases the movable section 32 so as to resist the tension member, and to achieve a configuration in which the flat spiral spring 34 is unwound in a state in which there is a small inter-plate friction force in cases in which biasing force applied to the tension member is larger than load acting from the tension member, and the flat spiral spring 34 is wound-up in a state in which there is a large inter-plate friction force in cases in which biasing force applied to the tension member is smaller than load acting from the tension member. The back-up spring 92 is disposed inside the flat spiral spring 34 and is configured to impart resistance force to counter radial contraction of the flat spiral spring 34. Detailed explanation follows regarding each of the above configuration elements.

Fixed Section

The fixed section 12 is, for example, formed from metal, and includes a plate shaped fixed section body 14 having a plate thickness direction in the coil axis direction Z of the flat spiral spring 34. The fixed section body 14 is formed with an elongated rectangular profile with its length direction running in the reciprocating direction X as viewed along the coil axis direction Z. Fixing portions 16, 18 that protrude toward the width direction outsides of the fixed section body 14 are formed toward the length direction center of the two width direction (spring-adjacency direction Y) end portions of the fixed section body 14. Through holes 20, 22 are respectively formed penetrating through the fixing portions 16, 18 in the coil axis direction Z. Bolts or the like are inserted through the through holes 20, 22 in a configuration to fix the fixed section 12 to a cylinder block of a non-illustrated engine. Note that the fixed section 12 may be integrally molded to the engine cylinder block.

A leading-end side support portion 24 and a base-end side support portion 26 are respectively formed so as to project toward one side in the coil axis direction Z at a width direction end portion of the fixed section body 14. The leading-end side support portion 24 is formed at one length direction end portion (an end portion on the forward-direction X1 side) of the fixed section 12, and the base-end side support portion 26 is formed at the other length direction end portion (an end portion on the retract-direction X2 side) of the fixed section 12. As illustrated in FIG. 1 to FIG. 4, the leading-end side support portion 24 and the base-end side support portion 26 are each formed in a substantially rectangular block shape. A through hole 28 (not illustrated in the drawings, with the exception of FIG. 2) and a through hole 30 (not illustrated in the drawings, with the exception of FIG. 2 and FIG. 3) are formed in the reciprocating direction X through the leading-end side support portion 24 and the base-end side support portion 26. The through holes 28, 30 are provided so as to align with the movable section 32.

Movable Section

The movable section 32 is, for example, formed from metal, and is formed in a substantially circular column shape with its axial direction running in the reciprocating direction X. More specifically, the movable section 32 is formed with a circular column shaped leading-end portion (axial direction one-end portion) 32A and base-end portion (axial direction other-end portion) 32B. A length direction intermediate portion 32C of the movable section 32 is notched on one side in the spring-adjacency direction Y (corresponding to the right side in FIG. 1) so as to have a D-shaped cut profile. The base-end portion 32B of the movable section 32 is inserted into the circular through hole 30 formed through the base-end side support portion 26 so as to be capable of sliding therein. A portion on the leading-end portion 32A side of the length direction intermediate portion 32C of the movable section 32 is inserted through the circular through hole 28 formed through the leading-end side support portion 24 so as to be capable of sliding therein.

The movable section 32 slidably inserted through the through holes 28, 30, as described above, is supported so as to be capable of reciprocating movement in a straight line (straight-line moveable) along the reciprocating direction X with respect to the fixed section 12. Namely, the movable section 32 is able to move (slide) in the forward-direction X1 and the retract-direction X2 with respect to the fixed section 12. The leading-end portion 32A side of the movable section 32 projects beyond the fixed section 12 in the forward-direction X1. The leading-end portion 32A of the movable section 32 is configured so as to be pressed against the non-illustrated tension member by the biasing force of the flat spiral spring 34.

Flat Spiral Spring

The flat spiral spring 34 is configured by a plate-shaped spring material (plate spring material), and includes a coil portion 34A formed by the plate spring material being wound into a flat-spiral shape, the inner-end portion 34B extending from an inner end 34A1 of the coil portion 34A toward the center of the coil portion 34A, and an outer-end portion 34C extending from an outer end 34A2 of the coil portion 34A along a direction tangential to the coil portion 34A at the outer end 34A2. Note that although the coil portion 34A according to the present exemplary embodiment is configured by the plate spring material described above being wound into approximately 2.0 full turns, there is no limitation thereto, and the number of turns of the plate spring material in the coil portion 34A may be modified as appropriate.

The flat spiral spring 34 is disposed on the same side of the fixed section body 14 as the movable section 32, in an orientation in which the plate thickness direction of the fixed section body 14 is aligned with the coil axis direction Z of the coil portion 34A. The flat spiral spring 34 is adjacent in the spring-adjacency direction Y to the length direction intermediate portion 32C of the movable section 32. A circular column shaped seat 15 is formed to the fixed section body 14 so as to project toward the flat spiral spring 34, and the flat spiral spring 34 is supported by the seat 15 from one side in the coil axis direction Z.

The inner end 34A1 and the outer end 34A2 of the coil portion 34A are disposed at an edge of the coil portion 34A on the movable section 32 side thereof. A leading end side of the inner-end portion 34B, which extends from the inner end 34A1 of the coil portion 34A toward the center of the coil portion 34A, is bent toward the retract-direction X2, and is hooked over an inner-end fixing member 36 fixed to the seat 15. The inner-end portion 34B of the flat spiral spring 34 is thus anchored to the fixed section 12. The inner-end fixing member 36 is formed with a substantially fan-shaped block profile as viewed along the coil axis direction Z, and is fixed to the seat 15 by a fixing (for example a rivet or screw). The inner-end fixing member 36 is interposed between the inner-end portion 34B and the coil portion 34A.

The outer-end portion 34C of the flat spiral spring 34 has a flat plate shape and extends in the retract-direction X2 from the outer end 34A2 of the coil portion 34A, so as to be disposed in contact with the length direction intermediate portion 32C of the movable section 32. A leading-end portion of the outer-end portion 34C (an end portion on the retract-direction X2 side thereof) is anchored (fixed in this example) to the movable section 32 using an anchor member 40 (for example a rivet or screw). In FIG. 1, the arrow WU indicates a wind-up direction corresponding to a rotation direction to wind-up the flat spiral spring 34, and the arrow RW indicates an unwind direction corresponding to a rotation direction to unwind the flat spiral spring 34.

Back-Up Spring

The back-up spring 92 corresponds to a "resistance force imparting section" and a "wind-up limiting section" of the present invention, and is configured by a plate-shaped spring material having a thickener plate thickness than the plate-shaped spring material configuring the flat spiral spring 34. Note that the spring material configuring the back-up spring 92 is not limited to being formed from metal, and may be formed from a wear-resistant resin, for example. The back-up spring 92 is formed in an incomplete ring shape (C-shape) concentric to the flat spiral spring 34, and includes a ring-shaped portion 92A having an outer circumferential face that contacts an inner circumferential face of the flat spiral spring 34, and an anchor portion 92B extending from one-end portion 92A1 of the ring-shaped portion 92A toward a center S of the ring-shaped portion 92A. The anchor portion 92B is formed in a similar shape to the inner-end portion 34B of the flat spiral spring 34, and is superimposed on the inner-end portion 34B and hooked onto the inner-end fixing member 36. The anchor portion 92B of the back-up spring 92 is thereby anchored to the fixed section 12.

The ring-shaped portion 92A extends from the anchor portion 92B in the wind-up direction WU of the flat spiral spring 34, and the one-end portion 92A1 of the ring-shaped portion 92A is positioned at an end portion on the movable section 32 side of the ring-shaped portion 92A. In the present exemplary embodiment, the ring-shaped portion 92A is formed by the plate-shaped spring material for configuring the back-up spring 92 being wound by less than 1.0 full turn. When viewed along the coil axis direction Z (a direction orthogonal to the page in FIG. 8) this one-end portion 92A1 is disposed at a position 0° around the center S with respect to a virtual straight line VL extending in the spring-adjacency direction Y from the center S of the ring-shaped portion 92A toward the movable section 32. The other-end portion 92A2 of the ring-shaped portion 92A is disposed so as to be separated from the one-end portion 92A1 in the circumferential direction of the ring-shaped portion 92A, such that the ring-shaped portion 92A has a substantially C shape as viewed along the coil axis direction Z. Note that as viewed along the coil axis direction Z, the one-end portion 92A1 of the ring-shaped portion 92A is preferably disposed in a range spanning from the position at 0° about the center S with respect to the virtual straight line VL to a position 90° from the virtual straight line VL in the unwind direction RW (a range of from −90° to 0°, as indicated by 0 in FIG. 1).

Operation and Advantageous Effects

Next, explanation follows regarding operation and advantageous effects of the first exemplary embodiment.

In the tensioner 10 configured as described above, the movable section 32 is displaced in the forward-direction X1 with respect to the fixed section 12 by biasing force of the contact-type flat spiral spring 34, and the leading-end portion 32A of the movable section 32 is thereby pressed against the entrained transmission body such as a timing belt or timing chain through the tension member such as the belt guide or chain guide. The vibrations of the entrained transmission body are thereby buffered by unwinding and winding-up of the flat spiral spring 34, and energy can be absorbed and attenuated by hysteresis characteristics due to the difference between the inter-plate friction force of the flat spiral spring 34 in the unwind direction RW and the wind-up direction WU.

More specifically, when the timing belt or timing chain presses the movable section 32 in a state in which the tension of the timing belt or timing chain is being maintained, the movable section 32 is displaced in the retract-direction X2 with respect to the fixed section 12, and the contact-type flat spiral spring 34 is wound-up. When this occurs, energy of load input to the movable section 32 is effectively attenuated by inter-plate friction force arising in the contact-type flat spiral spring 34, by loss due to bending stress arising in the flat spiral spring 34, and by friction and the like arising between the flat spiral spring 34 and the movable section 32. This enables micro-vibrations of the timing belt or timing chain to be effectively absorbed (suppressed). This reduces mechanical loss of the engine, and thus improves the fuel efficiency of the engine.

Moreover, in the back-up spring 92 configured by a plate-shaped spring material, the outer circumferential face of the ring-shaped portion 92A, which is formed in a ring shape concentric to the flat spiral spring 34, contacts the inner circumferential face of the flat spiral spring 34, and the anchor portion 92B, which extends from the one-end portion of the ring-shaped portion 92A toward the center S of the ring-shaped portion 92A, is anchored to the fixed section 12. When the flat spiral spring 34 is being wound-up, the ring-shaped portion 92A imparts resistance force to counter radial contraction of the flat spiral spring 34 (a biasing force toward the radial direction outer side of the flat spiral spring 34). Excessive winding-up of the flat spiral spring 34 is thereby prevented, and so the behavior of the entrained transmission body can be prevented from becoming unstable due to excessive winding-up (the entrained transmission body can be prevented from flapping excessively). As a result, an abnormal shape of the entrained transmission body can be prevented from arising, and the generation of noise can be prevented. An increase can also be achieved in the inter-plate friction force arising in the flat spiral spring 34 when the flat spiral spring 34 is being wound-up, thereby enabling an improvement to be achieved in the hysteresis characteristics.

Moreover, in the present exemplary embodiment, the back-up spring 92 configured from a plate-shaped spring material serves as a resistance force imparting section (wind-up limiting section), enabling the resistance force imparting section to be configured simply. Moreover, since energy of load input to the movable section 32 is also attenuated by friction arising between the flat spiral spring 34 and the ring-shaped portion 92A when the flat spiral spring 34 is being wound-up, and by loss and the like due to bending stress arising in the back-up spring 92, the hysteresis characteristics can be effectively improved.

Moreover, in the present exemplary embodiment, as viewed along the coil axis direction Z, the one-end portion 92A1 of the ring-shaped portion 92A is disposed in a range of the position at 0° about the center S of the ring-shaped portion 92A with respect to the virtual straight line VL extending along the spring-adjacency direction Y from the center S of the ring-shaped portion 92A toward the movable section 32 side. Namely, a location at the one-end portion 92A1 side of the ring-shaped portion 92A is disposed close to the movable section 32. Note that in cases in which the location at the one-end portion 92A1 side of the ring-shaped portion 92A is disposed away from the movable section 32, load applied to the outer-end portion 34C of the flat spiral spring 34 by displacement of the movable section 32 in the retract-direction X2 would act as bending load on the flat spiral spring 34 and on the back-up spring 92. This would be detrimental to the conversion efficiency into load to wind-up the flat spiral spring 34. This would result in a drop in inter-plate friction force arising in the flat spiral spring 34 and a drop in the hysteresis characteristics. By contrast thereto, in cases in which the location at the one-end portion 92A1 side of the ring-shaped portion 92A is disposed close to the movable section 32 as in the present exemplary embodiment, the load applied to the outer-end portion 34C of the flat spiral spring 34 by displacement of the movable section 32 in the retract-direction X2 is input as rotational torque to the flat spiral spring 34 and to the back-up spring 92, so as to make any difference in curvature small over the entire range of the coil portion 34A and the ring-shaped portion 92A. This facilitates radial contraction of the coil portion 34A and the ring-shaped portion 92A about a fulcrum at the anchor portion 92B while maintaining the true circular shapes thereof. As a result, the load accordingly does not tend to act as bending load on the flat spiral spring 34 and the back-up spring 92, and is readily converted into load to wind-up the flat spiral spring 34. Inter-plate friction force arising in the flat spiral spring 34 increases as a result, improving the hysteresis characteristics.

Note that although in the first exemplary embodiment the ring-shaped portion 92A of the back-up spring 92 is formed by the plate-shaped spring material for configuring the back-up spring 92 being wound into less than 1.0 full turn, there is no limitation thereto. Namely, the ring-shaped portion 92A of the back-up spring 92 may be formed by the plate-shaped spring material for configuring the back-up spring 92 being wound into 1.0 full turn or greater. In such cases, a configuration is achieved in which a location on the other-end portion 92A2 side of the ring-shaped portion 92A is disposed at the ring-shaped portion 92A radial direction outer side with respect to a location on the one-end portion 92A1 side of the ring-shaped portion 92A. Due to adopting such a configuration, when the flat spiral spring 34 is being wound-up, the other-end portion 92A2 side (free-end side) of the ring-shaped portion 92A is prevented from deforming further toward the center of the ring-shaped portion 92A than the one-end portion 92A1 side (anchored end side) of the ring-shaped portion 92A, facilitating uniform radial contraction of the ring-shaped portion 92A at all locations along the circumferential direction. As a result the resistance force imparted from the ring-shaped portion 92A to counter radial contraction of the coil portion 34A of the flat spiral spring 34 is easily caused to act uniformly at all locations along the circumferential direction of the coil portion 34A.

Next, explanation follows regarding other exemplary embodiments of the present invention. Note that configuration and operation that are basically the same as in the exemplary embodiment already explained are appended the same reference numerals as in the exemplary embodiment already explained, and explanation thereof is omitted.

Second Exemplary Embodiment

Figure 5:
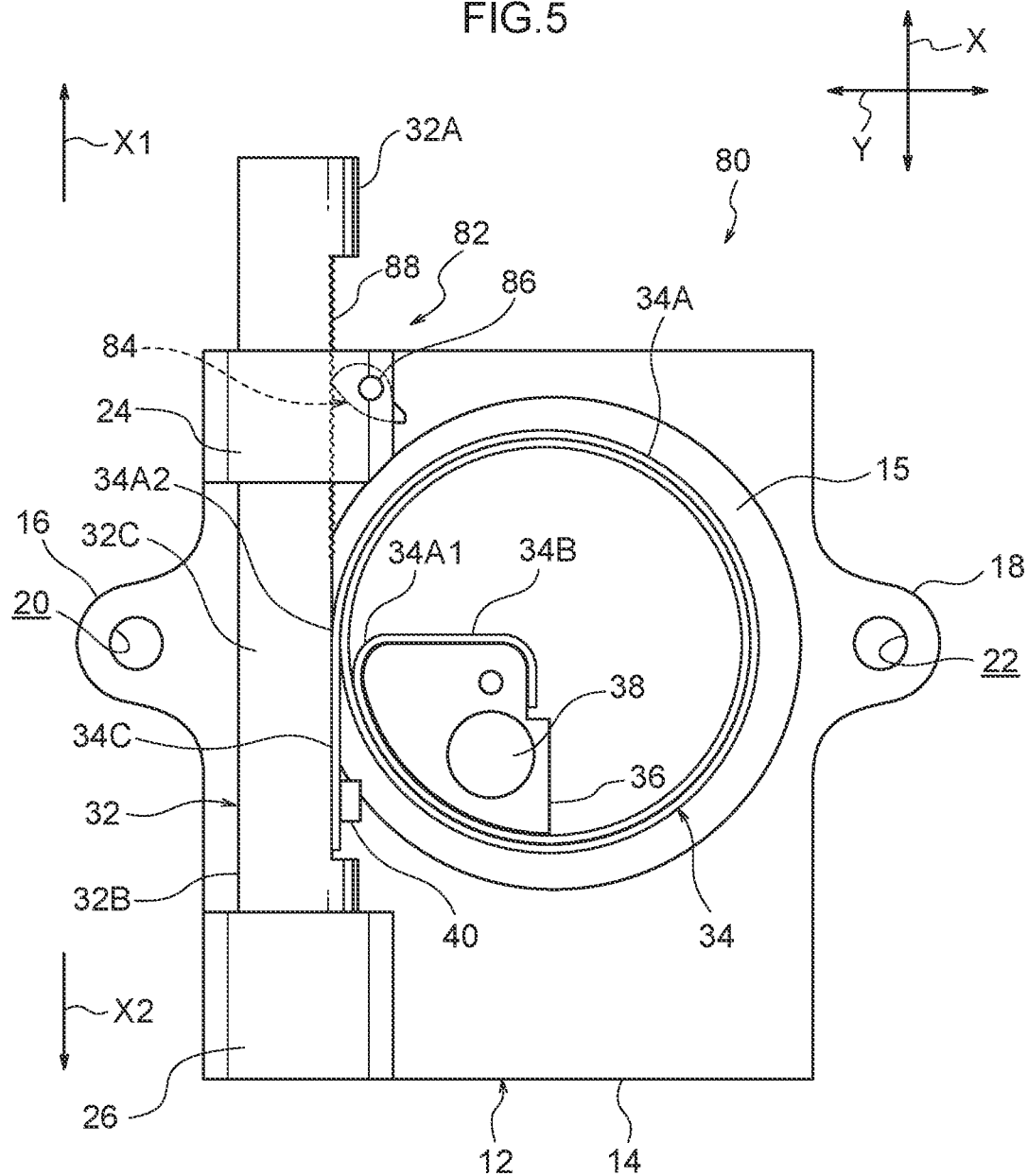
FIG. 5 is a front view illustrating a tensioner according to a second exemplary embodiment of the present invention.
Figure 6:
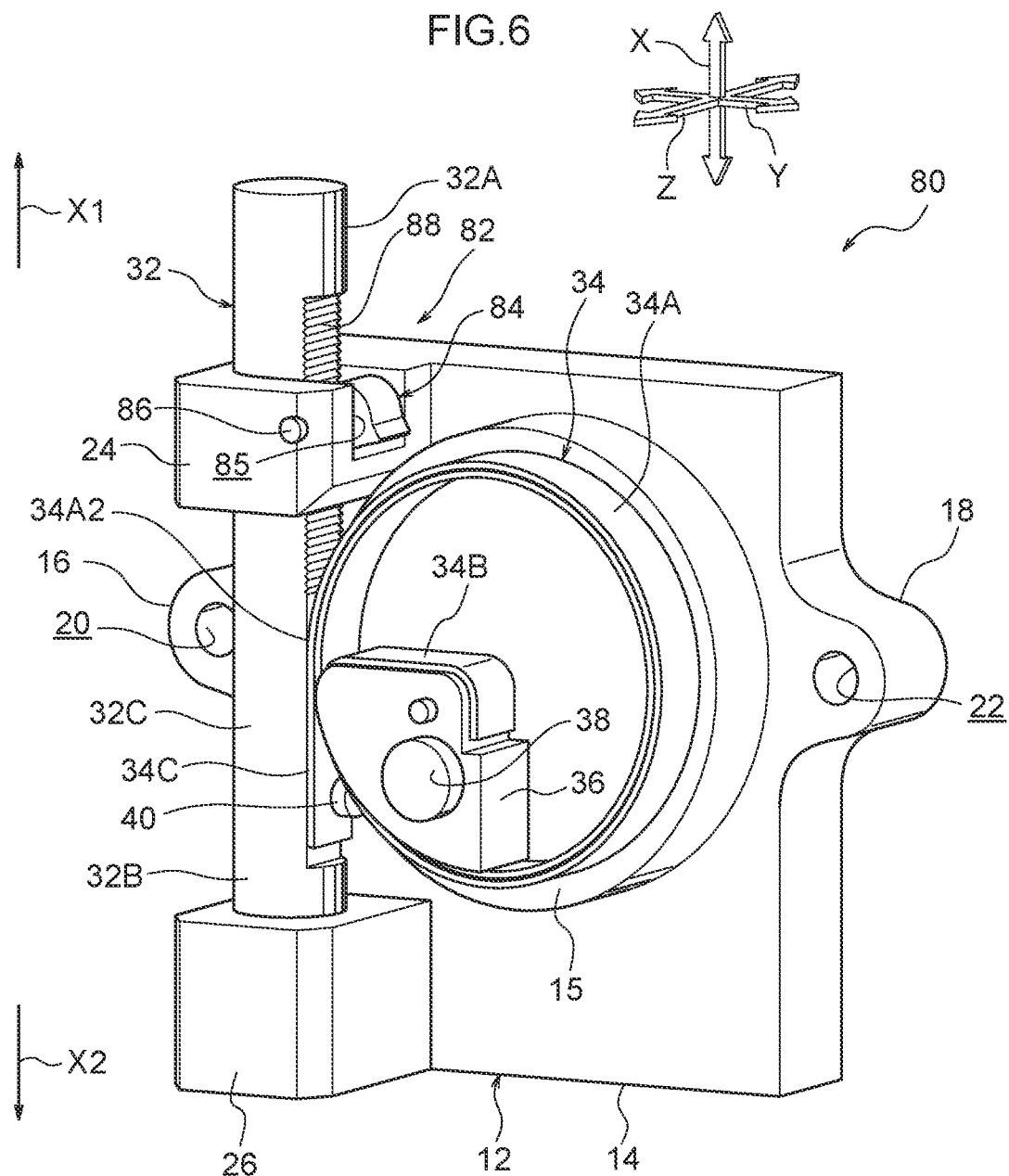
FIG. 6 is a perspective view illustrating a tensioner according to the second exemplary embodiment of the present invention.

FIG. 5 is a front view illustrating a tensioner 80 according to a second exemplary embodiment of the present invention. FIG. 6 is a perspective view illustrating the tensioner 80. Although the tensioner 80 has the same basic configuration as the tensioner 10 according to the first exemplary embodiment, the configuration lacks the back-up spring 92 according to the first exemplary embodiment. Instead, the tensioner 80 includes a ratchet mechanism 82, serving as a displacement limiting section to permit displacement of the movable section 32 toward the tension member (in the forward-direction X1) with respect to the fixed section 12, and to limit displacement of the movable section 32 toward the opposite side to the tension member (in the retract-direction X2). The ratchet mechanism 82 corresponds to a "wind-up limiting section" of the present invention and includes a ratchet member 84 that is supported by the leading-end side support portion 24.

The ratchet member 84 is disposed on one side in the spring-adjacency direction Y (the side on which the flat spiral spring 34 is disposed) with respect to the length direction intermediate portion 32C of the movable section 32, and is disposed in a groove 85 (see FIG. 6) formed in the leading-end side support portion 24. The ratchet member 84 is supported on the leading-end side support portion 24 through a support shaft 86 having an axial direction running in the coil axis direction Z, and is capable of rotating about the support shaft 86. The ratchet member 84 is biased toward one side about the axis of the support shaft 86 by a non-illustrated biasing member provided between the ratchet member 84 and the leading-end side support portion 24. An end portion (leading-end portion) of the ratchet member 84 on the length direction intermediate portion 32C side of the movable section 32 press-contacts the length direction intermediate portion 32C. Plural notches 88 are formed to an end face of the length direction intermediate portion 32C on a ratchet member 84 side thereof so as to be arrayed along the reciprocating direction X. The leading-end portion of the ratchet member 84 engages with the notches 88 so as to limit displacement of the movable section 32 in the retract-direction X2 with respect to the fixed section 12. When the movable section 32 is displaced (advanced) in the forward-direction X1 with respect to the fixed section 12, the ratchet member 84 is rotated toward the other direction about the axis of the support shaft 86 while resiliently deforming the biasing member described above. A configuration is accordingly achieved in which the movable section 32 is permitted to advance.

Other configuration of the present exemplary embodiment is similar to that of the first exemplary embodiment. Thus in the present exemplary embodiment, the vibrations of the entrained transmission body such as the chain or belt are also buffered by unwinding and winding-up of the flat spiral spring 34, and energy can be absorbed and attenuated by hysteresis characteristics due to the difference between the inter-plate friction force of the flat spiral spring 34 in the unwind direction RW and the wind-up direction WU. Moreover, in the present exemplary embodiment the ratchet mechanism 82 permits displacement of the movable section 32 toward the tension member (in the forward-direction X1) with respect to the fixed section 12 and limits displacement of the movable section 32 toward the opposite side to the tension member (in the retract-direction X2) with respect to the fixed section 12. Accordingly, in cases in which an overly large load is input to the movable section 32 from the entrained transmission body through the tension member, the movable section 32 is prevented from displacing (retracting) too far toward the opposite side to the tension member. As a result, the flat spiral spring 34 can be prevented from winding-up excessively accompanying such displacement, thereby enabling the behavior of the entrained transmission body to be prevented from becoming unstable due to such excessive winding-up.

Note that the displacement limiting section is any section that permits displacement of the movable section 32 in the forward-direction X1 and limits displacement of the movable section 32 in the retract-direction X2 (restricts displacement to a given range), namely is a section capable of preventing the movable section 32 from retracting excessively. There is accordingly no limitation to the ratchet mechanism 82 described above, and modifications may be implemented as appropriate. For example, a wedge-shaped anchor piece having a width that tapers on progression toward the retract-direction X2 side may be disposed in a gap between the movable section 32 and the fixed section 12 in a configuration in which the notches formed in the movable section 32 and the anchor piece are caused to engage with each other. Alternatively, for example, the displacement limiting section may be configured employing a resistor ring, saw-toothed thread, worm gear, or the like.

Third Exemplary Embodiment

Figure 7:
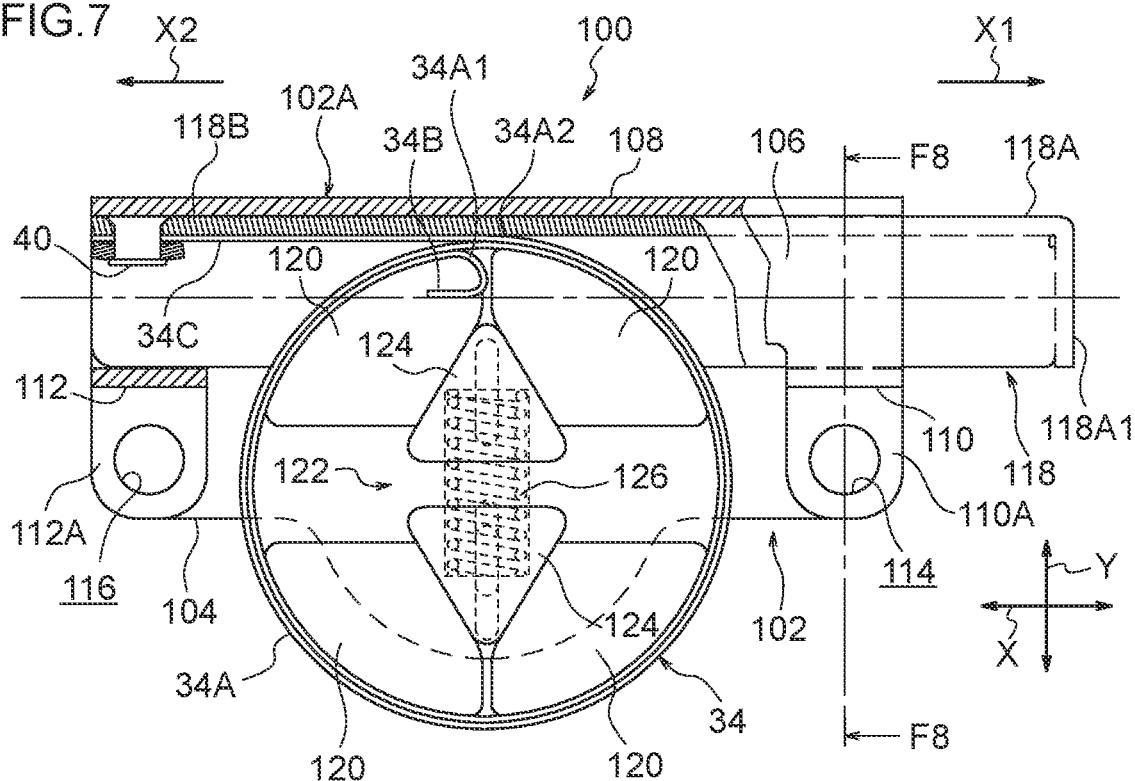
FIG. 7 is a partial cross-section illustrating a tensioner according to a third exemplary embodiment of the present invention.
Figure 8:
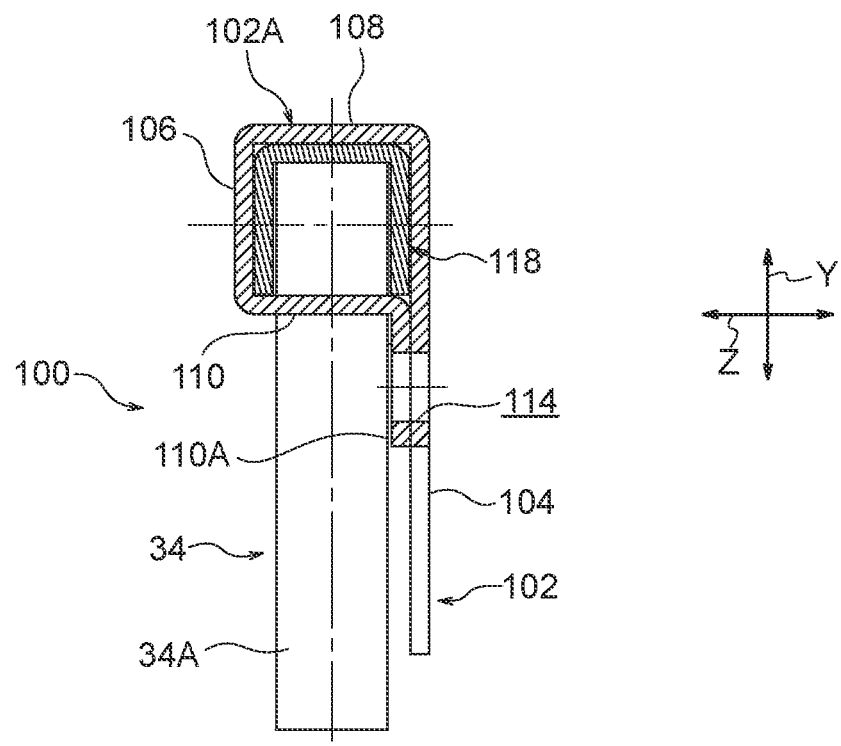
FIG. 8 is a partial cross-section illustrating a tensioner according to the third exemplary embodiment of the present invention, in a state sectioned along line F8-F8 in FIG. 7.

FIG. 7 is a partial cross-section illustrating a tensioner 100 according to a third exemplary embodiment of the present invention as viewed from a front side. FIG. 8 is a partial cross-section illustrating the tensioner 100 in a state sectioned along the line F8-F8 in FIG. 7. The tensioner 100 includes a fixed section 102, a movable section 118, and a flat spiral spring 34, and has the same basic configuration as the tensioner 10 according to the first exemplary embodiment. However, the configuration of the fixed section 102 and the movable section 118 of the tensioner 100 differ from the configuration of the fixed section 12 and the movable section 32 according to the first exemplary embodiment.

The fixed section 102 is formed by press-molding sheet metal, and includes a plate shaped fixed section body 104 having a plate thickness direction in the coil axis direction Z. The fixed section body 104 is formed in a substantially elongated rectangular shape with its length direction extending in the reciprocating direction X as viewed along the coil axis direction Z. One-end side of the fixed section body 104 in a width direction (spring-adjacency direction Y) is bent toward the flat spiral spring 34 so as to form a movable section support section 102A having a substantially U-shaped profile (substantially C-shaped profile). The movable section support section 102A projects out from one width direction end portion of the fixed section body 104 (an end portion on the upper side in FIG. 7 and FIG. 8) toward one side in the coil axis direction Z (the side on which the flat spiral spring 34 and the movable section 118 are disposed). The movable section support section 102A includes an opposing wall 106 that opposes the fixed section body 104 across a gap, and an upper wall 108 linking one width direction end portion of the fixed section body 104 and one width direction end portion of the opposing wall 106 (end portions on the upper side in FIG. 7 and FIG. 8) together in the coil axis direction Z. Moreover, the movable section support section 102A further includes a pair of retention tabs 110, 112 extending toward the fixed section body 104 from both reciprocating direction X end portions of another width direction end portion of the opposing wall 106. Leading-end portions 110A, 112A of the retention tabs 110, 112 are bent in the opposite direction to the upper wall 108 side, and are superimposed on the fixed section body 104. Through holes 114, 116 are respectively formed through the leading-end portions 110A, 112A and the fixed section body 104, so as to penetrate through both the fixed section body 104 and the leading-end portions 110A, 112A. Bolts or the like that have been inserted through the through holes 114, 116 are employed to achieve a configuration in which the fixed section 102 is fixed to the cylinder block of a non-illustrated engine.

The movable section 118 is formed, for example, by press-molding sheet metal, and is formed with an elongated profile having its length running in the reciprocating direction X. The movable section 118 has an open cross-section profile open on the flat spiral spring 34 side as viewed along the reciprocating direction X, and is disposed between the fixed section body 104 and the opposing wall 106. The movable section 118 is restricted from displacing in the spring-adjacency direction Y by the pair of retention tabs 110, 112 and the upper wall 108. However, the movable section 118 is supported so as to be capable of reciprocating movement in a straight line with respect to the fixed section 102 in the reciprocating direction X. A leading-end portion 118A of the movable section 118 projects out beyond the fixed section 102 in the forward-direction X1. A leading end wall 118A1 is provided at a leading end of the movable section 118 so as to have its plate thickness direction in the reciprocating direction X. The leading end wall 118A1 is configured so as to be pressed against the non-illustrated tension member (belt guide, chain guide, or the like). Part of the flat spiral spring 34, including the outer-end portion 34C, is disposed at the inside of the movable section 118. A leading-end portion (an end portion on the retract-direction X2 side) of the outer-end portion 34C of the flat spiral spring 34 is anchored (fixed in this example) to a base-end portion 118B of the movable section 118 by the anchor member 40 (for example a rivet or screw).

In the tensioner 100, plural press-contact members 120 (four in this example) and a biasing portion 122 are disposed at the inside of the coil portion 34A of the flat spiral spring 34. The biasing portion 122 is configured by a pair of wedge shaped members 124 and a compression coil spring 126. The plural press-contact members 120 and the biasing portion 122 configure a resistance force imparting section. The plural press-contact members 120 are arrayed along the circumferential direction of the flat spiral spring 34. The press-contact members 120 are formed with substantially fan-shaped block profiles as viewed along the coil axis direction Z, and circular arc shaped faces of the press-contact members 120 contact the inner circumferential face of the coil portion 34A as viewed along the coil axis direction Z. For example, each of the press-contact members 120 may include a non-illustrated protrusion that protrudes toward the fixed section body 104. These protrusions are each fitted into a non-illustrated groove formed in the fixed section body 104 such that the press-contact members 120 are each supported so as to be capable of displacing with respect to the fixed section body 104 in respective radial directions of the flat spiral spring 34 (radial directions of the coil portion 34A). Note that in the present exemplary embodiment, although the inner-end portion 34B of the flat spiral spring 34 is fixed to one out of the plural press-contact members 120 so as to be anchored to the fixed section 102 through this one press-contact member 120, there is no limitation thereto. A configuration may be adopted in which the inner-end portion 34B of the flat spiral spring 34 is anchored directly to the fixed section 102.

Each of the pair of wedge shaped members 124 is formed with a substantially triangular shaped block profile as viewed along the coil axis direction Z. The pair of wedge shaped members 124 are arrayed along a direction of a diameter of the coil portion 34A (in the spring-adjacency direction Y in this example). The wedge shaped members 124 are each slotted between an adjacent pair of the press-contact members 120. For example, each of the wedge shaped members 124 may include a non-illustrated protrusion that protrudes toward the fixed section body 104. These protrusions are each fitted into a non-illustrated groove formed in the fixed section body 104 such that the wedge shaped members 124 are supported so as to be capable of displacing with respect to the fixed section body 104 in the diameter direction of the flat spiral spring 34 (in the spring-adjacency direction Y in this example).

The compression coil spring 126 is disposed between the pair of wedge shaped members 124. The two axial direction end sides of the compression coil spring 126 are inserted into holes (not appended reference numerals) respectively formed in the pair of wedge shaped members 124. The compression coil spring 126 biases the pair of wedge shaped members 124 in directions away from each other. The plural press-contact members 120 are thereby biased toward the radial direction outer side of the flat spiral spring 34, such that the plural press-contact members 120 are press-contacted against the inner circumferential face of the flat spiral spring 34.

Other configuration of the present exemplary embodiment is similar to that of the first exemplary embodiment. In the present exemplary embodiment the vibrations of the entrained transmission body such as the chain or belt are also buffered by unwinding and winding-up of the flat spiral spring 34, and energy can be absorbed and attenuated by hysteresis characteristics due to the difference between the inter-plate friction force of the flat spiral spring 34 in the unwind direction RW and the wind-up direction WU. Moreover, in the present exemplary embodiment, when the flat spiral spring 34 is being wound-up, the plural press-contact members 120 arrayed along the circumferential direction of the flat spiral spring 34 impart resistance force to counter radial contraction of the flat spiral spring 34 while receiving biasing force from the compression coil spring 126. As a result, excessive winding-up the flat spiral spring 34 can be prevented, thereby enabling the behavior of the entrained transmission body to be prevented from becoming unstable due to such excessive winding-up.

Moreover, the inter-plate friction force arising in the flat spiral spring 34 can be increased due to imparting resistance force to counter radial contraction of the flat spiral spring 34 in this manner. Furthermore, due to adopting the configuration in which the plural press-contact members 120 arrayed around the circumferential direction of the flat spiral spring 34 are press-contacted against the inner circumferential face of the flat spiral spring 34, a press-contact force is easily caused to act uniformly on all locations along the circumferential direction of the flat spiral spring 34. Moreover, when the flat spiral spring 34 is being wound-up, friction arising between the inner circumferential face of the flat spiral spring 34 and the plural press-contact members 120 enables further improvement to the hysteresis characteristics. Moreover, in the present exemplary embodiment, part of the flat spiral spring 34, including the outer-end portion 34C, is disposed at the inside of the movable section 118 that has an open cross-section profile open on the flat spiral spring 34 side as viewed along the reciprocating direction X. This enables a more compact tensioner 100 to be achieved. Moreover, in the present exemplary embodiment, since the fixed section 102 and the movable section 118 are each components press-molded from sheet metal, manufacturing Takt can be reduced, and a reduction in manufacturing costs is facilitated, in comparison to cases in which manufacture of the fixed section 102 and the movable section 118 involves machining, forging, or the like. A reduction in weight of the fixed section 102 and the movable section 118 is also facilitated.

Fourth Exemplary Embodiment

Figure 9:
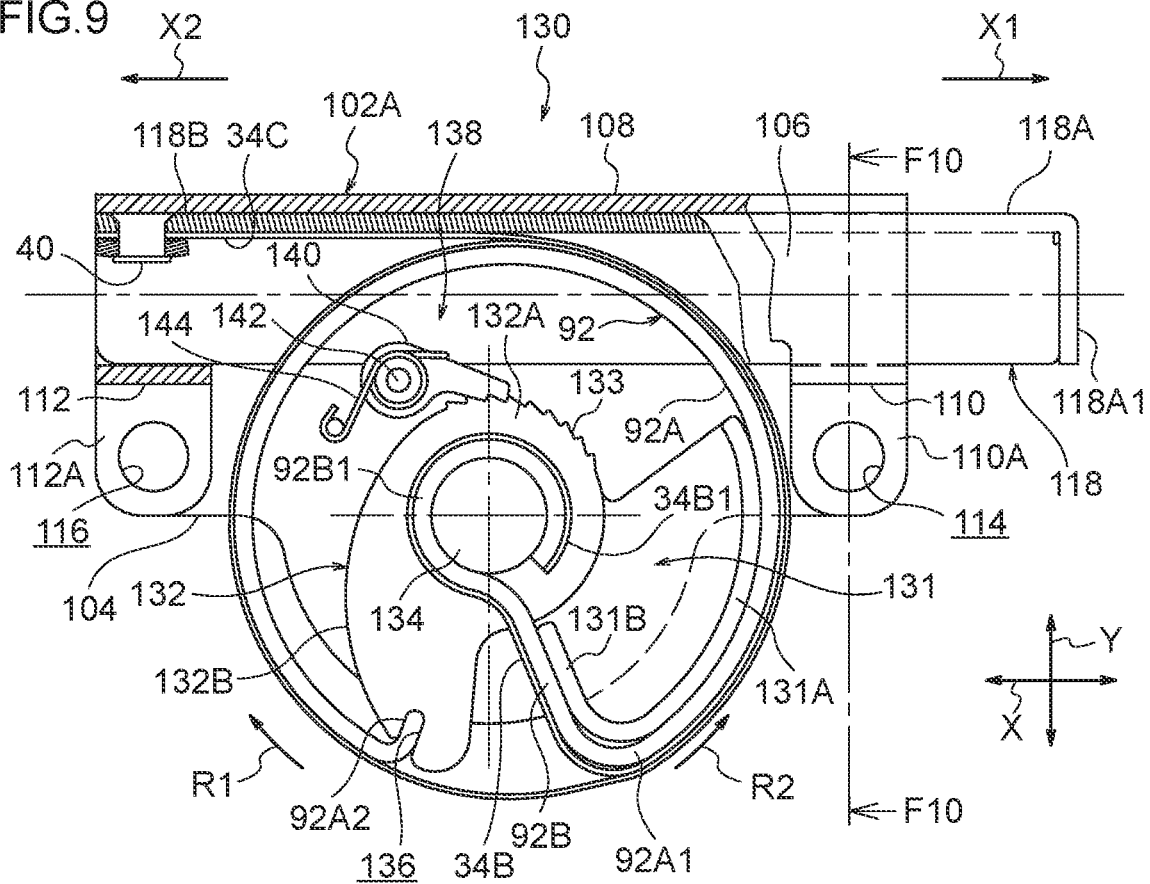
FIG. 9 is a partial cross-section illustrating a tensioner according to a fourth exemplary embodiment of the present invention.
Figure 10:
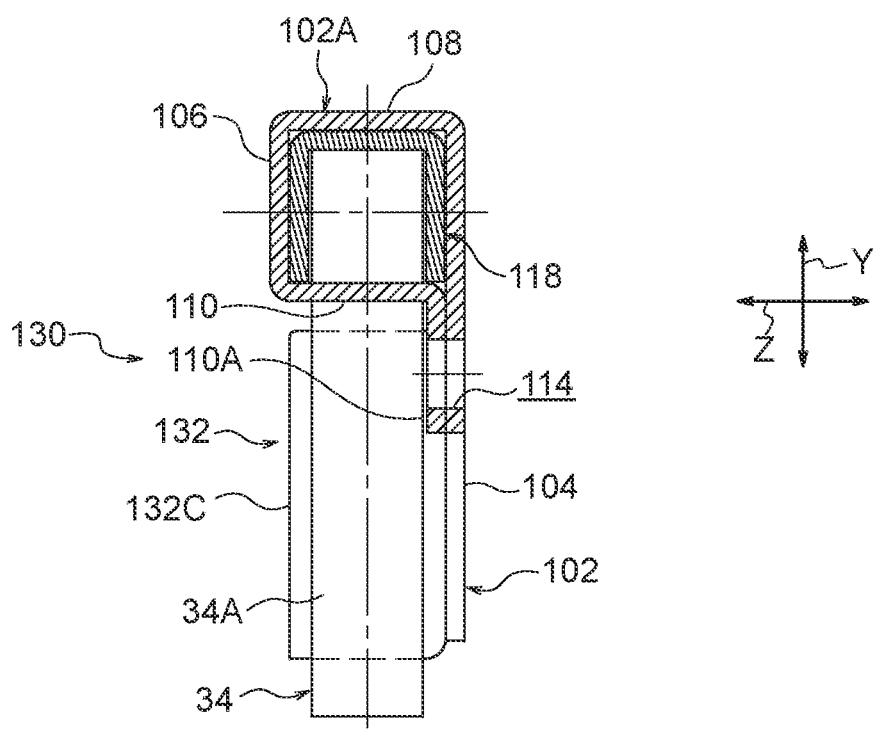
FIG. 10 is a partial cross-section illustrating a tensioner according to the fourth exemplary embodiment of the present invention, in a state sectioned along line F10-F10 in FIG. 9.

FIG. 9 is a partial cross-section illustrating a tensioner 130 according to a fourth exemplary embodiment of the present invention, as viewed from the front side. FIG. 10 is a partial cross-section illustrating the tensioner 130 in a state sectioned along line F10-F10 in FIG. 9. The tensioner 130 includes a flat spiral spring 34, a fixed section 102, and a movable section 118 that are similar to the flat spiral spring 34, the fixed section 102, and the movable section 118 according to the third exemplary embodiment. However, the tensioner 130 lacks the plural press-contact members 120 or the biasing portion 122 according to the third exemplary embodiment, and is instead provided with a back-up spring 92, serving as a resistance force imparting section. The back-up spring 92 has the same basic configuration as the back-up spring 92 according to the first exemplary embodiment, and includes the ring-shaped portion 92A and the anchor portion 92B.

Moreover, the tensioner 130 includes a radial-contraction restriction member 132 and a rotation ratchet mechanism 138. The radial-contraction restriction member 132 is disposed at the inside of the ring-shaped portion 92A as viewed along the coil axis direction Z, is supported so as to be capable of rotating with respect to the fixed section 102 about an axis running in the coil axis direction Z, and is engaged with the other-end portion 92A2 of the ring-shaped portion 92A. The rotation ratchet mechanism 138 serves as a rotation limiting section that permits the radial-contraction restriction member 132 to rotate in one direction (the arrow R1 direction in FIG. 9) about the axis with respect to the fixed section 102 interlocked to radial enlargement of the ring-shaped portion 92A, and limits the radial-contraction restriction member 132 from rotating in the other direction (the arrow R2 direction in FIG. 9) about the axis with respect to the fixed section 102 interlocked to radial contraction of the ring-shaped portion 92A. Detailed explanation follows regarding this configuration.

In the present exemplary embodiment, a leading-end portion of the anchor portion 92B of the back-up spring 92 configures a bent portion 92B1 bent into the shape of a ring concentric to the flat spiral spring 34. A support shaft 134 projecting from the fixed section body 104 in a circular column shaped is fitted inside the bent portion 92B1. The support shaft 134 is formed in a shape concentric to the coil portion 34A of the flat spiral spring 34 and to the ring-shaped portion 92A of the back-up spring 92.

Moreover, in the present exemplary embodiment, the inner-end portion 34B of the flat spiral spring 34 is formed in a similar shape to the anchor portion 92B of the back-up spring 92, and a bent portion 34B1 bent into a ring shape concentric to the flat spiral spring 34 is formed at a leading-end portion of the inner-end portion 34B. The inner-end portion 34B is superimposed on the anchor portion 92B, and the bent portion 34B1 is wound onto an outer circumferential face of the bent portion 92B1. The inner-end portion 34B of the flat spiral spring 34 is thereby anchored to the fixed section 102.

The other-end portion 92A2 of the ring-shaped portion 92A of the back-up spring 92 is engaged with the radial-contraction restriction member 132. The radial-contraction restriction member 132 is disposed at the inside of the coil portion 34A of the flat spiral spring 34 and the inside of the ring-shaped portion 92A. The radial-contraction restriction member 132 is, for example, formed from metal, and includes a shaft bearing portion 132A formed with a substantially ring shaped profile as viewed along coil axis direction Z. The shaft bearing portion 132A is disposed between the fixed section body 104 and the respective bent portions 34B1, 92B1 of the flat spiral spring 34 and the back-up spring 92. The support shaft 134 is rotatably fitted inside the shaft bearing portion 132A. The radial-contraction restriction member 132 is thus supported so as to be capable of rotating about the axis of the support shaft 134 (about an axis running in the coil axis direction Z) with respect to the fixed section 102.

Another-end side support portion 132B extends from a portion of the outer periphery of the shaft bearing portion 132A toward the other-end portion 92A2 of the ring-shaped portion 92A. The other-end portion 92A2 of the ring-shaped portion 92A is bent toward the center of the ring-shaped portion 92A, and is fitted inside a notch 136 formed in a leading-end portion of the other side support portion 132B. The other-end portion 92A2 of the ring-shaped portion 92A is thus supported by (coupled to) the radial-contraction restriction member 132. A one-end side fixed section 131 is disposed between the shaft bearing portion 132A and the one-end side of the ring-shaped portion 92A. The one-end side support portion 132C is, for example, formed from sheet metal, and is fixed to the fixed section 104 by means such as welding or the like. The one-end side fixed section 131 is formed with a substantially fan shaped profile when viewed along the coil axis direction Z, with a dimension in a circumferential direction of the ring-shaped portion 92A that increases on progression toward the one-end side of the ring-shaped portion 92A.

An end portion on the ring-shaped portion 92A side of the one-end side fixed section 131 is formed with a circular arc shaped wall 131A extending toward the opposite side to the fixed section body 104 (out of the page in FIG. 9). The circular arc shaped wall 131A is curved to a profile concentric to the ring-shaped portion 92A, and contacts the one-end side of the ring-shaped portion 92A from the circumferential inside of the ring-shaped portion 92A. An end portion of the one-end side fixed section 131 on one side (the arrow R1 direction side in FIG. 9) in the circumferential direction of the ring-shaped portion 92A is formed with a radial direction wall 131B extending toward the opposite side to the fixed section body 104 side (out of the page in FIG. 9). The radial direction wall 131B extends in a radial direction of the ring-shaped portion 92A, is integrally linked to the circular arc shaped wall 131A, and contacts a base-end portion of the anchor portion 92B from one side in the circumferential direction of the ring-shaped portion 92A. The one-end side of the ring-shaped portion 92A and the anchor portion 92B are supported by the one-end side fixed section 131 configured as described above.

The rotation ratchet mechanism 138 includes a ratchet member 140 disposed on the opposite side of shaft bearing portion 132A to the one-end side fixed section 131. The ratchet member 140 is formed with an elongated profile having its length running in the reciprocating direction X. A base-end portion (an end portion on the retract-direction X2 side) of the ratchet member 140 is pierced by a support shaft 142 projecting from the fixed section body 104. The support shaft 142 is formed in a circular column shape with its axial direction running in the coil axis direction Z, and the ratchet member 140 is capable of rotating about the support shaft 142 with respect to the fixed section 102. The ratchet member 140 is biased in one direction about the axis of the support shaft 142 by a torsion coil spring (biasing member) 144 provided spanning between the fixed section body 104 and the ratchet member 140. A leading-end portion (an end portion on the forward-direction X1 side) of the ratchet member 140 is press-contacted against an outer circumferential face of the shaft bearing portion 132A.

Plural ratchet teeth 133 are formed on the outer circumferential face of the shaft bearing portion 132A so as to be arrayed along the circumferential direction of the shaft bearing portion 132A. Rotation of the radial-contraction restriction member 132 in the other direction (arrow R2 direction in FIG. 9) about the axis of the support shaft 134 with respect to the fixed section 102 is limited by a leading-end portion of the ratchet member 140 engaging with the ratchet teeth 133. In the ratchet member 140, when the radial-contraction restriction member 132 is rotated in the one direction (arrow R1 direction in FIG. 9) about the axis of the support shaft 134 with respect to the fixed section 102, the torsion coil spring 144 is rotated in the other direction about the axis of the support shaft 142 while being resiliently deformed. This accordingly achieves a configuration in which the radial-contraction restriction member 132 is permitted to rotate in the one direction about the axis.

Note that although the rotation ratchet mechanism 138 (rotation limiting section), configured by the plural ratchet teeth 133 formed on the radial-contraction restriction member 132 and the ratchet member 140 and so on, is disposed at the inside of the flat spiral spring 34 in the present exemplary embodiment, there is no limitation thereto. For example, as a rotation limiting section, plural ratchet teeth may be formed to part of a radial-contraction restriction member 132 that extends to the outside of the flat spiral spring 34, in a configuration such that a ratchet member disposed at the outside of the flat spiral spring 34 engages with these plural ratchet teeth.

Other configuration of the present exemplary embodiment is similar to that of the third exemplary embodiment. In the present exemplary embodiment, the ring-shaped portion 92A of the back-up spring 92 imparts resistance force to counter radial contraction of the flat spiral spring 34 when the flat spiral spring 34 is being wound-up, and so also has the same basic operation and obtains similar advantageous effects to the first exemplary embodiment.

Moreover, in the present exemplary embodiment, when the movable section 118 displaces in the forward-direction X1 with respect to the fixed section 102 so as to radially enlarge the coil portion 34A of the flat spiral spring 34 and the ring-shaped portion 92A of the back-up spring 92, interlocked to the radial enlargement of the ring-shaped portion, the radial-contraction restriction member 132 is rotated with respect to the fixed section 102 in the one direction (arrow R1 direction in FIG. 9) about an axis running in the coil axis direction Z. When this occurs, this rotation of the radial-contraction restriction member 132 in the one direction about the axis is permitted by the rotation ratchet mechanism 138.

On the other hand, when the entrained transmission body such as a chain or belt presses the movable section 118 such that the movable section 118 attempts to displace with respect to the fixed section 102 in the retract-direction X2, the coil portion 34A of the flat spiral spring 34 and the ring-shaped portion 92A of the back-up spring 92 attempt to undergo radial contraction. When this occurs, although the radial-contraction restriction member 132 attempts to rotate in the other direction (the arrow R2 direction in FIG. 9) about the axis with respect to the fixed section 102 interlocked to the radial contraction of the ring-shaped portion 92A, this rotation of the radial-contraction restriction member 132 in the other direction about the axis is restricted by the rotation ratchet mechanism 138. When the movable section 118 attempts to displace in the retract-direction X2 in a state in which radial contraction of the ring-shaped portion 92A is restricted, the flat spiral spring 34 is wound-up in a state in which radial contraction of the inner circumferential face of the flat spiral spring 34 is restricted by the ring-shaped portion 92A. This accordingly increases inter-plate friction force arising in the flat spiral spring 34. Excessive displacement of the movable section 118 toward the opposite side to the fixed section 102 (in the retract-direction X2) is suppressed as a result, thereby further stabilizing the behavior of the entrained transmission body.

Fifth Exemplary Embodiment

Figure 11:
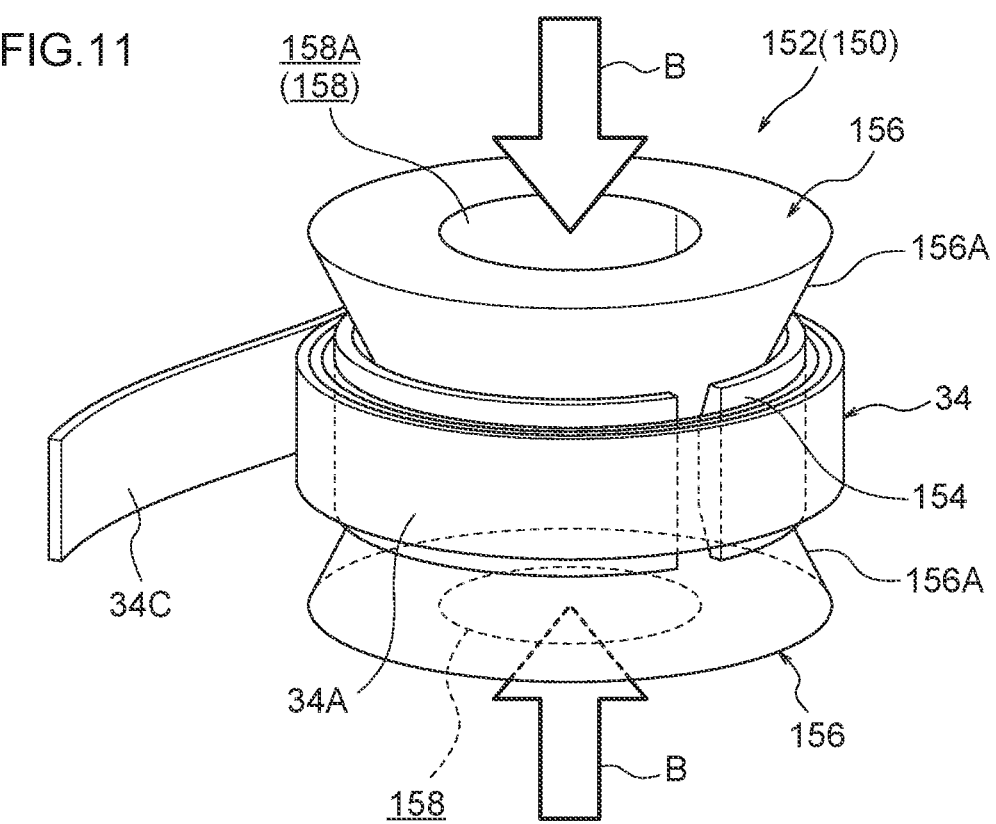
FIG. 11 is a perspective view illustrating part of the configuration of a tensioner according to a fifth exemplary embodiment of the present invention.
Figure 12:
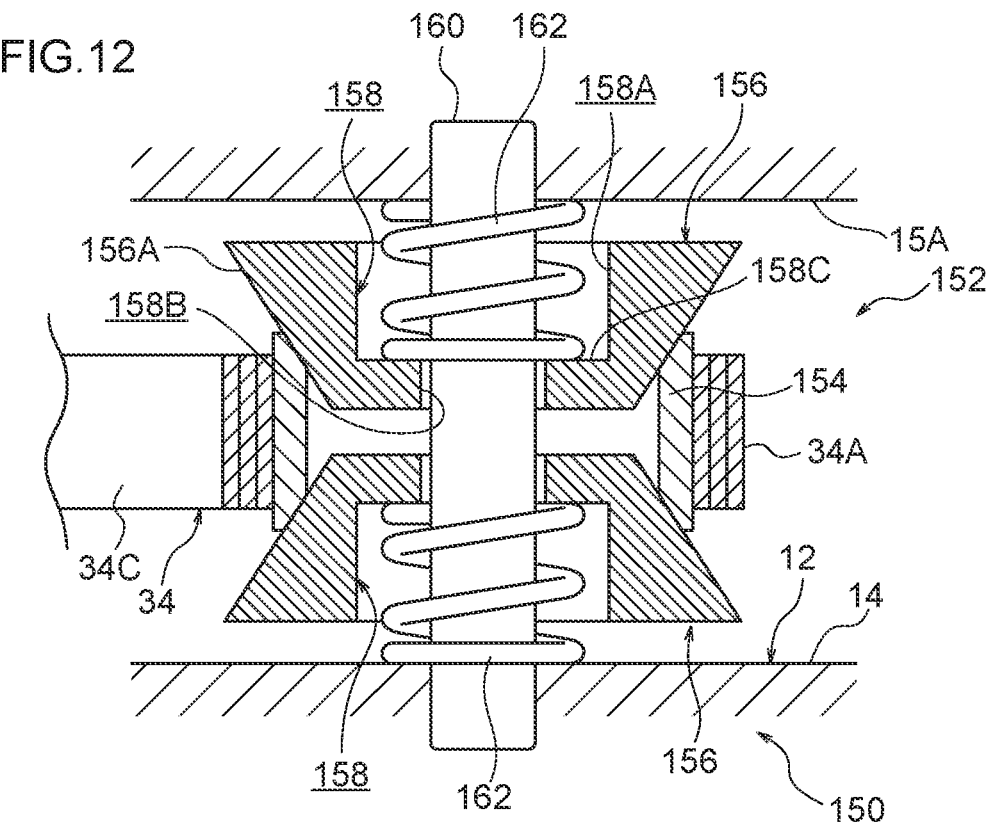
FIG. 12 is a cross-section illustrating part of the configuration of a tensioner according to the fifth exemplary embodiment of the present invention.

FIG. 11 is a perspective view illustrating a partial configuration of a tensioner 150 according to a fifth exemplary embodiment of the present invention. FIG. 12 is a partial cross-section illustrating configuration of the tensioner 150. The tensioner 150 is configured similarly to the tensioner 10 according to the first exemplary embodiment except in that a different resistance force imparting section 152 is provided therein to the back-up spring 92 (resistance force imparting section) according to the first exemplary embodiment. The resistance force imparting section 152 includes a back-up spring 154 similar to the back-up spring 92, a pair of axial-movement members 156, and a pair of compression coil springs 162. The pair of compression coil springs 162 correspond to a "resilient member" of the present invention.

The back-up spring 154 is formed from a plate-shaped spring material, and is configured in an incomplete ring shape (C-shape) concentric to the flat spiral spring 34. The back-up spring 154 is disposed with an outer circumferential face in a state of contact with the inner circumferential face of the flat spiral spring 34.

Figure 13:
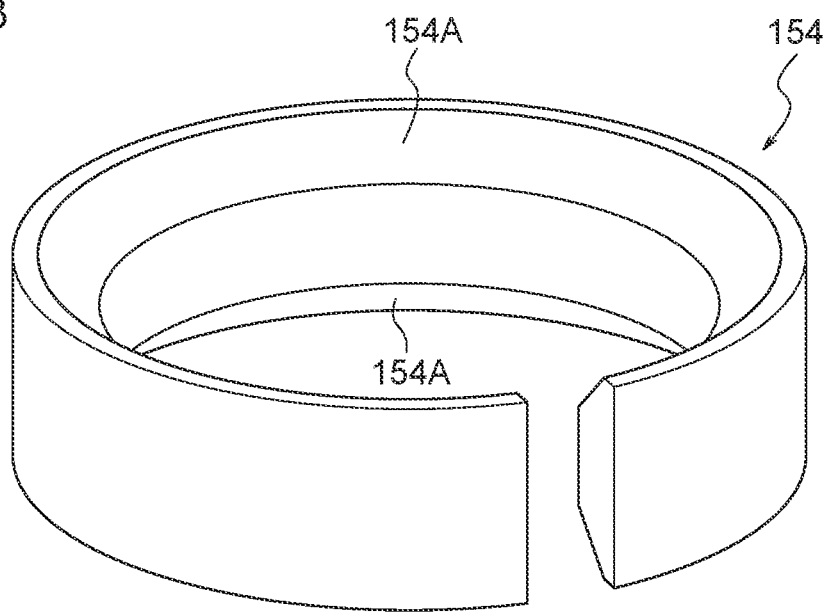
FIG. 13 is a perspective view illustrating a back-up spring according to the fifth exemplary embodiment of the present invention.

The pair of axial-movement members 156 are, for example, formed from metal in truncated cone shapes, and are disposed coaxially to the flat spiral spring 34 at each side of the flat spiral spring 34 in the coil axis direction Z. These axial-movement members 156 have outer circumferential faces 156A that decrease in diameter on progression toward the coil axis direction center of the flat spiral spring 34. The outer circumferential faces 156A are disposed in a state of contact with inner circumferential portions (inner circumferential faces) of the back-up spring 154. Note that, as illustrated in FIG. 13, taper faces 154A (reference numerals are omitted except in FIG. 13) are formed at two axial direction end portions of the inner circumferential portions of the back-up spring 154, and have diameters that increase on progression toward the two axial direction ends of the back-up spring 154. The taper faces 154A respectively make face-to-face contact with the outer circumferential faces 156A of the axial-movement members 156.

Circular through holes 158 are formed in an axis direction through each of the axial-movement members 156 at axial center portions (radial direction center portions) of the pair of axial-movement members 156. These through holes 158 are formed with a large diameter portion 158A at an outside location in the coil axis direction Z, with a small diameter portion 158B at an inside location in the coil axis direction Z. A step 158C is formed between the large diameter portion 158A and the small diameter portion 158B. A circular rod shaped support shaft 160 is inserted through the large diameter portion 158A and the small diameter portion 158B. One axis direction end portion of the support shaft 160 is fixed to the fixed section body 14 of the fixed section 12. The fixed section 12 according to the present exemplary embodiment includes an opposing portion 15A opposing the fixed section body 14. The opposing portion 15A is, for example, fixed to the leading-end side support portion 24 and the base-end side support portion 26 (see FIG. 1 to FIG. 4). An axial direction other-end portion of the support shaft 160 is fixed to the opposing portion 15A. The two axial direction end portions of the support shaft 160 are thereby fixed to the fixed section 12, and the axial-movement members 156 are supported by the fixed section 12 through the support shaft 160. The axial-movement members 156 are accordingly configured so as to be displaceable in the coil axis direction Z with respect to the fixed section 12.

Moreover, the compression coil springs 162 are respectively disposed inside the large diameter portion 158A of the axial-movement members 156. The compression coil springs 162 are disposed in a state in which the support shaft 160 has been inserted through inside. One of the compression coil springs 162 is compressed between the step 158C of one of the axial-movement members 156 and the fixed section body 14. The other of the compression coil springs 162 is compressed between the step 158C of the other of the axial-movement members 156 and the opposing portion 15A. The pair of axial-movement members 156 are thereby biased in directions so as to approach each other (see arrows B in FIG. 11).

Other configuration of the present exemplary embodiment is similarly to that of the first exemplary embodiment. Thus the present exemplary embodiment is also able to buffer vibrations of the entrained transmission body such as a chain or belt by unwinding and winding-up of the flat spiral spring 34, and is able to absorb and attenuate energy by hysteresis characteristics due to the difference between the inter-plate friction force of the flat spiral spring 34 in the unwind direction and the wind-up direction.

Moreover, in the present exemplary embodiment, the outer circumferential face of the back-up spring 154 formed in an incomplete ring shape from the plate-shaped spring material contacts the inner circumferential face of the flat spiral spring 34. Thus the back-up spring 154 imparts resistance force to counter radial contraction of the flat spiral spring when the flat spiral spring 34 is being wound-up. Thus in this manner the back-up spring 154 configured from the plate-shaped spring material serves as a resistance force imparting section, enabling a resistance force imparting section to be configured simply. Moreover, the hysteresis characteristics can be further improved due to the friction and the like arising between the flat spiral spring 34 and the back-up spring 154 when the flat spiral spring 34 is being wound-up.

Moreover, in the present exemplary embodiment, the pair of axial-movement members 156 are disposed coaxially to the flat spiral spring 34 at each side of the flat spiral spring 34 in the coil axis direction Z, and are supported so as to be displaceable with respect to the fixed section 12 in the coil axis direction Z. In the axial-movement members 156, the outer circumferential faces 156A, having diameters that decrease on progression toward the coil axis direction center of the flat spiral spring 34, contact the inner circumferential portions of the back-up spring 154, and are biased in directions to approach each other by the pair of compression coil springs 162. The back-up spring 154 is supported from the inner circumferential side by the axial-movement members 156, and so the back-up spring 154 is easily deformed uniformly at all locations along the circumferential direction. The flat spiral spring 34 accordingly receives a uniform surface pressure from the back-up spring 154, enabling localized wear of the flat spiral spring 34 and the back-up spring 154 to be suppressed, and stabilizing the unwinding and winding-up of the flat spiral spring 34.

Moreover, in the present exemplary embodiment, the back-up spring 154 is pressed toward the radial direction outer side by the pair of axial-movement members 156, and so load (back-up load) to support the flat spiral spring 34 from the radial direction inner side can be increased even without increasing the plate thickness of the back-up spring 154. Furthermore, in the present exemplary embodiment the back-up spring 154 is not configured so as to be supported by the fixed section 12 in a cantilevered manner, and is instead configured so as to be supported by the pair of axial-movement members 156. Deflection of the back-up spring 154 does not therefore affect the load absorbing characteristics of the tensioner 150.

Sixth Exemplary Embodiment

Figure 14:
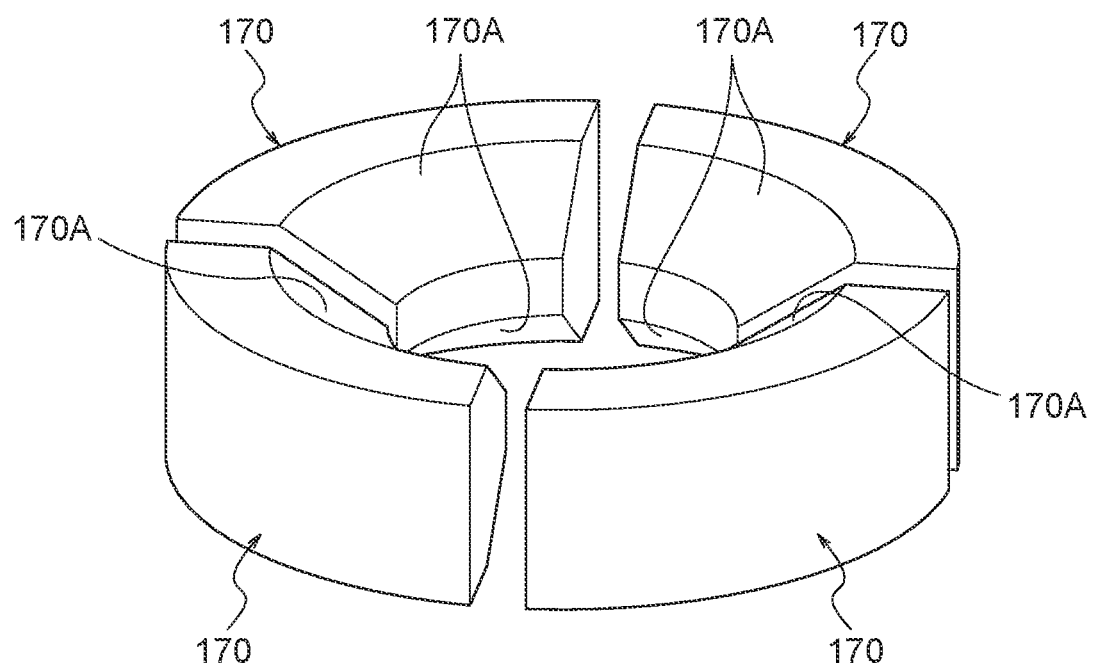
FIG. 14 is a perspective view illustrating plural press-contact members provided to a tensioner according to a sixth exemplary embodiment of the present invention.

FIG. 14 is a perspective view illustrating plural (four in this example) press-contact members 170 provided to a tensioner according to a sixth exemplary embodiment of the present invention. The tensioner according to the present exemplary embodiment is configured similarly to the third exemplary embodiment, and the plural press-contact members 170 are disposed inside the flat spiral spring 34 so as to be arrayed along the circumferential direction of the flat spiral spring 34. Moreover, the tensioner according to the present exemplary embodiment includes a biasing portion different from the biasing portion 122 according to the third exemplary embodiment. This biasing portion includes a pair of axial-movement members 156 and a pair of compression coil springs 162 similar to the pair of axial-movement members 156 and the pair of compression coil springs 162 according to the fifth exemplary embodiment (see FIG. 11 and FIG. 12, omitted in FIG. 14). Outer circumferential faces 156A of the pair of axial-movement members 156 in this biasing portion contact the plural press-contact members 170 from the flat spiral spring 34 radial direction inner side. Note that curved faces 170A that make face-to-face contact with the outer circumferential faces 156A of the axial-movement members 156 are formed to portions at both coil axis direction Z sides of the plural press-contact members 170. Moreover, the fixed section 12 in this exemplary embodiment, similarly to the fixed section 12 according to the third exemplary embodiment, includes a fixed section body 14 to which an axial direction one-end portion of the support shaft 160 is fixed, and an opposing section (not illustrated in the drawings) to which the axial direction other-end portion of the support shaft 160 is fixed.

Other configuration of this exemplary embodiment is similar to in the third exemplary embodiment. Thus similar operation and advantageous effects are obtained in this exemplary embodiment to those of the third exemplary embodiment. Moreover, in the pair of axial-movement members 156 of this exemplary embodiment, the outer circumferential faces 156A have diameters that decrease on progression toward the coil axis direction center of the flat spiral spring 34 and make contact with the plural press-contact members 170 from the flat spiral spring 34 radial direction inner side, and are biased by the pair of compression coil springs 162 in directions to approach each. The plural press-contact members 170 can thereby be made to uniformly press-contact the inner circumferential face of the flat spiral spring 34 through these axial-movement members 156. As a result localized wear of the flat spiral spring 34 and the plural press-contact members 170 can be suppressed, and the unwinding and winding-up of the flat spiral spring 34 is stabilized.

Seventh Exemplary Embodiment

Figure 15:
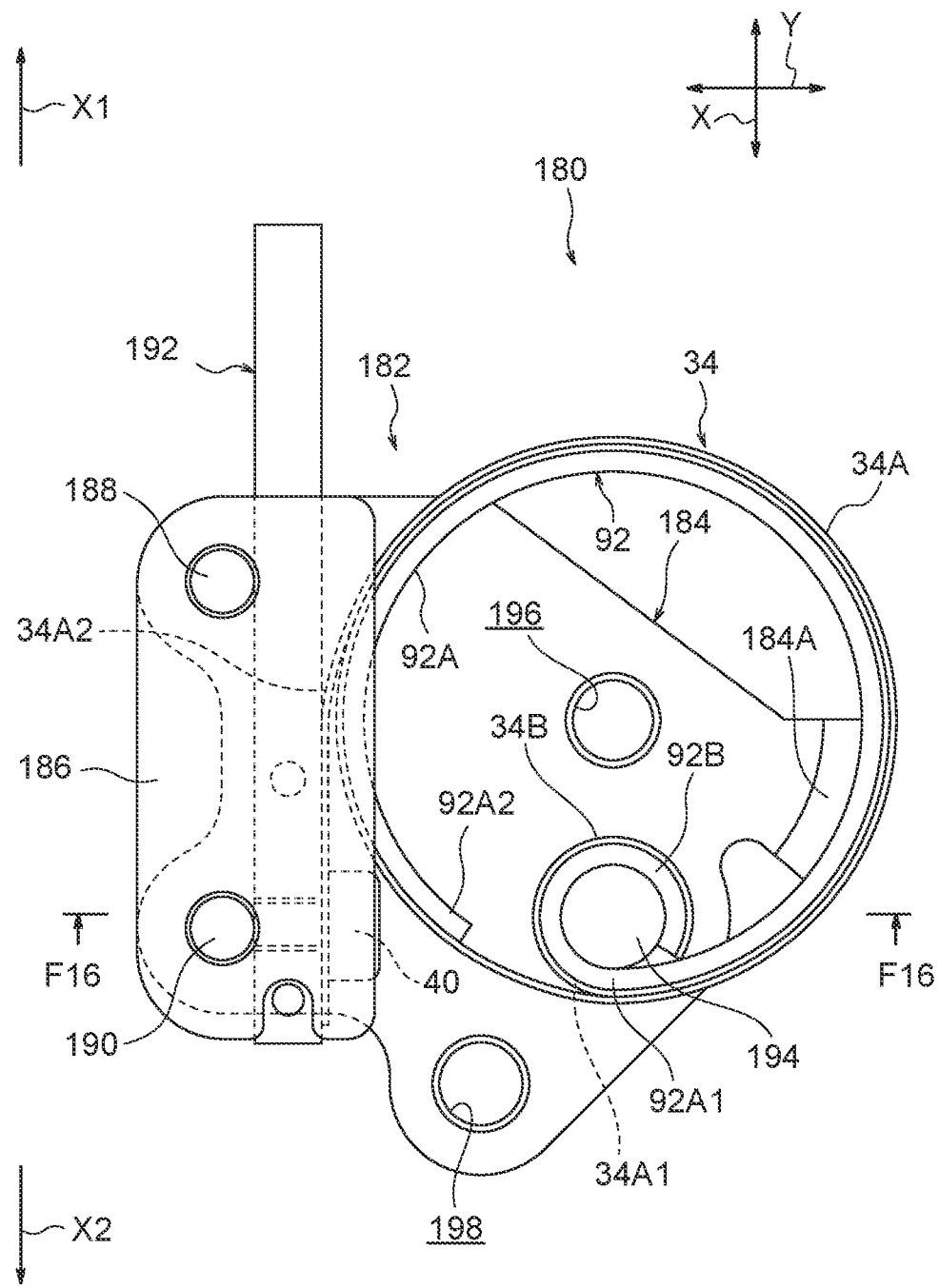
FIG. 15 is a front view illustrating a tensioner according to seventh exemplary embodiment of the present invention.
Figure 16:
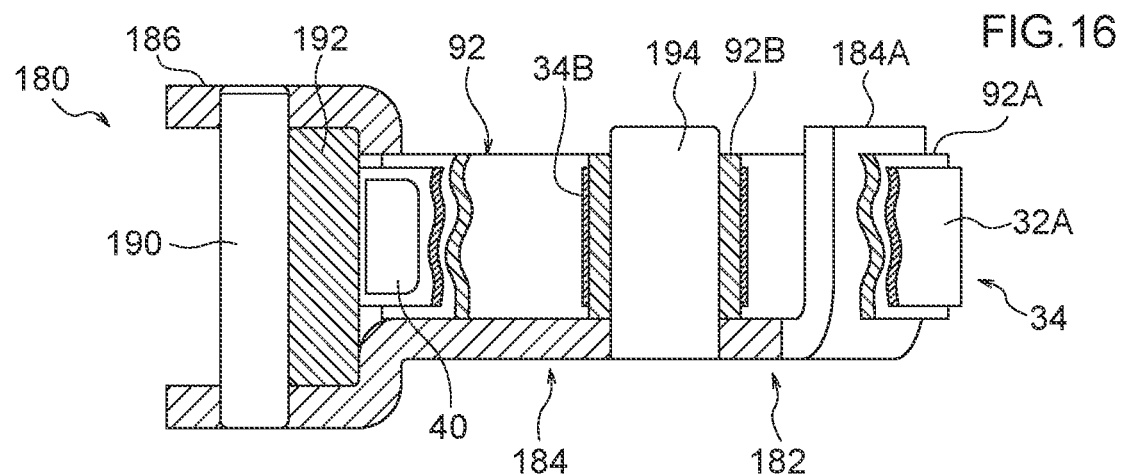
FIG. 16 is a cross-section illustrating a cross-section taken along line F16-F16 of FIG. 15.

FIG. 15 is a partial cross-section illustrating a tensioner 180 according to a seventh exemplary embodiment of the present invention, as viewed from the front side. FIG. 16 is a cross-section taken along line F16-F16 in FIG. 15. Although the tensioner 180 is configured similarly to the tensioner 10 according to the first exemplary embodiment, a fixed section 182 and a movable section 192 made from sheet metal are provided instead of the fixed section 12 and the movable section 32 according to the first exemplary embodiment. The fixed section 182 includes a plate shaped fixed section body 184 having a plate thickness direction in the coil axis direction Z, a plate shaped retention plate 186 opposing the fixed section body 184 in the coil axis direction Z, and a pair of pin members 188, 190 linking the fixed section body 184 and the retention plate 186 together in the coil axis direction Z. The fixed section body 184 and the retention plate 186 are each components press-molded from sheet metal, and the pin members 188, 190 are configured from metal rod members.

The retention plate 186 is set with a smaller dimension in the spring-adjacency direction Y than the fixed section body 184, and is disposed on the opposite side of the movable section 192 to the fixed section body 184. The pair of pin members 188, 190 are formed in circular column shapes having axial directions running in the coil axis direction Z. The pin members 188, 190 are disposed on the opposite side of the movable section 192 to the flat spiral spring 34, and are separated from each other in the reciprocating direction X. Respective end portions at one axial direction side of the pin members 188, 190 are fitted into corresponding circular through holes (not appended reference numerals) formed in the fixed section body 184, and respective end portions at the other axial direction side of the pin members 188, 190 are fitted into corresponding circular through holes (not appended reference numerals) formed in the retention plate 186. The pin members 188, 190 are fixed to the fixed section body 184 and the retention plate 186 by means such as swaging, welding, or the like, and the retention plate 186 is supported by the fixed section body 184 through the pin members 188, 190.

Figure 17A:
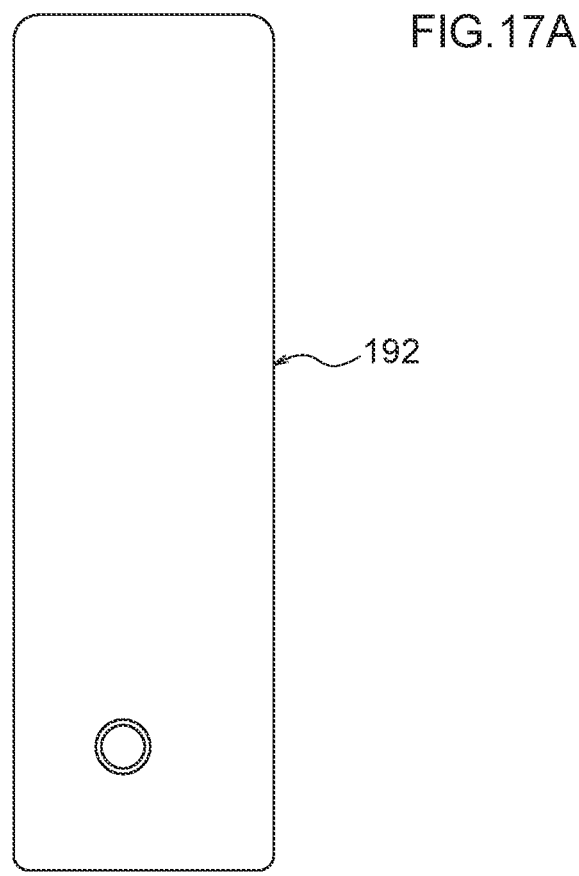
FIG. 17A is a side view illustrating a movable section according to the seventh exemplary embodiment of the present invention.
Figure 17B:
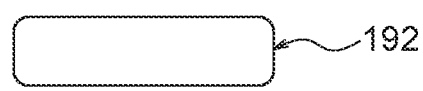
FIG. 17B is an end-on view illustrating a movable section according to the seventh exemplary embodiment of the present invention.

The movable section 192 is formed by punching out and press-molding sheet metal, and has an elongated flat plate shape, as illustrated in FIG. 17A and FIG. 17B. The movable section 192 has a length direction aligned with the reciprocating direction X and a plate thickness direction aligned with the spring-adjacency direction Y. The movable section 192 is disposed between the pair of pin members 188, 190 and the flat spiral spring 34. Displacement of the movable section 192 in the coil axis direction Z is restricted by the fixed section body 184 and the retention plate 186. A leading-end portion (an end portion on the retract-direction X2 side) of the outer-end portion 34C of the flat spiral spring 34 is anchored (fixed in this example) to the movable section 192 by the anchor member 40 (for example a rivet or screw).

The inner-end portion 34B of the flat spiral spring 34 and the anchor portion 92B of the back-up spring 92 are bent into substantially circular cylinder shapes having axial directions along the coil axis direction Z in a mutually superimposed state, and are wrapped around a circular column shaped anchor pin 194 projecting from the fixed section body 184. The anchor pin 194 is fixed to the fixed section body 184 by means such as swaging, welding, or the like, such that the anchor portion 92B and the inner-end portion 34B are anchored to the fixed section 102 through the anchor pin 194.

An abutting portion 184A is formed at an end portion on the opposite side of the fixed section body 184 to the side on which the movable section 192 is disposed, so as to extend toward the inside (one side in the coil axis direction Z) of the back-up spring 92. The abutting portion 184A corresponds to an "inner circumferential support portion" of the present invention. The abutting portion 184A is curved into a circular arc shape concentric to the back-up spring 92, and contacts (engages with) the inner circumferential face of the back-up spring 92. The back-up spring 92 is supported from the circumferential inside by the abutting portion 184A.

A pair of through holes 196, 198 are formed in the fixed section body 184 so as to penetrate through the fixed section body 184 in the coil axis direction Z at a vicinity of the center of the fixed section body 184 in the spring-adjacency direction Y. The through holes 196, 198 are disposed so as to be separated from each other in the reciprocating direction X. This thereby achieves a configuration in which the fixed section 182 is fixed to the cylinder block of a non-illustrated engine using bolts or the like inserted through the through holes 196, 198.

Other configuration of the present exemplary embodiment is similar to that of the first exemplary embodiment. The present exemplary embodiment accordingly also has the same basic operation and obtains similar advantageous effects as the first exemplary embodiment. Moreover, in the present exemplary embodiment the movable section 192 is a component press-molded from sheet metal and has a flat plate shape. The movable section 192 can therefore by manufactured by punching from sheet metal. This enables a reduction in size and weight to be achieved for the movable section 192, and enables a further reduction in manufacturing costs. Moreover, in the present exemplary embodiment the fixed section 182 is predominantly configured from sheet metal, thereby facilitating a reduction in weight of the fixed section 182.

Furthermore, in the present exemplary embodiment, the abutting portion 184A provided on the opposite side of the fixed section 182 to the movable section 192 contacts the inner circumferential face of the back-up spring 92. The back-up spring 92 is accordingly supported in a cantilevered manner by the fixed section 182, facilitating uniform (even) deformation when the flat spiral spring 34 is being wound-up, and enabling localized wear to be suppressed from occurring in the flat spiral spring 34 and the back-up spring 92. Winding-up of the flat spiral spring 34 is also stabilized (it becomes easier to achieve even winding-up along the circumferential direction of the flat spiral spring 34). Moreover, part of the fixed section body 184 can be bent to form the abutting portion 184A, thereby facilitating manufacture of the abutting portion 184A, rendering additional components unnecessary, and enabling an increase in manufacturing costs to be suppressed. Note that the abutting portion 184A (inner circumferential support portion) may be formed as a separate body to the fixed section body 184 and then fixed to the fixed section body 184. Moreover, the inner circumferential support portion may make indirect contact with the inner circumferential face of the back-up spring through a separate member.

Eighth Exemplary Embodiment

Figure 18:
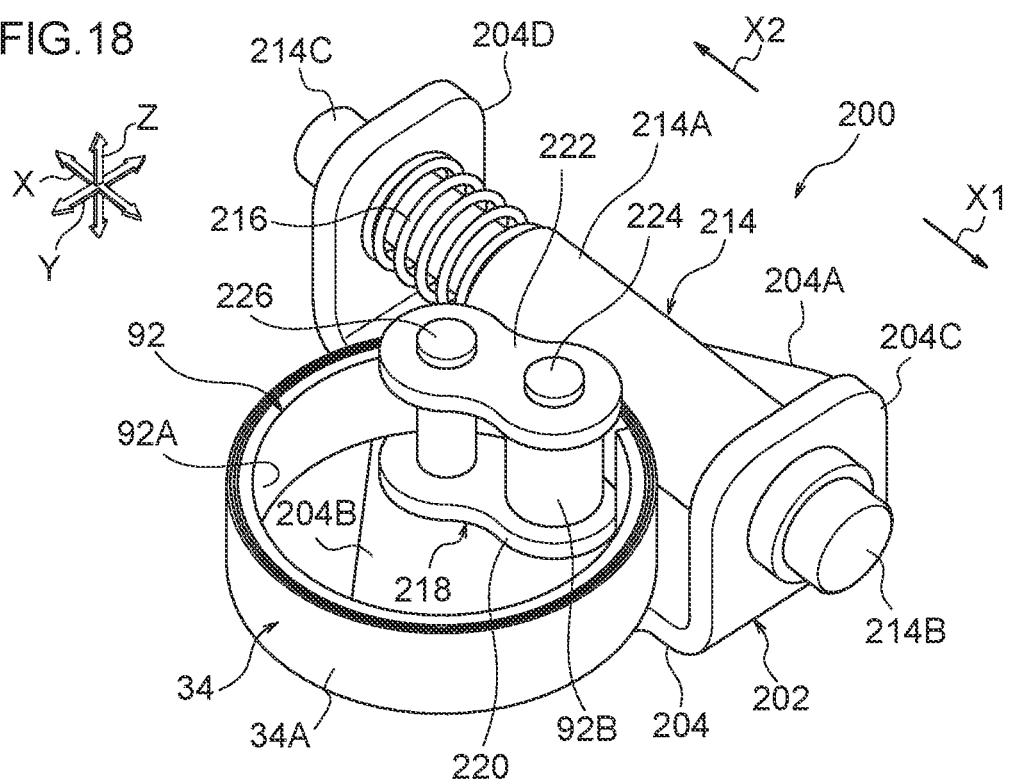
FIG. 18 is a perspective view illustrating a tensioner according to an eighth exemplary embodiment of the present invention.
Figure 19:
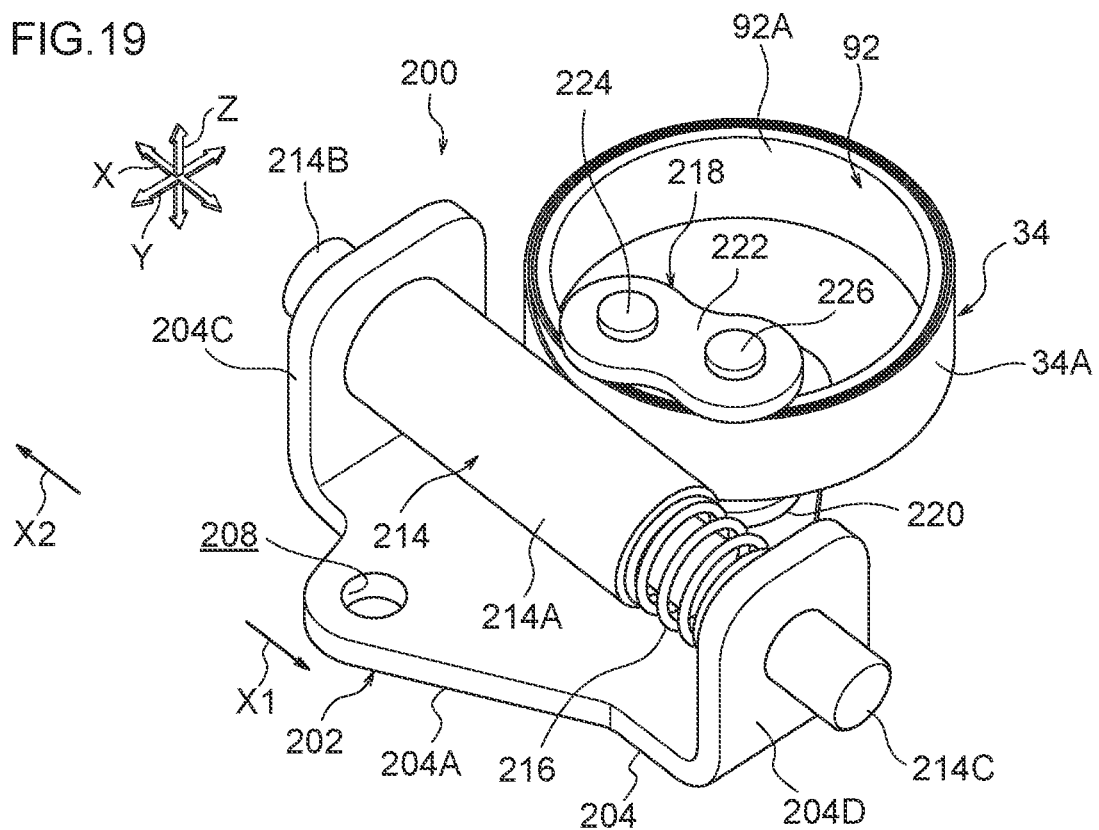
FIG. 19 is a perspective view illustrating a tensioner according to the eighth exemplary embodiment of the present invention.

FIG. 18 and FIG. 19 are perspective views illustrating a tensioner 200 according to an eighth exemplary embodiment of the present invention. FIG. 20A to FIG. 20C are respectively a front view, a plan view, and a side view of the tensioner 200. The tensioner 200 includes a fixed section 202, a movable section 214, a flat spiral spring 34, and a back-up spring 92, and has the same basic configuration as the tensioner 10 according to the first exemplary embodiment. However, the configurations in the tensioner 200 of the fixed section 202 and the movable section 214 are different from the configurations of the fixed section 12 and the movable section 32 according to the first exemplary embodiment.

The fixed section 202 is formed by press-molding sheet metal, and includes a plate shaped fixed section body 204 having a plate thickness direction aligned with the coil axis direction Z. Fixing portions 204A, 204B are provided to the fixed section body 204 so as to extend toward both sides in the spring-adjacency direction Y. Through holes 206, 208 are respectively formed through the fixing portions 204A, 204B so as to penetrate through in the coil axis direction Z. A configuration is thereby adopted in which the fixed section 202 is fixed to the cylinder block of a non-illustrated engine using bolts or the like inserted through the through holes 206, 208.

Figure 22:
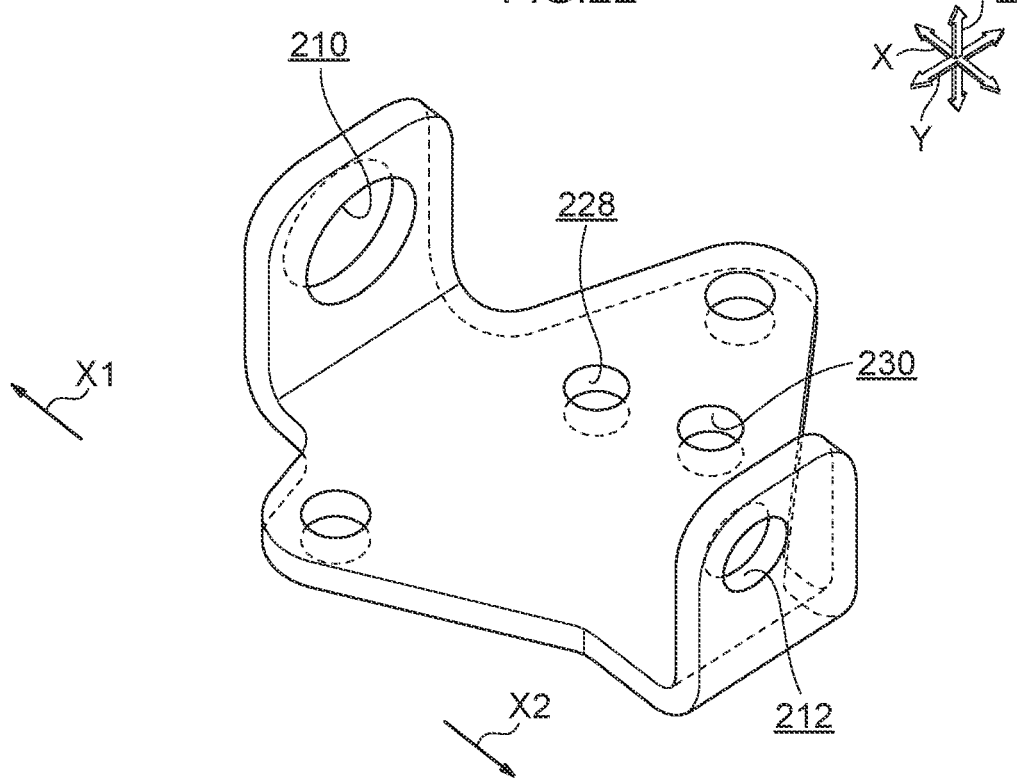
FIG. 22 is a perspective view illustrating a fixed section according to the eighth exemplary embodiment of the present invention.

A leading-end side support portion 204C and a base-end side support portion 204D are integrally provided to two end portions of the fixed section body 204 in the reciprocating direction X so as to project out toward one side in the coil axis direction Z. The leading-end side support portion 204C and the base-end side support portion 204D are plate shaped with plate thickness directions aligned with the reciprocating direction X, and are each formed with substantially rectangular profiles as viewed along the reciprocating direction X. The leading-end side support portion 204C and the base-end side support portion 204D are formed with circular through holes 210, 212 (the reference numerals are omitted from illustration with the exception of in FIG. 22). The through hole 210 formed in the leading-end side support portion 204C is formed with a larger diameter than the through hole 212 formed in the base-end side support portion 204D. The through holes 210, 212 are disposed so as to align with the movable section 214 and be coaxial to each other.

The movable section 214 is, for example, formed from a metal rod member with a stepped circular column profile, and is disposed with its axial direction running in the reciprocating direction X. An axial direction intermediate portion of the movable section 214 configures a large diameter portion 214A, an end portion in one axial direction (an end portion on the forward-direction X1 side) of the movable section 214 configures a leading end small diameter portion 214B having a smaller diameter than the large diameter portion 214A, and a location on the other axial direction end side (the retract-direction X2 side) of the movable section 214 configures a base-end small diameter portion 214C having a smaller diameter than the large diameter portion 214A. The large diameter portion 214A is notched on one side in the spring-adjacency direction Y (the right side in FIG. 20A) so as to have a D-shaped cut profile.

The leading end side of the large diameter portion 214A is slidably fitted inside the through hole 210 of the leading-end side support portion 204C, and the base end side of the base-end small diameter portion 214C is slidably fitted inside the through hole 212 of the base-end side support portion 204D. The movable section 214 is thus supported so as to be straight-line moveable (slidable) in the reciprocating direction X with respect to the fixed section 202.

A step is formed between the large diameter portion 214A and the base-end small diameter portion 214C. A compression coil spring 216 is provided between this step and the base-end side support portion 204D. The compression coil spring 216 corresponds to an "additional spring" of the present invention, and is a return spring. The compression coil spring 216 is disposed coaxially to the movable section 214 at the radial direction outer side of the base-end small diameter portion 214C. The compression coil spring 216 is configured to impart resistance force (biasing force) to counter displacement of the movable section 214 in the retract-direction X2. The flat spiral spring 34 and the back-up spring 92 are disposed at one side in the spring-adjacency direction with respect to the movable section 214.

The outer-end portion 34C of the flat spiral spring 34 is superimposed on the large diameter portion 214A of the movable section 214 from the one side in the spring-adjacency direction. A leading-end portion (an end portion on the retract-direction X2 side) of the outer-end portion 34C is anchored (fixed in this example) to the large diameter portion 214A, in other words to the movable section 32, by the anchor member 40 (for example a rivet or screw). The inner-end portion 34B of the flat spiral spring 34 and the anchor portion 92B of the back-up spring 92 are anchored to the fixed section 202 using a lateral slippage prevention member 218.

The lateral slippage prevention member 218 is configured by a pair of plate members 220, 222, and a pair of pin members 224, 226, and is formed in a shape resembling a chain link. The pin member 224 corresponds to a "first pin member" of the present invention, and the pin member 226 corresponds to a "second pin member" of the present invention. The pair of plate members 220, 222 are, for example, formed by press-molding sheet metal, have plate thickness directions aligned with the coil axis direction Z, and are formed with substantially oval profiles (substantially peanut profiles) as viewed along the coil axis direction Z. A circular through hole (not appended with a reference numeral) is formed through each of the two length direction sides of the plate members 220, 222. The plate members 220, 222 are disposed adjacent to the large diameter portion 214A of the movable section 214 on the one side in the spring-adjacency direction Y, and are disposed away from each other so as to lie on either side of the flat spiral spring 34 and the back-up spring 92 in the coil axis direction Z. The plate members 220, 222 are disposed so as to be superimposed on each other as viewed along the coil axis direction Z, and are connected together by the pair of pin members 224, 226.

The pair of pin members 224, 226 are, for example, formed from metal rod members, and are disposed at the radial direction inner side of the back-up spring 92 with their axial directions running in the coil axis direction Z. The pin members 224, 226 are arrayed along the circumferential direction of the back-up spring 92 so as to follow the inner circumferential face of the back-up spring 92, and are disposed close to the movable section 214. One of the pins, namely the pin member 224, is disposed on the opposite side of the outer end 34A2 of the coil portion 34A of the flat spiral spring 34 to the movable section 214, and the other of the pins, namely the pin member 226, is disposed further toward the retract-direction X2 side than the one pin member 224. The pin members 224, 226 are inserted through the respective through holes formed in the two length direction sides of each of the plate members 220, 222, and the plate members 220, 222 are fixed to the pin members 224, 226 by means such as swaging or the like. End portions of the pin members 224, 226 at one axial direction are fitted into a pair of through holes 228, 230 (see FIG. 22) formed in the fixed section body 204, and are fixed to the fixed section body 204 by means such as swaging, welding, or the like.

The inner-end portion 34B of the flat spiral spring 34 and the anchor portion 92B of the back-up spring 92 are anchored to the one pin member 224. Specifically, the inner-end portion 34B of the flat spiral spring 34 and the anchor portion 92B of the back-up spring 92 are bent into a substantially circular cylinder profile having axial directions along the coil axis direction Z in a mutually superimposed state, and are wrapped around the one pin member 224. The anchor portion 92B and the inner-end portion 34B are thus anchored to the fixed section 102 through the one pin member 224.

Figure 21:
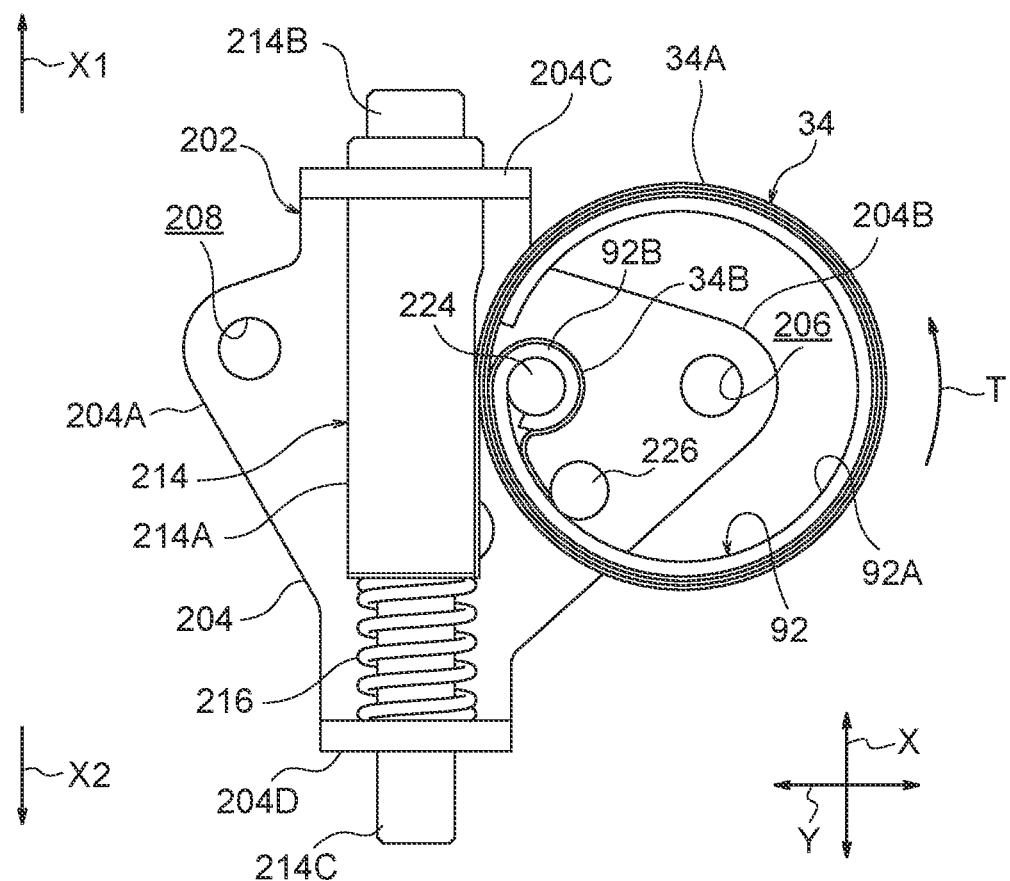
FIG. 21 is a diagram in which illustration a plate of a lateral slippage prevention member has been omitted from the configuration illustrated in FIG. 20A.
Figure 23:
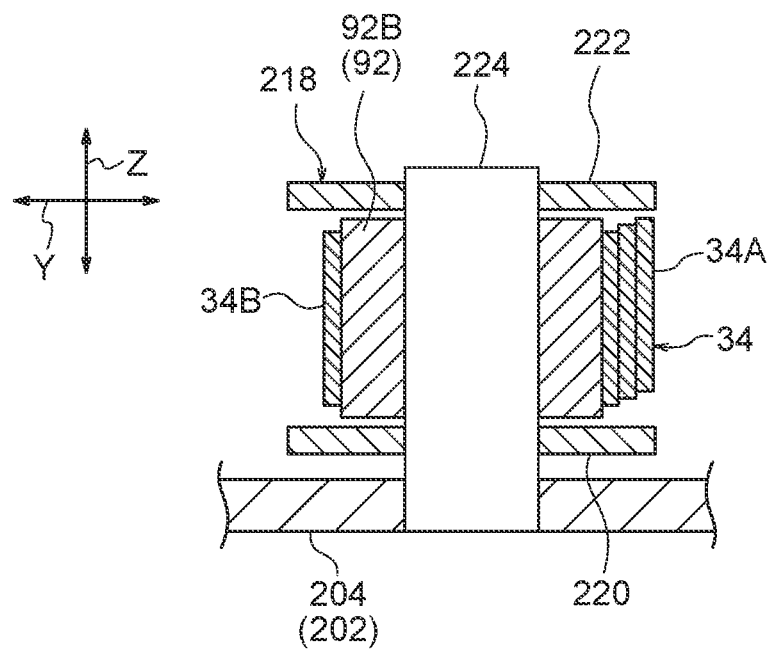
FIG. 23 is a cross-section illustrating a cross-section taken along line F23-F23 of FIG. 20A.

The other pin member 226 contacts the inner circumferential face of the back-up spring 92 as illustrated in FIG. 21. The other pin member 226 restricts rotation of the back-up spring 92 about the one pin member 224 in the arrow T direction in FIG. 21. A location at the inner-end portion 34B side of the coil portion 34A of the flat spiral spring 34 and a location at the anchor portion 92B side of the back-up spring 92 are disposed between the pair of plate members 220, 222, and are limited from undergoing displacement in the coil axis direction Z by the plate members 220, 222 (see FIG. 23). Note that a configuration may be adopted in which the plate member 220 is omitted, namely, a configuration may be adopted in which the displacement of the flat spiral spring 34 and the back-up spring 92 is limited by the plate member 222 and the fixed section body 204.

Other configuration of the present exemplary embodiment is similar to that according to the first exemplary embodiment. The present exemplary embodiment accordingly also has the same basic operation and obtains similar advantageous effects as the first exemplary embodiment. Moreover, in the present exemplary embodiment, since the fixed section 202 is a component press-molded from sheet metal, manufacturing Takt can be reduced, and a reduction in manufacturing costs is facilitated, in comparison to cases in which manufacture of the fixed section 202 involves machining, forging, or the like. A reduction in weight of the fixed section 202 is also facilitated.

Moreover, in the present exemplary embodiment the other pin member 226 of the lateral slippage prevention member 218 restricts rotation of the back-up spring 92 about the one pin member 224 in the arrow T direction in FIG. 21. The back-up spring 92 supported by the fixed section 202 in a cantilevered manner is thereby easily made to deform uniformly (evenly) when the flat spiral spring 34 is being wound-up, enabling localized wear of the flat spiral spring 34 and the back-up spring 92 to be suppressed. Winding-up of the flat spiral spring 34 is also stabilized (even winding-up of the flat spiral spring 34 along the circumferential direction is facilitated). Moreover, since preexisting components such as chain links may be employed in the manufacture of the lateral slippage prevention member 218, the above advantageous effect are obtainable at low cost. Moreover, in the present exemplary embodiment, the pair of plate members 220, 222 of the lateral slippage prevention member 218 limit displacement of the coil portion 34A of the flat spiral spring 34 in the coil axis direction Z, enabling lateral misalignment of the coil portion 34A in the coil axis direction Z to be prevented or suppressed when the flat spiral spring 34 is being wound-up or unwound (see FIG. 23)

Moreover, in the present exemplary embodiment, the movable section 214 is biased in the forward-direction X1 not only by the flat spiral spring 34 but also by the compression coil spring 216. The hysteresis effect is increased as the number of turns of the flat spiral spring 34 increases, resulting in an increased buffering effect with respect to input (vibration) from the timing belt or timing chain. However, doing so weakens a forward thrust in the X1 direction on the movable section 214, and the force pressing the chain guide might no longer be sufficiently obtained. Since the load of the compression coil spring 216 can be set as desired, independently of the flat spiral spring 34 and the back-up spring 92, a sufficient thrust force can be imparted to the movable section 214 and sufficient tension can be induced in the timing chain or timing belt. The role of load absorption and the role of inducing tension can be separately set due to including both the flat spiral spring 34 and the compression coil spring 216.

Namely, loads generated in the tensioner 200 are the following loads (a) to (c).
- (a): Spring load (radial enlargement force) of the flat spiral spring 34 and the back-up spring 92.
- (b): Friction generated in the flat spiral spring 34 and the back-up spring 92. This is generated due to above (a).
- (c): Spring load of the compression coil spring 216 (additional spring).

Figure 24:
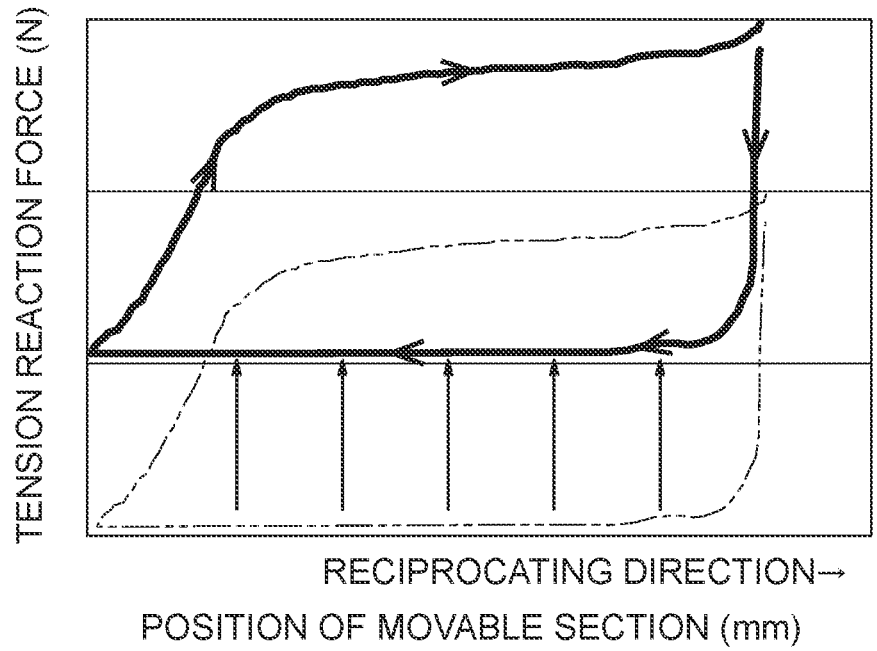
FIG. 24 is a graph illustrating a relationship between a reaction force of a movable section and a stroke of the movable section in a tensioner according to the eighth exemplary embodiment of the present invention.
Figure 25:
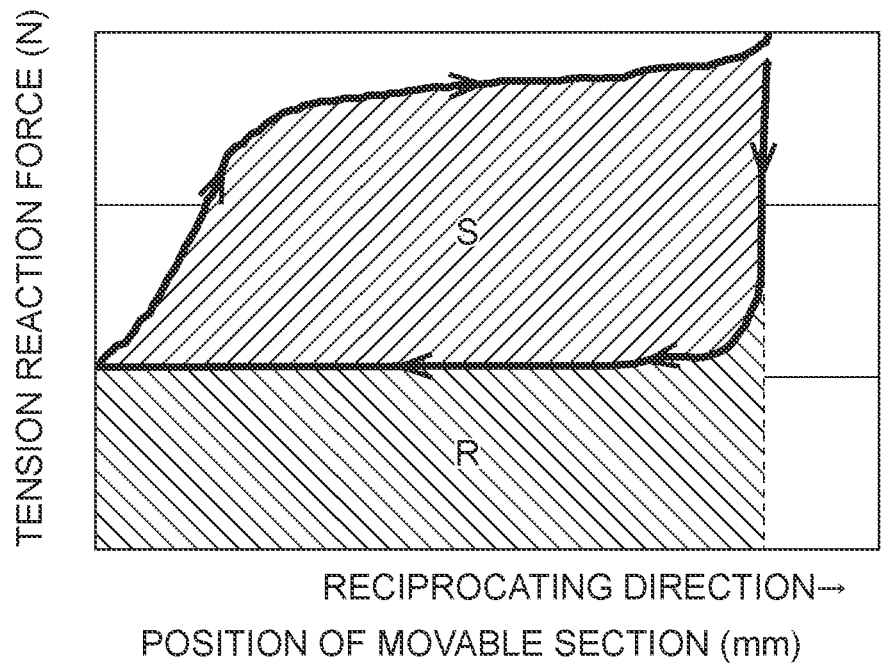
FIG. 25 is a graph corresponding to FIG. 24 to explain load absorbing characteristics of a flat spiral spring and an additional spring in a tensioner according to the eighth exemplary embodiment of the present invention.

The friction (b) does not change between cases in which the tensioner 200 has the compression coil spring 216 (see the solid line in FIG. 24), and cases in which the tensioner 200 lacks the compression coil spring 216 (see the double-dash broken line in FIG. 24). Moreover, there is no change to the shapes of the flat spiral spring 34 and the back-up spring 92 depending on whether or not there is a compression coil spring 216, and so the load (a) does not change. The attenuation characteristics of the tensioner 200 are determined by the region labeled with the letter S in FIG. 25 (which correspond to (a) and (b)), and (a) and (b) are not changed by the region labeled with the letter R in FIG. 25 (which corresponds to (c)). It is accordingly possible to raise the base lower limit load by the amount of (c) alone, without changing the attenuation characteristics. Note that in FIG. 24 and FIG. 25, for ease of understanding, the spring load of the compression coil spring 216 is taken as being constant irrespective of the position of the movable section 214. Moreover, the "additional spring" in the present invention is not limited to the compression coil spring 216, and various other types of spring may be employed.

Ninth Exemplary Embodiment

Figure 26A:
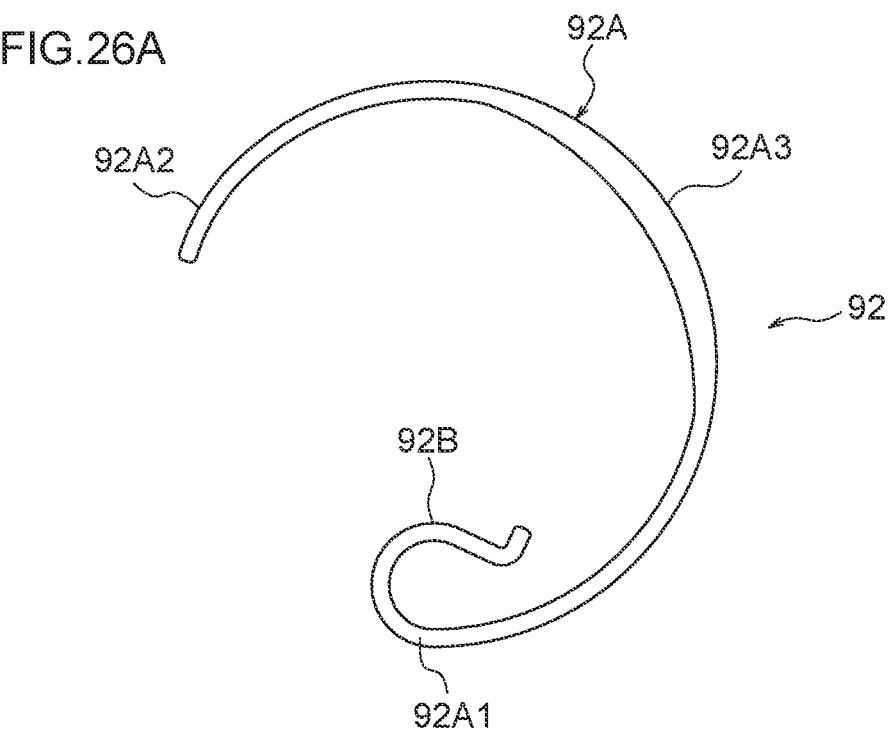
FIG. 26A is a front view illustrating a back-up spring provided in a tensioner according to a ninth exemplary embodiment of the present invention.
Figure 26B:
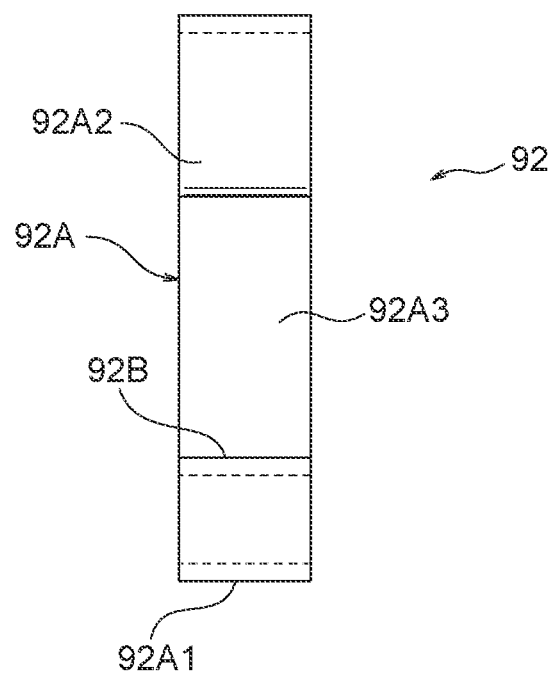
FIG. 26B is a side view illustrating a back-up spring provided in a tensioner according to the ninth exemplary embodiment of the present invention.

FIG. 26A is a front view illustrating a back-up spring 92 provided in a tensioner according to a ninth exemplary embodiment of the present invention, and FIG. 26B is a side view illustrating the back-up spring 92. This tensioner is configured basically similarly to the tensioner 10 according to the first exemplary embodiment, however, a ring-shaped portion 92A of the back-up spring 92 according to the present exemplary embodiment has a cross-sectional area that changes along the circumferential direction. More specifically, the ring-shaped portion 92A has a plate thickness at the circumferential direction one-end portion 92A1 side and at the circumferential direction other-end portion 92A2 side set to a thinner plate thickness than the circumferential direction intermediate portion 92A3.

In the present exemplary embodiment, the ring-shaped portion 92A of the back-up spring 92 is configured as described above, and so the stress arising in the ring-shaped portion 92A can be prevented or suppressed from becoming locally high when the flat spiral spring 34 is unwinding and winding-up. Namely, the stress is lowered at the circumferential direction one-end portion 92A1 side and the circumferential direction other-end portion 92A2 side of the ring-shaped portion 92A compared to at the circumferential direction intermediate portion 92A3 thereof. Lowering the spring constant at the circumferential direction one-end portion 92A1 side and at the circumferential direction other-end portion 92A2 side facilitates deformation of the back-up spring 92 while maintaining a true circle shape. The unwinding and winding-up of the flat spiral spring 34 is stabilized as a result.

Note that the above ninth exemplary embodiment may be configured as in the modified examples illustrated in FIG. 27A and FIG. 27B. In these modified examples, the ring-shaped portion 92A has a width dimension (dimension in the coil axis direction Z) at the circumferential direction one-end portion 92A1 side and at the circumferential direction other-end portion 92A2 side (dimension in the coil axis direction Z) that is set smaller than the width dimension (dimension in the coil axis direction Z) at the circumferential direction intermediate portion 92A3. These modified examples are also able to obtain similar operation and advantageous effects to those of the ninth exemplary embodiment.

Tenth Exemplary Embodiment

Figure 28:
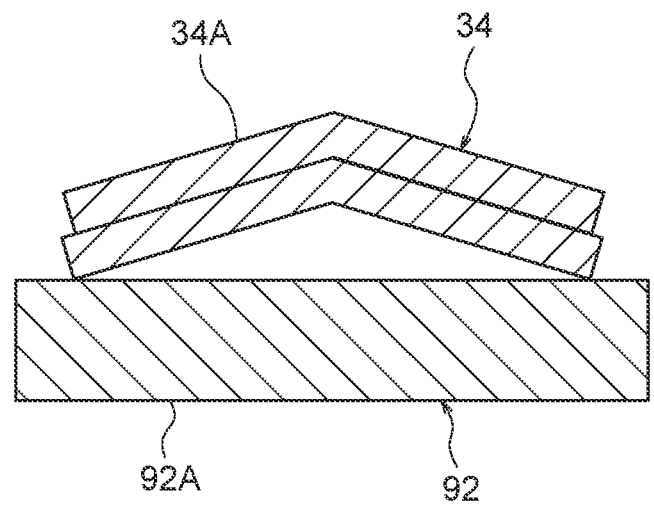
FIG. 28 is a cross-section illustrating a partial configuration of a tensioner according to a tenth exemplary embodiment of the present invention.

FIG. 28 is a cross-section illustrating a partial configuration of a tensioner according to a tenth exemplary embodiment of the present invention. This tensioner is configured basically similarly to the tensioner 10 according to the first exemplary embodiment. However, in cross-section viewed along the circumferential direction, a coil portion 34A of the flat spiral spring 34 is curved so as to be convex toward the opposite side to the ring-shaped portion 92A of the back-up spring 92.

Figure 29:
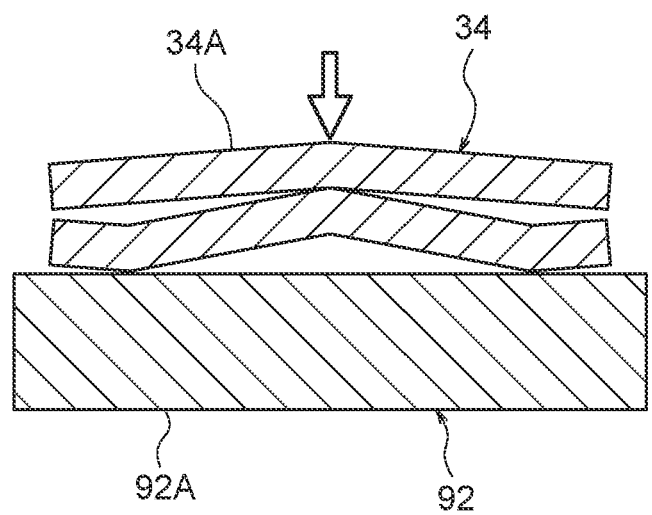
FIG. 29 is cross-section corresponding to FIG. 28 and illustrating a state in which a flat spiral spring has been wound-up in a tensioner according to the tenth exemplary embodiment of the present invention.

In this exemplary embodiment, as illustrated in FIG. 29, when unwinding and winding-up the flat spiral spring 34, a gap can be induced to develop between plates of the coil portion 34A, and a gap can also be formed between the coil portion 34A and the ring-shaped portion 92A. This facilitates, for example, entry of lubricant oil (engine oil) into these gaps, and so wear of the flat spiral spring 34 and the back-up spring 92 is easily suppressed, enabling unwinding and winding-up of the flat spiral spring 34 to be stabilized.

Eleventh Exemplary Embodiment

Figure 30:
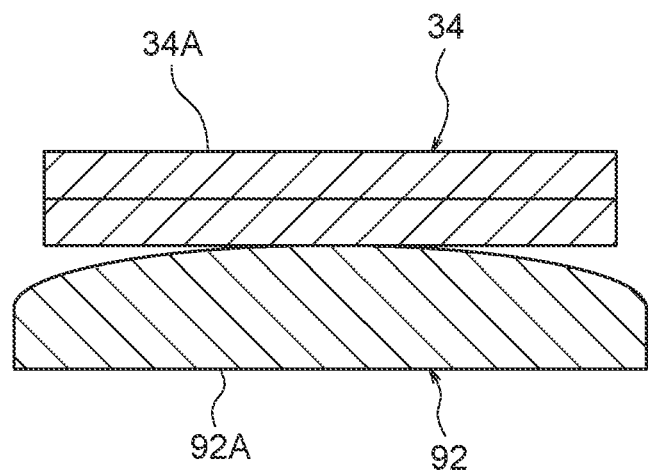
FIG. 30 is a cross-section illustrating a partial configuration of a tensioner according to an eleventh exemplary embodiment of the present invention.

FIG. 30 is a cross-section illustrating a partial configuration of a tensioner according to an eleventh exemplary embodiment of the present invention. This tensioner is configured basically similarly to the tensioner 10 according to the first exemplary embodiment. However, when viewed along the circumferential direction of a ring-shaped portion 92A, an outer circumferential face of the ring-shaped portion 92A of a back-up spring 92 is formed with a protruding profile (in this case a curved profile) protruding toward the flat spiral spring 34 side.

Figure 31:
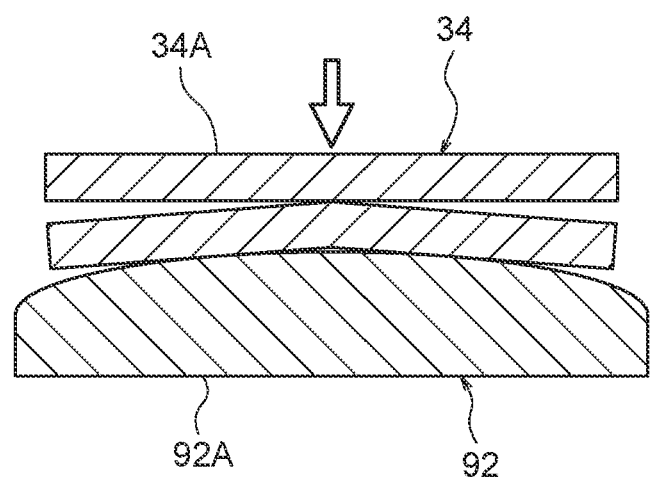
FIG. 31 is cross-section corresponding to FIG. 32 and illustrating a state in which a flat spiral spring has been wound-up in a tensioner according to the eleventh exemplary embodiment of the present invention.

In this exemplary embodiment, as illustrated in FIG. 30, a gap is formed between the flat spiral spring 34 and the ring-shaped portion 92A, and so entry of lubricant oil into this gap is facilitated. Moreover, as illustrated in FIG. 31, gaps can be induced between the plates of the coil portion 34A when unwinding and winding-up the flat spiral spring 34. This accordingly facilitates the suppression of wear of the flat spiral spring 34 and of the back-up spring 92, and enables unwinding and winding-up of the flat spiral spring 34 to be stabilized.

Twelfth Exemplary Embodiment

Figure 32:
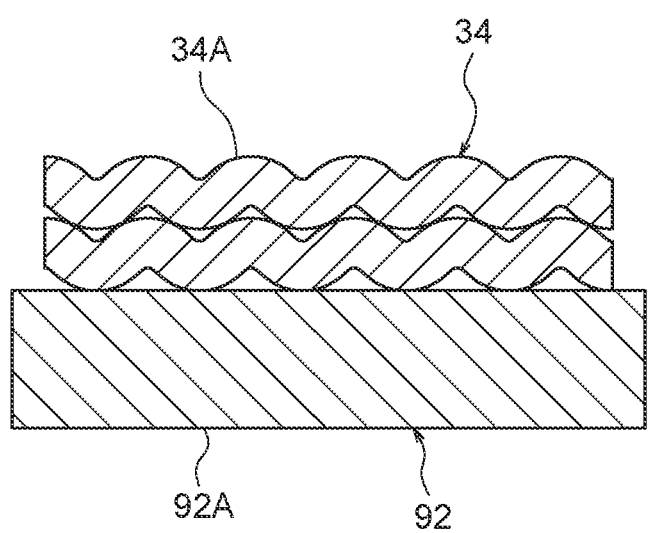
FIG. 32 is a cross-section illustrating a partial configuration of a tensioner according to a twelfth exemplary embodiment of the present invention.

FIG. 32 is a cross-section illustrating a partial configuration of a tensioner according to an twelfth exemplary embodiment of the present invention. This tensioner is configured basically similarly to the tensioner 10 according to the first exemplary embodiment. However, an outer circumferential face and an inner circumferential face of plate spring material configuring the coil portion 34A and the flat spiral spring 34 is formed with plural indentations and protrusions arrayed along the coil axis direction Z (the left-right direction in FIG. 32) of the flat spiral spring 34. More specifically, the plate spring material configuring the coil portion 34A is formed with a wavey cross-section. Note that in the present exemplary embodiment, as long as plural indentations and protrusions are formed on the outer circumferential face and the inner circumferential face of the plate spring material configuring the coil portion 34A, the plural indentations and protrusions may be formed on the outer circumferential face and the inner circumferential face using any method such as, for example, blast treatment or the like.

In this exemplary embodiment too, gaps are respectively formed between the plates of the flat spiral spring 34 and between the flat spiral spring 34 and the ring-shaped portion 92A. The entry of lubricant oil into these gaps is facilitated thereby, and so wear of the flat spiral spring 34 and of the back-up spring 92 is easily suppressed, enabling the unwinding and winding-up of the flat spiral spring 34 to be stabilized.

Thirteenth Exemplary Embodiment

Figure 33:
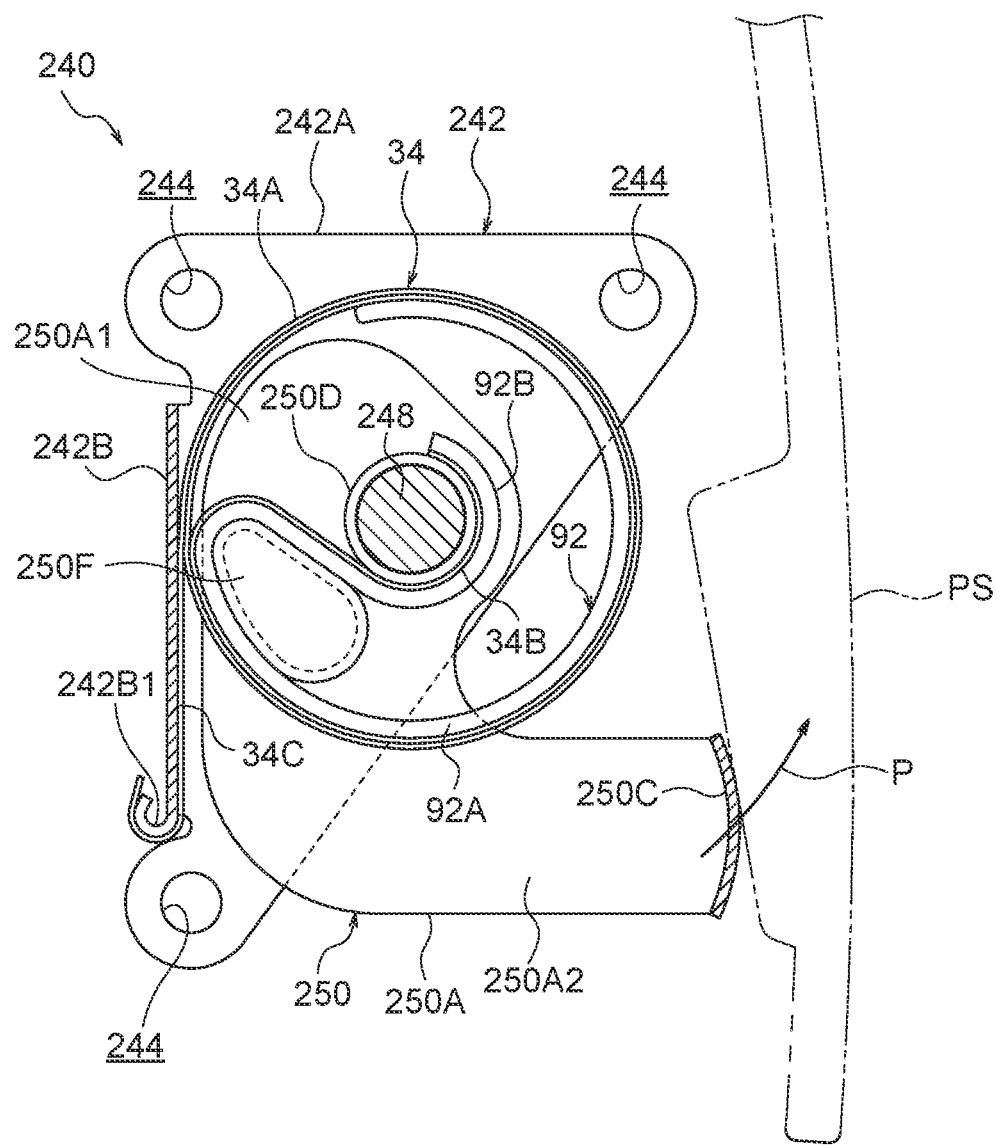
FIG. 33 is a partial cross-section as viewed from a front face side of a tensioner according to a thirteenth exemplary embodiment of the present invention, and is a diagram illustrating a state in which a support member has been sectioned along line F33-F33 of FIG. 35.
Figure 34:
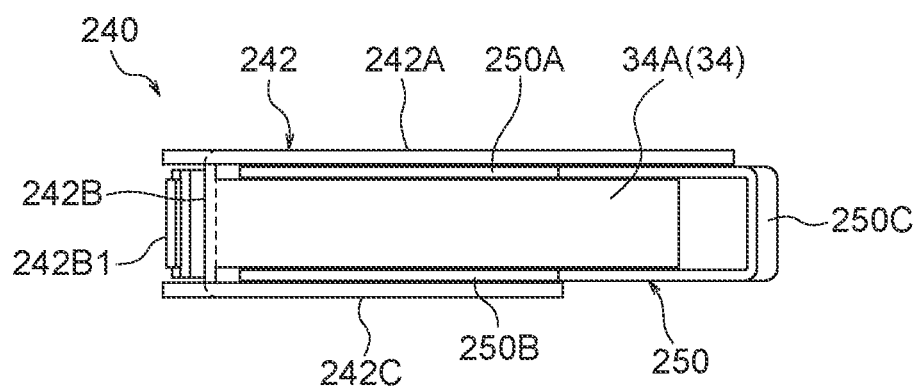
FIG. 34 is a plan view illustrating a tensioner according to the thirteenth exemplary embodiment of the present invention.
Figure 35:
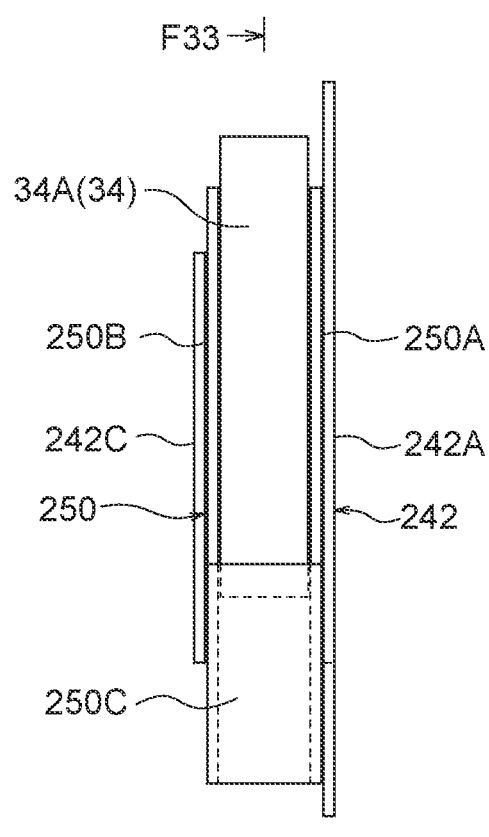
FIG. 35 is a side view illustrating a tensioner according to the thirteenth exemplary embodiment of the present invention.
Figure 36A:
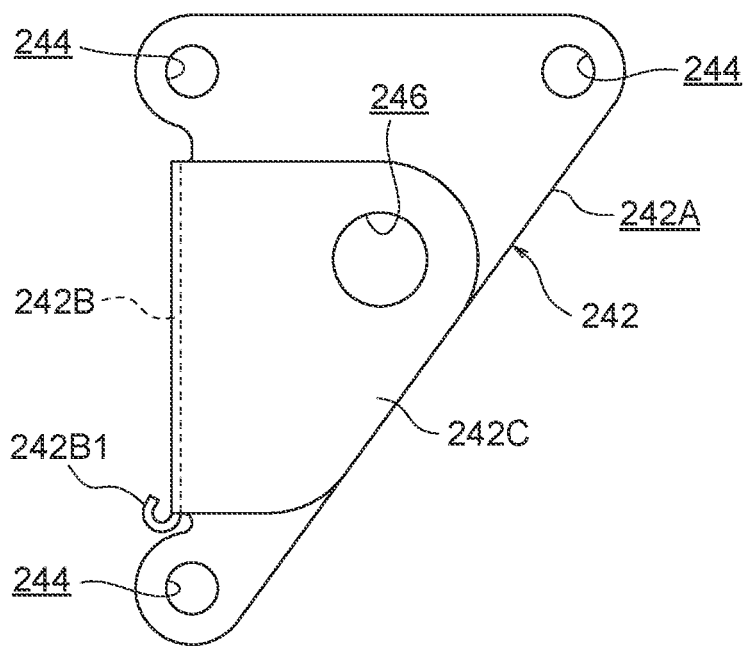
FIG. 36A is a front view illustrating a fixed section according to the thirteenth exemplary embodiment of the present invention.
Figure 36B:
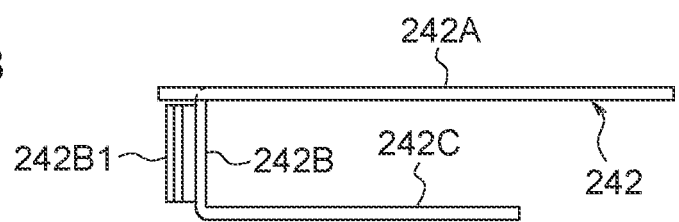
FIG. 36B is a plan view illustrating a fixed section according to the thirteenth exemplary embodiment of the present invention.
Figure 36C:
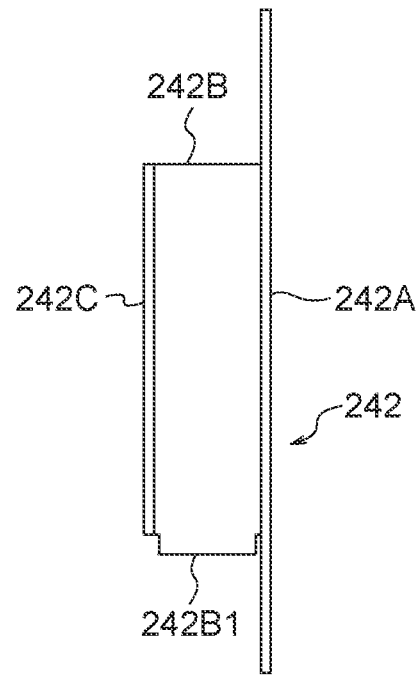
FIG. 36C is a side view illustrating a fixed section according to the thirteenth exemplary embodiment of the present invention.

FIG. 33 is a partial cross-section illustrating a tensioner 240 according to a thirteenth exemplary embodiment of the present invention, as viewed from the front side. FIG. 34 is a plan view illustrating the tensioner 240, and FIG. 35 is a side view illustrating the tensioner 240. The tensioner 240 includes a fixed section 242, a movable section (pressing member) 250 supported so as to be capable of rotating (capable of displacing) with respect to the fixed section 242, a flat spiral spring 34 to bias the movable section 250 in one rotation direction, and a back-up spring 92 disposed at the radial direction inner side of the flat spiral spring 34.

As illustrated in FIG. 33 to FIG. 36C, the fixed section 242 is a component press-molded from sheet metal, and includes a body wall 242A formed in an elongated plate shape having a plate thickness direction aligned with a coil axis direction of the flat spiral spring 34. The body wall 242A has a substantially triangular profile (substantially right-angled triangular profile) as viewed along the coil axis direction Z, formed such that a width dimension of the body wall 242A increases on progression toward one side in the length direction (the upper side in FIG. 33 and FIG. 36A). A through hole 244 is formed penetrating the body wall 242A at each of the three corners of the body wall 242A. This thereby achieves a configuration in which the fixed section 242 is fixed to the cylinder block of a non-illustrated engine using bolts or the like inserted through the through holes 244.

A sidewall 242B is integrated to one width direction end portion of the body wall 242A and extends therefrom toward one side in the plate thickness direction of the body wall 242A. A retaining wall 242C is integrated to an end portion of the sidewall 242B on the opposite side to the body wall 242A and extends therefrom toward the other width direction side of the body wall 242A. The retaining wall 242C extends parallel to the body wall 242A and has a substantially trapezoidal profile as viewed along the coil axis direction of the flat spiral spring 34. One-end portion of the sidewall 242B is bent into a circular arc shape so as to form a spring anchor portion 242B1. Circular through holes 246 are respectively formed so as to pierce through the body wall 242A and the retaining wall 242C. The through holes 246 are disposed coaxially to each other. A circular column shaped support shaft 248 (see FIG. 33) is fitted into the through holes 246. The support shaft 248 is, for example, formed from a metal rod member, and is fixed to the body wall 242A and the retaining wall 242C by means such as swaging, welding, or the like. The movable section 250 is rotatably supported with respect to the support shaft 248.

Figure 37A:
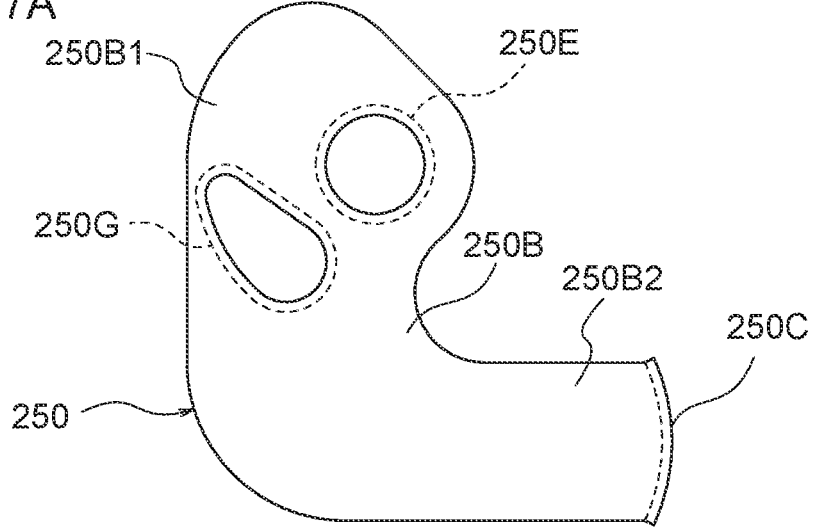
FIG. 37A is a front view illustrating a movable section according to the thirteenth exemplary embodiment of the present invention.
Figure 37B:
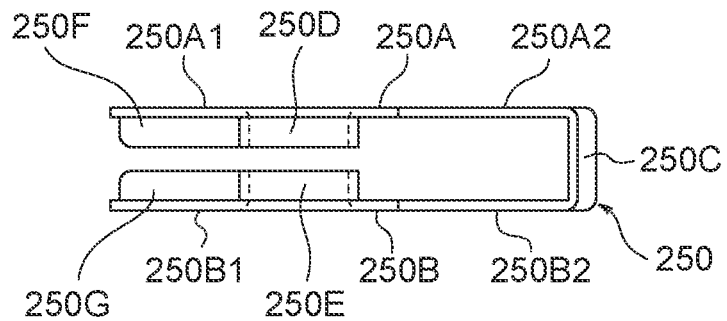
FIG. 37B is a plan view illustrating a movable section according to the thirteenth exemplary embodiment of the present invention.
Figure 37C:
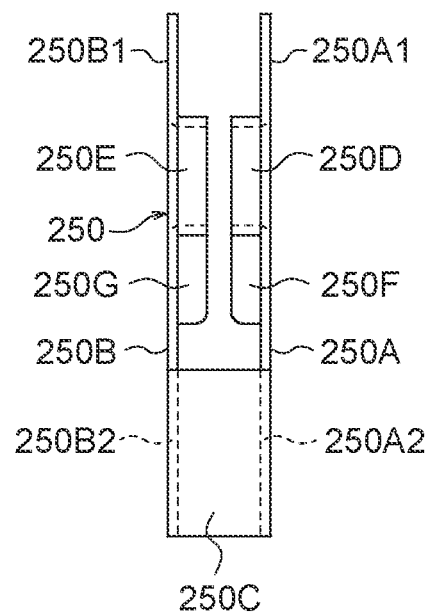
FIG. 37C is a side view illustrating a movable section according to the thirteenth exemplary embodiment of the present invention.

As illustrated in FIG. 33 to FIG. 35 and in FIG. 37A to FIG. 37C, the movable section 250 is a component press-molded from sheet metal, and includes a pair of opposing walls 250A, 250B that oppose each other in the coil axis direction of the flat spiral spring 34. The opposing walls 250A, 250B are each formed with a substantially L-shaped profile as viewed along the coil axis direction of the flat spiral spring 34. The opposing walls 250A, 250B include respective body portions 250A1, 250B1 extending in the length direction of the body wall 242A (corresponding to the up-down direction in FIG. 33), and respective arm portions 250A2, 250B2 extending from one-end side of the body portions 250A1, 250B1 in the length direction (corresponding to the lower side in FIG. 33) toward one side in a direction orthogonal to the length of the body portions 250A1, 250B1 (corresponding to the right side in FIG. 33. Leading-end portions of the respective arm portions 250A2, 250B2 are integrally connected together by a pressing portion 250C extending in the coil axis direction of the flat spiral spring 34.

The body portions 250A1, 250B1 are disposed between the body wall 242A and the retaining wall 242C of the fixed section 242. Circular cylinder shaped shaft bearings 250D, 250E are formed to the body portions 250A1, 250B1 so as to project toward each other. The support shaft 248 described above is fitted inside the shaft bearings 250D, 250E so as to be capable of rotating. The movable section 250 is thus rotatably supported by the fixed section 242 through the support shaft 248. The pressing portion 250C of the movable section 250 is configured to press-contacted against a tension member PS such as a chain guide or belt guide so as press in one rotation direction of the movable section 250 (see the arrow P in FIG. 33).

Respective protrusions 250F, 250G are formed on the body portions 250A1, 250B1 so as to protrude toward one another. The protrusions 250F, 250G have substantially oval profiles as viewed along the coil axis direction of the flat spiral spring 34, and are disposed between the shaft bearings 250D, 250E (support shaft 248) and the sidewall 242B. An inner-end portion 34B of the flat spiral spring 34 and an anchor portion 92B of the back-up spring 92 are wrapped around the protrusions 250F, 250G and the shaft bearings 250D, 250E. Specifically, the inner-end portion 34B of the flat spiral spring 34 and the anchor portion 92B of the back-up spring 92 are bent into a substantially S-shape when in a mutually superimposed state, and wrapped around the protrusions 250F, 250G and the shaft bearings 250D, 250E in a state in which parts thereof are nipped between the protrusions 250F, 250G and the shaft bearings 250D, 250E. The inner-end portion 34B and the anchor portion 92B are thus anchored to the movable section 250, and also anchored to the fixed section 242 through the shaft bearings 250D, 250E and the support shaft 248. An outer-end portion 34C of the flat spiral spring 34 is superimposed on the sidewall 242B of the fixed section 242. A leading-end portion of the outer-end portion 34C is bent into a circular arc shape and anchored to (hooked onto) the spring anchor portion 242B1 of the sidewall 242B. The flat spiral spring 34 biases the movable section 250 in one rotation direction with respect to the fixed section 242 (the arrow P direction in FIG. 33), in a configuration in which the flat spiral spring 34 is wound-up by rotation of the movable section 250 in the other rotation direction.

Note that although the flat spiral spring 34 is disposed coaxially to the movable section 250 in the present exemplary embodiment, there is no limitation thereto, and a configuration may be adopted in which the flat spiral spring 34 is disposed off-center with respect to the movable section 250. Namely, a configuration may be adopted in which the center axis of the flat spiral spring 34 and the rotation axis of the movable section 250 are disposed so as to be offset in a radial direction from one another.

In the tensioner 240 configured as described above, the movable section 250 is rotated in the one rotation direction with respect to the fixed section 242 by biasing force from the contact-type flat spiral spring 34, such that the pressing portion of the movable section 250 presses against an entrained transmission body such as a timing belt or timing chain through the tension member such as a belt guide or chain guide. The vibrations of the entrained transmission body are thereby buffered by unwinding and winding-up of the flat spiral spring 34, and energy can be absorbed and attenuated by hysteresis characteristics due to the difference between the inter-plate friction force of the flat spiral spring 34 in the unwind direction and the wind-up direction. Moreover, the tensioner 240 includes the back-up spring 92 similar to the back-up spring 92 according to the first exemplary embodiment, thereby enabling excessive winding-up of the flat spiral spring 34 to be prevented similarly to in the first exemplary embodiment.

Moreover, although in the twelfth exemplary embodiment a configuration is adopted in which the outer-end portion 34C of the flat spiral spring 34 is anchored to the fixed section 242 and the inner-end portion 34B of the flat spiral spring 34 is anchored to the movable section 250, there is no limitation thereto. A configuration may be adopted in which an inner-end portion of a flat spiral spring is anchored to a fixed section and an outer-end portion of a flat spiral spring is anchored to a pressing member.

Figure 38:
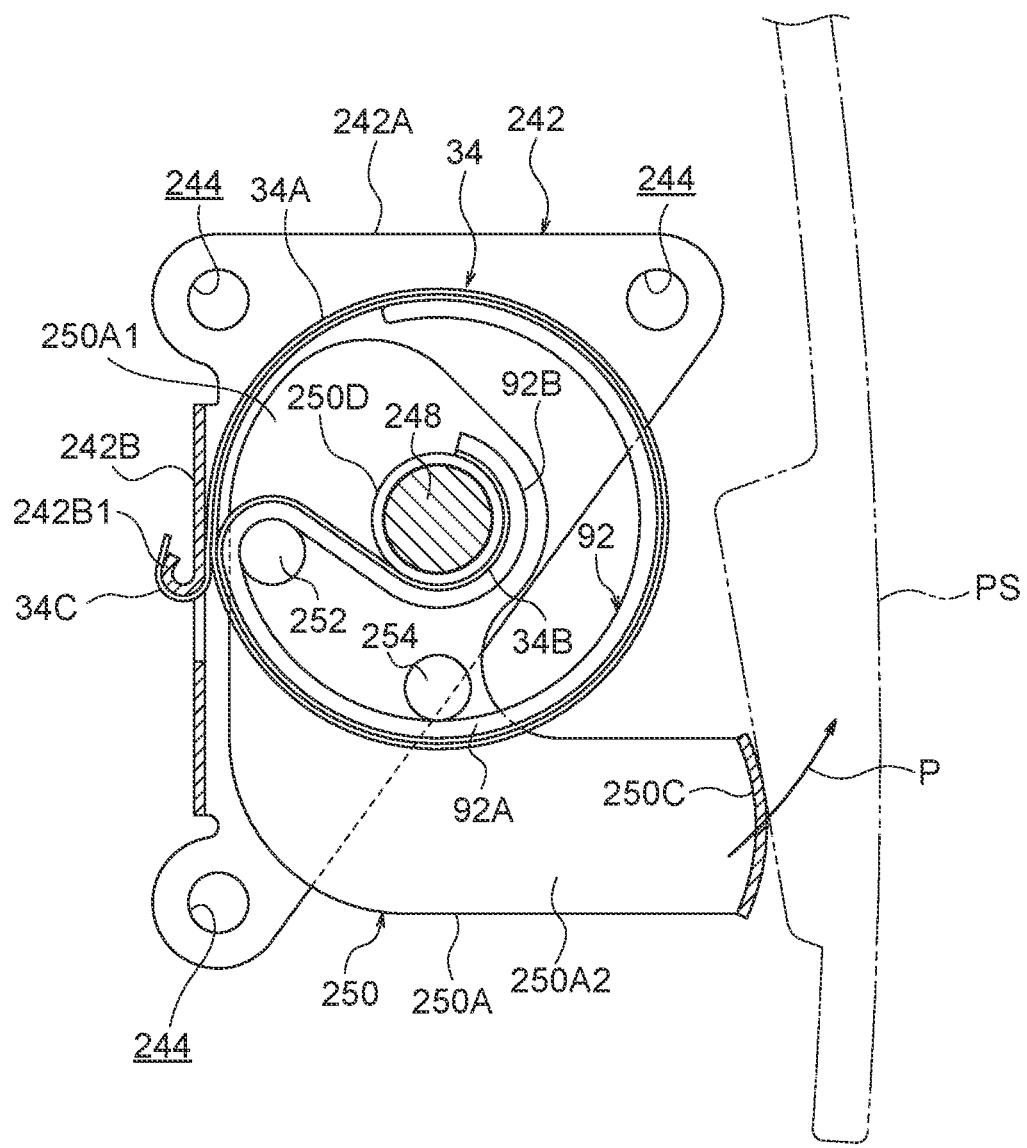
FIG. 38 is a front view illustrating a first modified example of the thirteenth exemplary embodiment of the present invention.

Note that as in a first modified example illustrated in FIG. 38, in the twelfth exemplary embodiment described above a pair of pins 252, 254 may be employed instead of the protrusions 250F, 250G, with the pair of pins 252, 254 spanning between the opposing walls 250A, 250B of the movable section 250. In the first modified example, a spring anchor portion 242B1 is formed where a length direction intermediate portion of the sidewall 242B is cut out and bent up.

Figure 39:
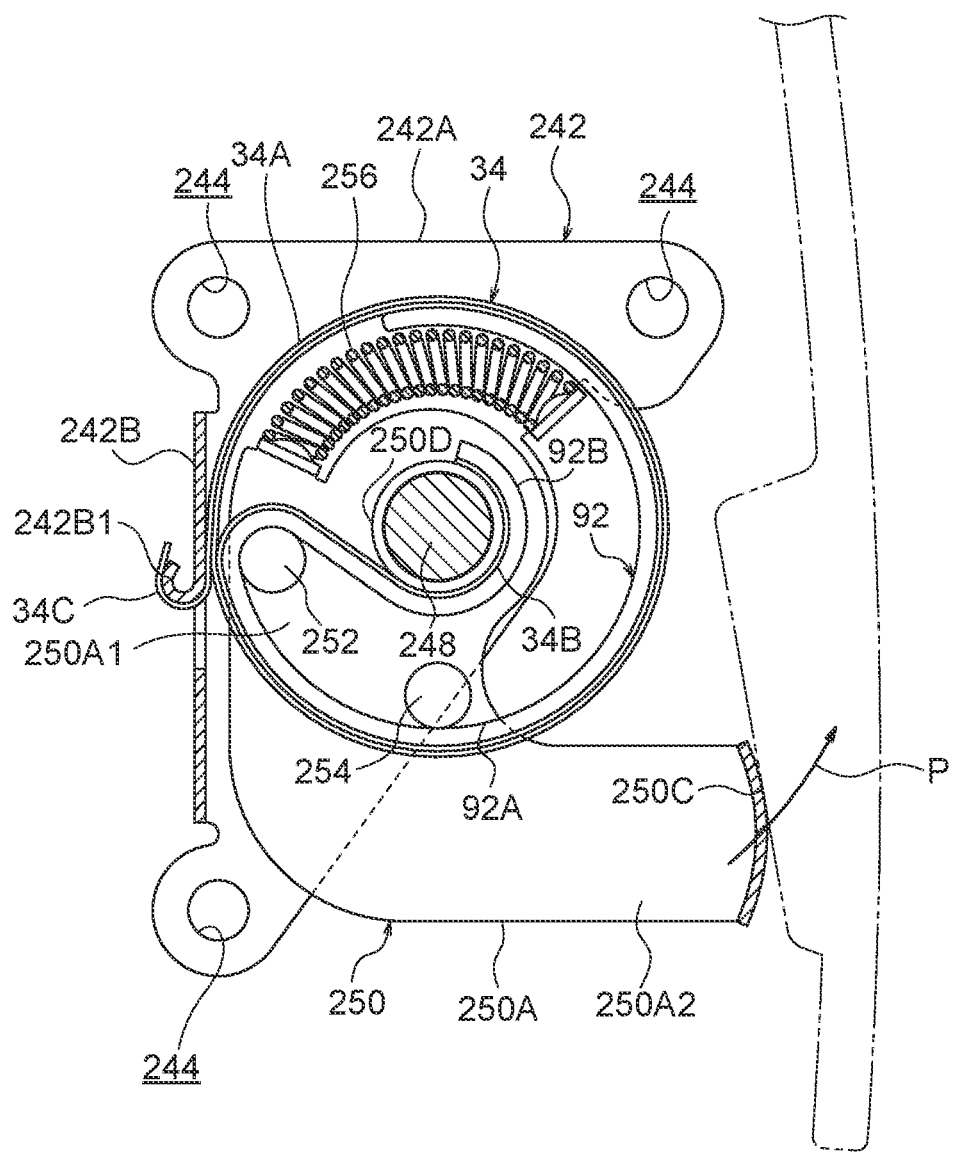
FIG. 39 is a front view illustrating a second modified example of the thirteenth exemplary embodiment of the present invention.

Moreover, in the twelfth exemplary embodiment, an additional spring (a compression coil spring in this example) 256 may be added as in the second modified example illustrated in FIG. 39. The compression coil spring 256 is provided between the fixed section 242 and the movable section 250, and biases the movable section 250 in the one rotation direction with respect to the fixed section 242. In this second modified example, similarly to in the eighth exemplary embodiment, the load absorbing and tension induction can be set separately.

Supplementary Explanation Regarding Back-Up Spring

Next, supplementary explanation follows regarding the back-up spring 92 described above, with reference to FIG. 40A to FIG. 42. FIG. 40A to FIG. 40G illustrate a tensioner 10 similar to the tensioner 10 according to the first exemplary embodiment. However, a phase θ of the back-up spring 92 with respect to the movable section 32 (placement of the one-end portion 92A1 of the ring-shaped portion 92A with respect to the virtual straight line VL) is different in each of FIG. 40A to FIG. 40G. Note that for clarity some reference numerals are omitted from FIG. 40A to FIG. 40G.

Figure 40A:
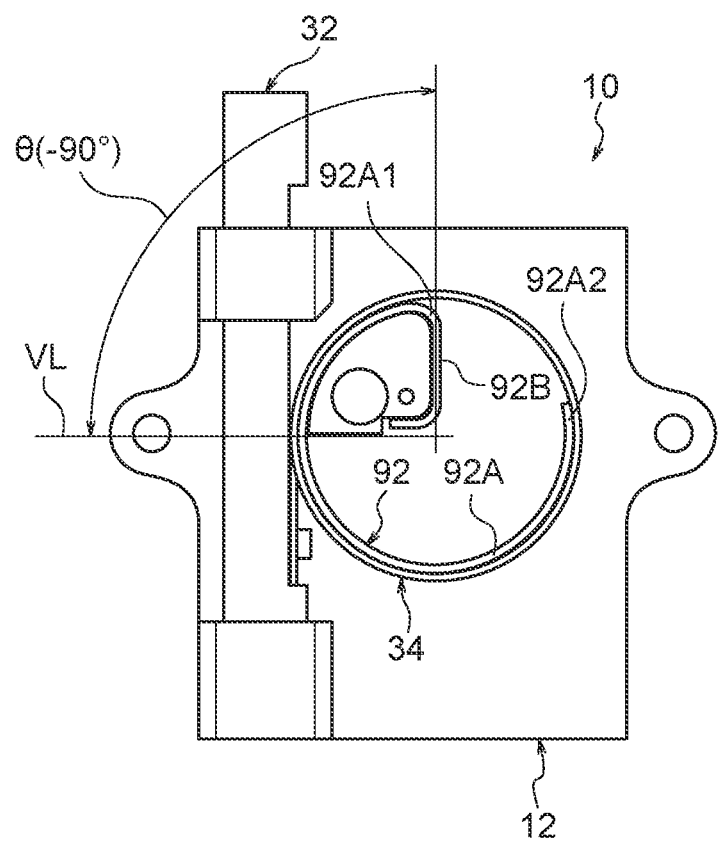
FIG. 40A is a front view illustrating a tensioner according to the first exemplary embodiment of the present invention. A state is illustrated therein in which, as viewed along a coil axis direction of a flat spiral spring, a one-end portion of a ring-shaped portion of a back-up spring (referred to hereafter as the "back-up spring phase") is set at a position located at −90° about the center of the ring-shaped portion of the back-up spring with respect to a virtual straight line extending along a spring-adjacency direction from the center of the ring-shaped portion toward a movable section.

FIG. 40A illustrates a state in which the one-end portion 92A1 (end portion on the anchor portion 92B side) of the ring-shaped portion 92A is disposed at a position located at −90° (a position rotated by 90° in the unwind direction) about the center S of the ring-shaped portion 92A with respect to the virtual straight line VL (i.e. illustrates a state in which the phase θ of the back-up spring 92 has been set to −90°).

Figure 40B:
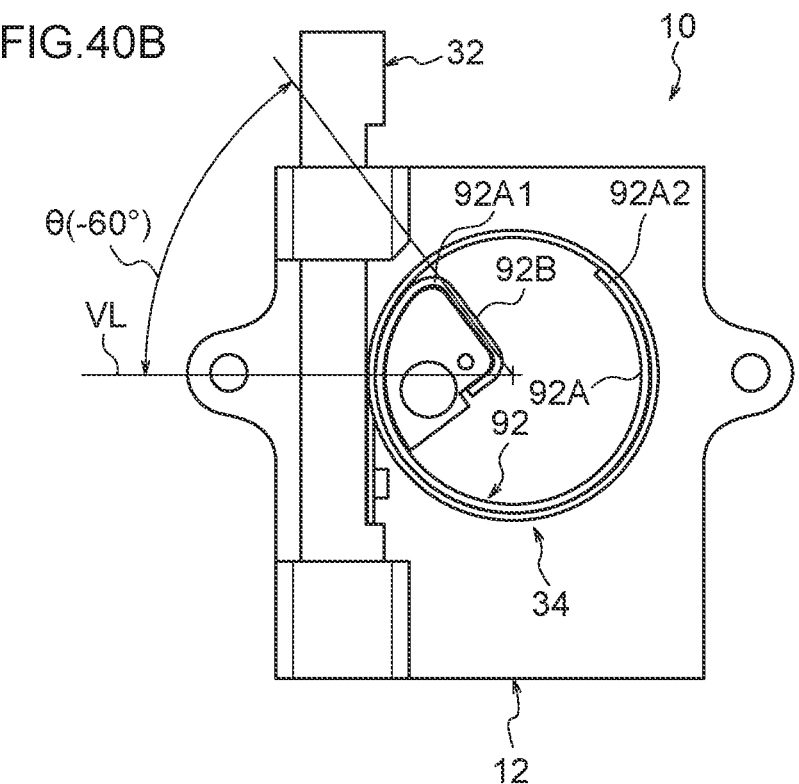
FIG. 40B is a front view illustrating a tensioner according to the first exemplary embodiment of the present invention, illustrating a state in which the back-up spring phase is set at a position located at −60° about the center of the ring-shaped portion.

FIG. 40B illustrates a state in which the one-end portion 92A1 (end portion on the anchor portion 92B side) of the ring-shaped portion 92A is disposed at a position located at −60° (a position rotated by 60° in the unwind direction) about the center S of the ring-shaped portion 92A with respect to the virtual straight line VL (i.e. illustrates a state in which the phase θ of the back-up spring 92 has been set to −60°).

Figure 40C:
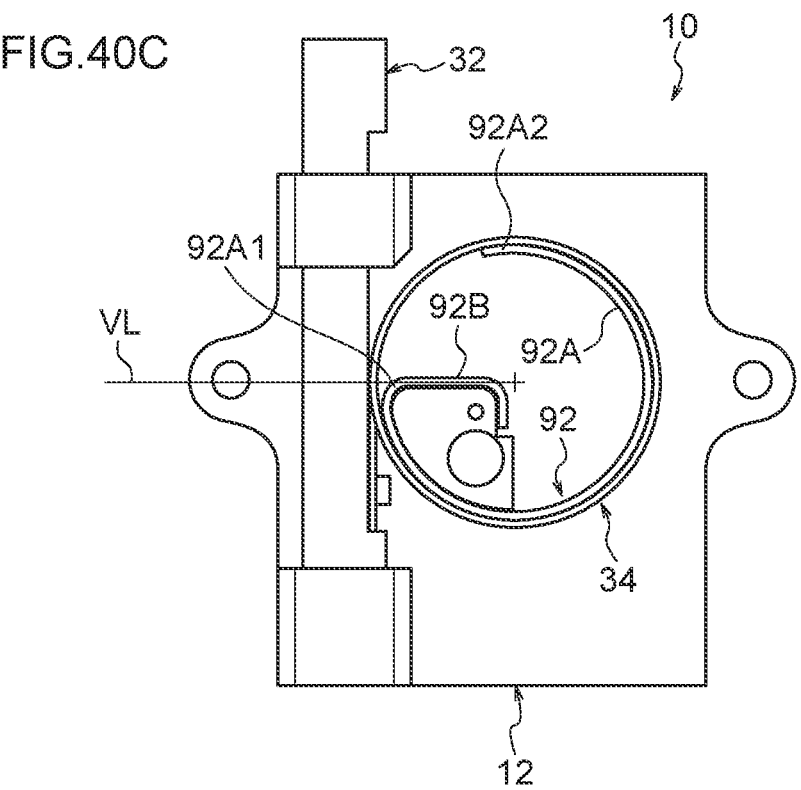
FIG. 40C is a front view illustrating a tensioner according to the first exemplary embodiment of the present invention, illustrating a state in which the back-up spring phase is set at a position located at 0° about the center of the ring-shaped portion.

FIG. 40C illustrates a state in which the one-end portion 92A1 of the ring-shaped portion 92A is disposed at a position located at 0° about the center S of the ring-shaped portion 92A with respect to the virtual straight line VL (i.e. illustrates a state in which the phase θ of the back-up spring 92 has been set to 0°). In this state, the number of turns of the flat spiral spring 34 is set to 2.0 full turns.

Figure 40D:
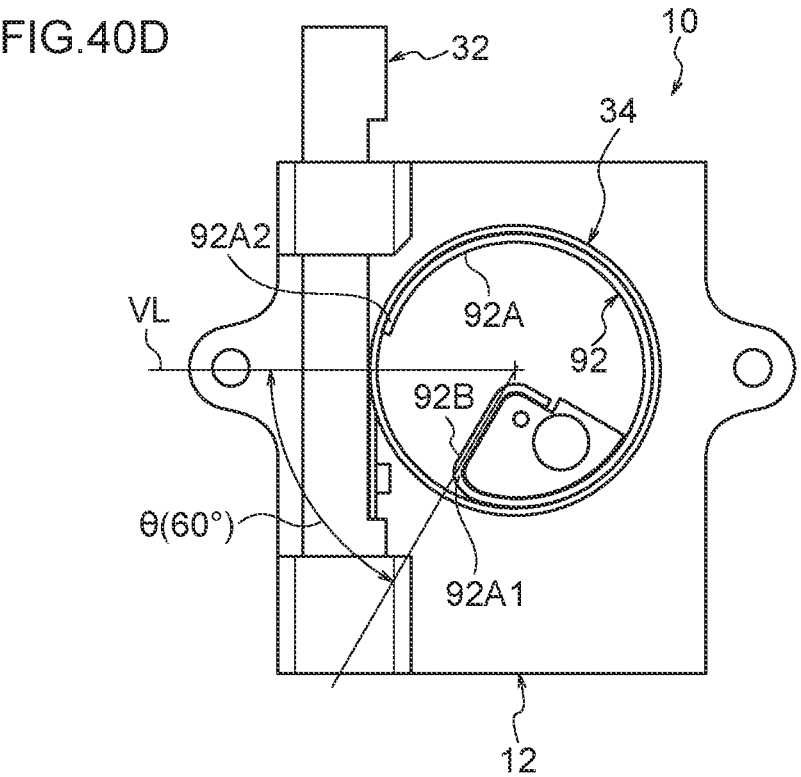
FIG. 40D is a front view illustrating a tensioner according to the first exemplary embodiment of the present invention, illustrating a state in which the back-up spring phase is set at a position located at 60° about the center of the ring-shaped portion.

FIG. 40D illustrates a state in which the one-end portion 92A1 of the ring-shaped portion 92A is disposed at a position located at 60° (a position rotated by 60° in the wind-up direction) about the center S of the ring-shaped portion 92A with respect to the virtual straight line VL (i.e. illustrates a state in which the phase θ of the back-up spring 92 has been set to 60°).

Figure 40E:
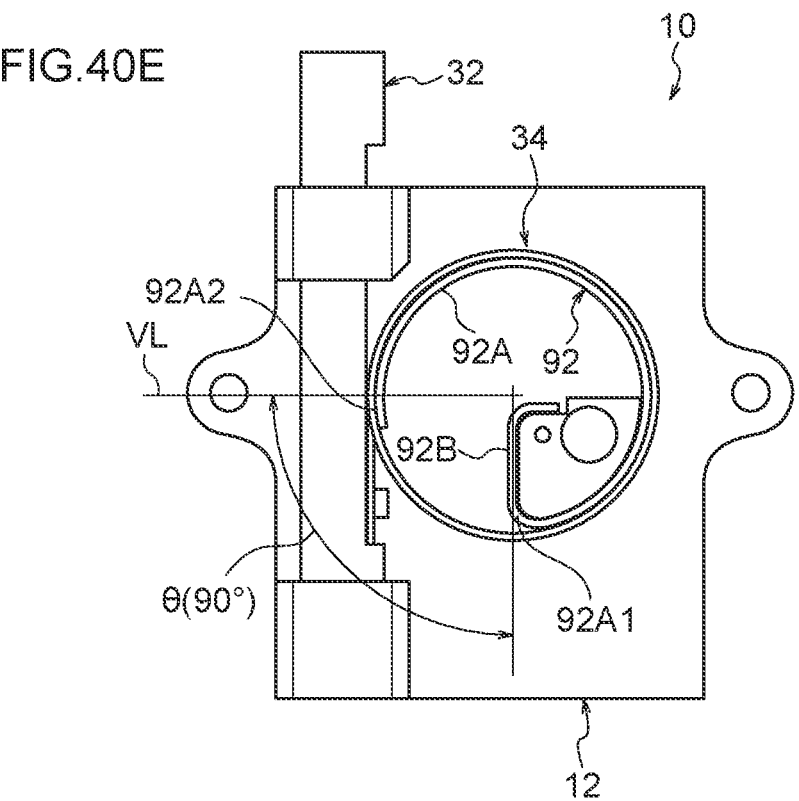
FIG. 40E is a front view illustrating a tensioner according to the first exemplary embodiment of the present invention, illustrating a state in which the back-up spring phase is set at a position located at 90° about the center of the ring-shaped portion.

FIG. 40E illustrates a state in which the one-end portion 92A1 of the ring-shaped portion 92A is disposed at a position located at 90° (a position rotated by 90° in the wind-up direction) about the center S of the ring-shaped portion 92A with respect to the virtual straight line VL (i.e. illustrates a state in which the phase θ of the back-up spring 92 has been set to 900).

Figure 40F:
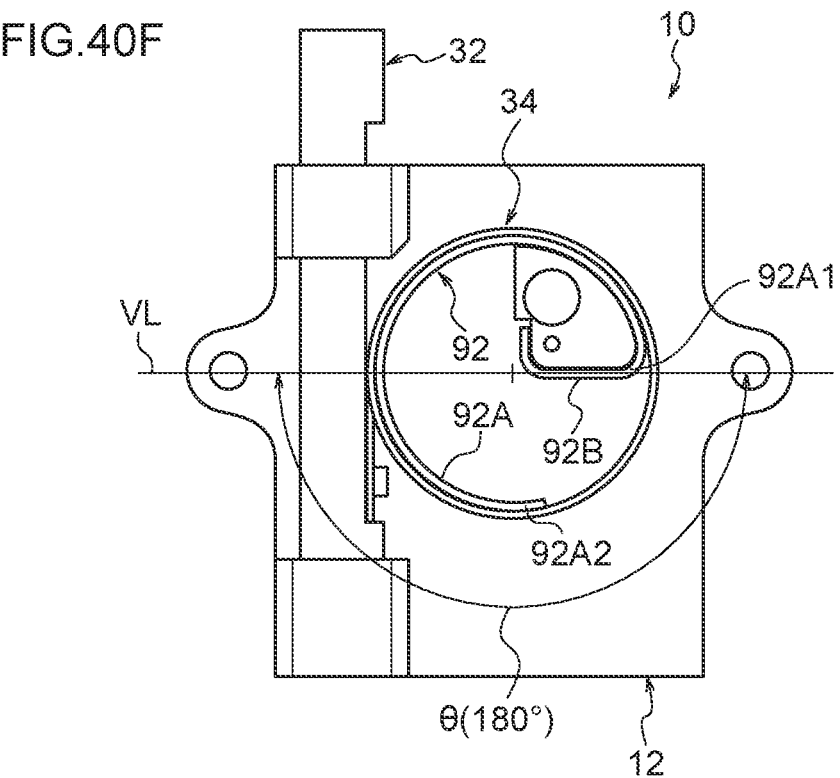
FIG. 40F is a front view illustrating a tensioner according to the first exemplary embodiment of the present invention, illustrating a state in which the back-up spring phase is set at a position located at 180° about the center of the ring-shaped portion.

FIG. 40F illustrates a state in which the one-end portion 92A1 of the ring-shaped portion 92A is disposed at a position located at 1800 (a position rotated by 180° in the wind-up direction) about the center S of the ring-shaped portion 92A with respect to the virtual straight line VL (i.e. illustrates a state in which the phase θ of the back-up spring 92 has been set to 180°). In this state, the number of turns of the flat spiral spring 34 is set to 1.5 full turns.

Figure 40G:
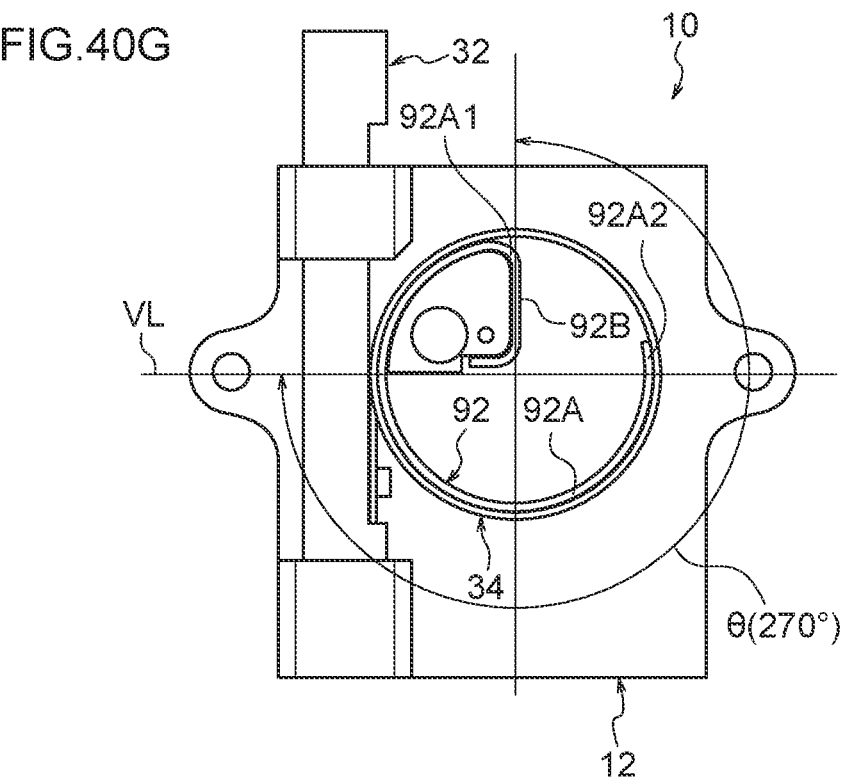
FIG. 40G is a front view illustrating a tensioner according to the first exemplary embodiment of the present invention, illustrating a state in which the back-up spring phase is set at a position located at 270° about the center of the ring-shaped portion.

FIG. 40G illustrates a state in which the one-end portion 92A1 of the ring-shaped portion 92A is disposed at a position located at 270° (a position rotated by 270° in the wind-up direction) about the center S of the ring-shaped portion 92A with respect to the virtual straight line VL (i.e. illustrates a state in which the phase θ of the back-up spring 92 has been set to 270°). Note that although not illustrated in the drawings, in a state in which the phase θ of the back-up spring 92 has been set to 360°, the number of turns of the flat spiral spring 34 would be set to 1.0 full turns.

Figure 41:
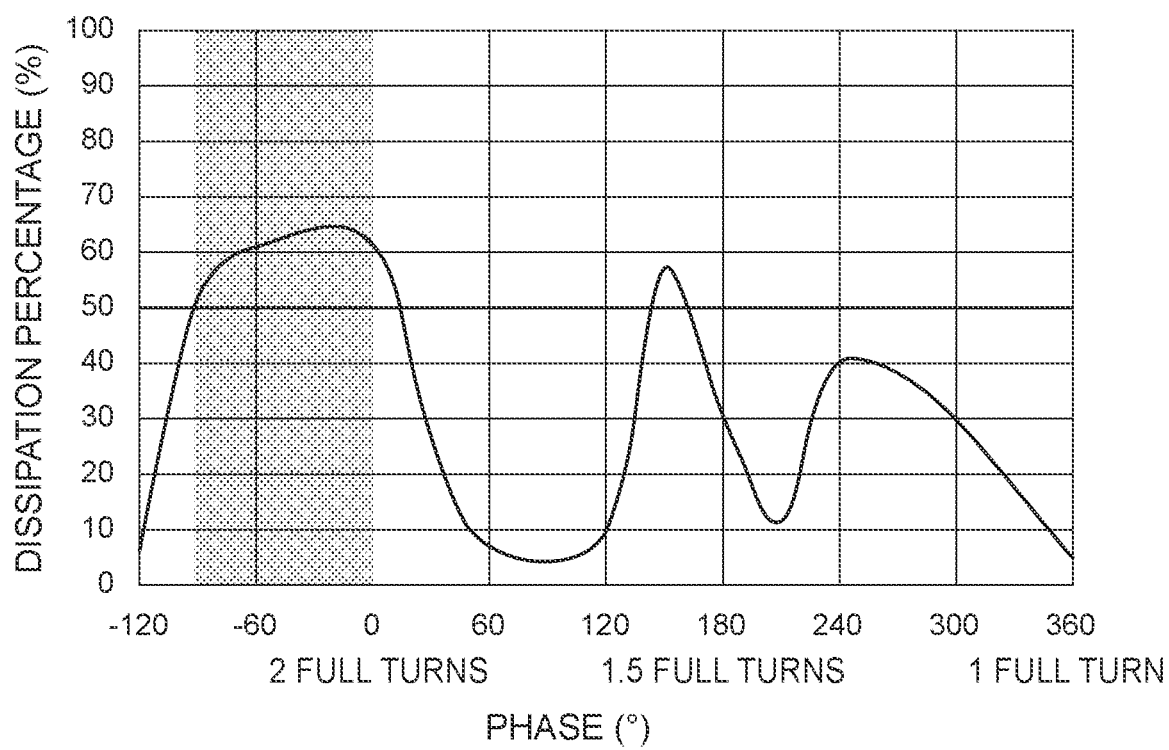
FIG. 41 is a graph illustrating a relationship between a back-up spring phase and dissipation percentage in a tensioner according to the first exemplary embodiment of the present invention.
Figure 42:
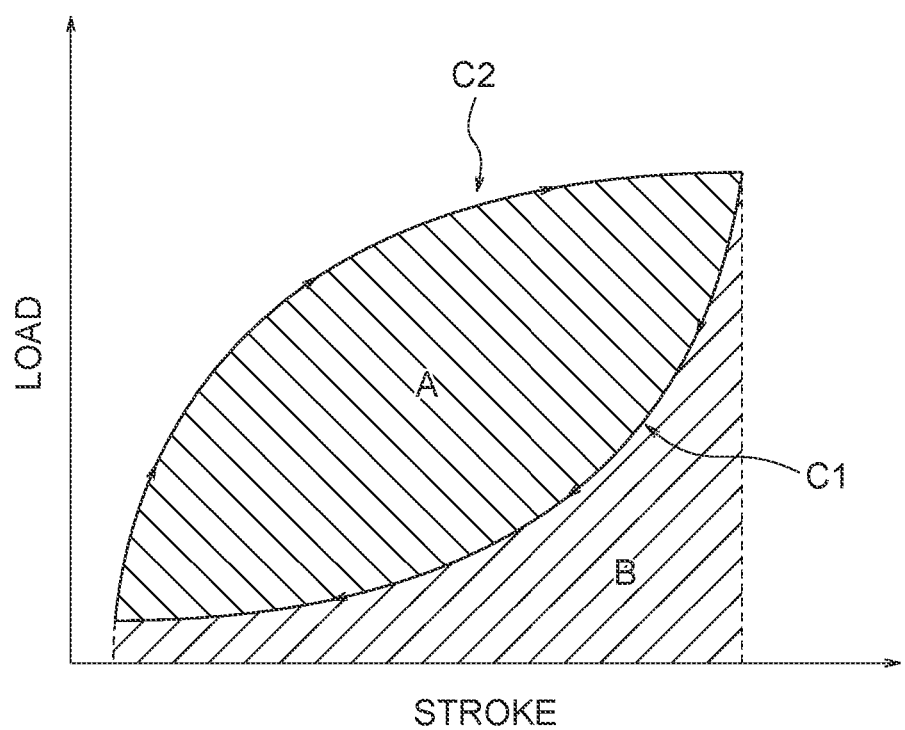
FIG. 42 is graph illustrating a relationship between load input to a thrust member and stroke of the thrust member in a tensioner according to the first exemplary embodiment of the present invention.

FIG. 41 is a graph illustrating a relationship between a dissipation percentage of energy for load input to the movable section 32 with respect to the phase θ of the back-up spring 92. FIG. 42 is a graph illustrating a relationship between input load to the movable section 32 and stroke of the movable section 32. In FIG. 42, C2 indicates a curve representing a relationship between load input to the movable section 32 and stroke of the movable section 32 in the retract-direction X2, and C1 indicates a curve representing a relationship between load input to the movable section 32 and stroke of the movable section 32 in the forward-direction X1. The dissipation percentage mentioned above is based on the relationship between the area of the region A and the area of the region B in FIG. 42, and is calculated from dissipation percentage=A/(A+B).

As illustrated in FIG. 41, it has been confirmed that the dissipation percentage is much higher, namely high attenuation characteristics are obtained, when the phase θ of the back-up spring 92 is set in a range of from −90° to 0° (the range indicated by dots in FIG. 41) than when the phase θ of the back-up spring 92 is set in other ranges. Due to fluctuations in the dissipation percentage being small and a stable dissipation percentage being achieved in this range, this range has been confirmed as the optimum phase for attachment of the back-up spring 92. Note that the dissipation percentage varies depending on the number of turns of the flat spiral spring 34. For example, were the number of turns of the flat spiral spring 34 to be 1.0 full turn, then the inter-plate friction arising in the flat spiral spring 34 would be insufficient, reducing the dissipation percentage. However, when the number of turns of the flat spiral spring 34 is at least 2.0 full turns, the inter-plate friction in the flat spiral spring 34 increases, and the dissipation percentage is higher. The number of turns of the flat spiral spring 34 is therefore preferably set to at least 2.0 full turns. However, even though the number of turns of the flat spiral spring 34 is increased, the dissipation percentage sometimes drops depending on the phase of the back-up spring 92. The phase θ of the back-up spring 92 is therefore preferably set in the aforementioned range, and the number of turns of the flat spiral spring 34 is preferably set to from 2.0 to 2.25 full turns.

Although several exemplary embodiments of the present invention have been described above, various modifications may also be implemented within a range not departing from the spirit of the present invention. For example, implementations may be made in which configuration elements of each of the present exemplary embodiments are swapped around or combined as appropriate. Obviously, the scope of rights encompassed by the present invention is not limited by the respective exemplary embodiments described above.

The disclosure of Japanese Patent Application No. 2018-145337, filed on Aug. 1, 2018, is incorporated in its entirety by reference herein. All cited documents, patent applications, and technical standards mentioned in the present specification are incorporated by reference in the present specification to the same extent as if each individual cited document, patent application, or technical standard was specifically and individually indicated to be incorporated by reference.

The invention claimed is:

1. A tensioner comprising:
a movable section configured to receive a load from an entrained transmission body through a tension member;
a fixed section configured to support the movable section so as to be capable of being displaced;
a flat spiral spring biasing the movable section so as to resist the tension member, the flat spiral spring unwinding in a state in which there is a small inter-plate friction force in a case in which there is a large biasing force applied to the tension member to counter the load acting from the tension member, and winding-up in a state in which there is a large inter-plate friction force in a case in which there is a small biasing force applied to the tension member to counter the load acting from the tension member; and
a wind-up limiting section configured to limit wind-up of the flat spiral spring,
wherein the wind-up limiting section includes a resistance force imparting section that is disposed inside an inner circumferential face of the flat spiral spring and configured to apply a biasing force against a decreased diameter of the flat spiral spring.

2. The tensioner of claim 1, wherein the wind-up limiting section includes a displacement limiting section configured to permit displacement of the movable section toward the tension member with respect to the fixed section, and to limit displacement of the movable section toward an opposite side from the tension member with respect to the fixed section.

3. The tensioner of claim 1, wherein:
the resistance force imparting section is a back-up spring configured from plate-shaped spring material; and
the back-up spring includes:
a ring-shaped portion formed in an incomplete ring shape and having an outer circumferential face in contact with an inner circumferential face of the flat spiral spring, and
an anchor portion extending from a one-end portion of the ring-shaped portion and anchored to the fixed section.

4. The tensioner of claim 3, further comprising:
a radial-contraction restriction member supported so as to be capable of rotating with respect to the fixed section about an axis running along a coil axis direction of the flat spiral spring, and engaged with another-end portion of the ring-shaped portion; and
a rotation limiting section configured to permit the radial-contraction restriction member to rotate in one direction about the axis with respect to the fixed section interlocked to radial enlargement of the ring-shaped portion, and to limit the radial-contraction restriction member from rotating in another direction about the axis with respect to the fixed section interlocked to radial contraction of the ring-shaped portion.

5. The tensioner of claim 3, further comprising:
a first pin member fixed to the fixed section and having the anchor portion anchored to the first pin member;
a second pin member disposed adjacently with respect to the first pin member in an extension direction of the ring-shaped portion from the anchor portion, the second pin member being fixed to the fixed section and engaged with an inner circumferential face of the ring-shaped portion; and
a plate member fixed to the first pin member and the second pin member and limiting displacement of the flat spiral spring and the back-up spring in a coil axis direction of the flat spiral spring.

6. The tensioner of claim 3, wherein the fixed section includes an inner circumferential support portion configured to engage with an inner circumferential face of the ring-shaped portion and to support the ring-shaped portion.

7. The tensioner of claim 3, wherein the ring-shaped portion has a cross-sectional area that changes in a circumferential direction.

8. The tensioner of claim 3, wherein the flat spiral spring has a curved cross-section, as viewed along a circumferential direction, that is convex on toward an opposite side from the ring-shaped portion.

9. The tensioner of claim 3, wherein the outer circumferential face of the ring-shaped portion is, as viewed along a circumferential direction of the ring-shaped portion, formed in a convex shape that is convex toward the flat spiral spring.

10. The tensioner of claim 3, wherein a plurality of indentations and projections are formed on an outer circumferential face and an inner circumferential face of a plate spring material configuring the flat spiral spring.

11. The tensioner of claim 3, wherein:
the movable section is supported by the fixed section so as to be capable of sliding in a reciprocating direction orthogonal to a coil axis direction of the flat spiral spring;
the flat spiral spring is disposed adjacently with respect to the movable section in a spring-adjacency direction orthogonal to both the coil axis direction and the reciprocating direction, an outer-end portion of the flat spiral spring being anchored to the movable section, and an inner-end portion of the flat spiral spring being anchored to the fixed section;
taking a rotation direction in which the flat spiral spring is wound-up as a wind-up direction and a rotation direction in which the flat spiral spring unwinds as an unwind direction, the ring-shaped portion extends from the anchor portion in the wind-up direction; and
as viewed along the coil axis direction, the one-end portion of the ring-shaped portion is disposed in a range from a position at 0 degrees about a center of the ring-shaped portion to a position at 90 degrees in the unwind direction with respect to a virtual straight line extending in the spring-adjacency direction from the center of the ring-shaped portion toward the movable section.

12. The tensioner of claim 3, wherein the ring-shaped portion is formed by the plate-shaped spring material being wound for at least 1.0 full turn.

13. The tensioner of claim 1, wherein the resistance force imparting section includes:
a plurality of press-contact members arrayed along a circumferential direction of the flat spiral spring; and
a biasing portion configured to bias the plurality of press-contact members toward a radial direction outer side of the flat spiral spring so as to press-contact an inner circumferential face of the flat spiral spring.

14. The tensioner of claim 13, wherein the biasing portion includes:
a pair of axial-movement members disposed at two coil axis direction sides with respect to the flat spiral spring and coaxial to the flat spiral spring, the pair of axial-movement members each being supported so as to be displaceable in a coil axis direction with respect to the fixed section, and having an outer circumferential face that has a decreasing diameter on progression toward a coil axis direction center of the flat spiral spring and that contacts the plurality press-contact members from a radial direction inner side of the flat spiral spring; and a resilient member configured to bias the pair of axial-movement members in directions so as to approach each other.

15. The tensioner of claim 1, wherein the resistance force imparting section includes:
a back-up spring formed from plate-shaped spring material in an incomplete ring shape and having an outer circumferential face contacting an inner circumferential face of the flat spiral spring;
a pair of axial-movement members disposed at two coil axis direction sides with respect to the flat spiral spring and coaxial to the flat spiral spring, the pair of axial-movement members each being supported so as to be displaceable in a coil axis direction with respect to the fixed section, and having an outer circumferential face that has a decreasing diameter on progression toward a coil axis direction center of the flat spiral spring and that contacts an inner circumferential portion of the back-up spring; and
a resilient member configured to bias the pair of axial-movement members in directions so as to approach each other.

16. The tensioner of claim 1, wherein the wind-up limiting section includes an additional spring configured to bias the movable section toward the tension member with respect to the fixed section.

* * * * *